(12) United States Patent
Hirota

(10) Patent No.: US 8,107,045 B2
(45) Date of Patent: Jan. 31, 2012

(54) COLOR ACTIVE MATRIX TYPE VERTICALLY ALIGNED MODE LIQUID CRYSTAL DISPLAY AND DRIVING METHOD THEREOF

(75) Inventor: Naoto Hirota, Toyokawa (JP)

(73) Assignee: Obayashiseikou Co., Ltd., Aichi (JP)

( * ) Notice: Subject to any disclaimer, the term of this patent is extended or adjusted under 35 U.S.C. 154(b) by 1481 days.

(21) Appl. No.: 10/657,470

(22) Filed: Sep. 8, 2003

(65) Prior Publication Data

US 2004/0046914 A1     Mar. 11, 2004

(30) Foreign Application Priority Data

Sep. 10, 2002  (JP) .................................. 2002-316865
Feb. 26, 2003  (JP) .................................. 2003-110895

(51) Int. Cl.
*G02F 1/1337*   (2006.01)
*G02F 1/1343*   (2006.01)

(52) U.S. Cl. ......... 349/130; 349/129; 349/143; 349/144

(58) Field of Classification Search .................. 349/129, 349/130, 143, 144
See application file for complete search history.

(56) References Cited

U.S. PATENT DOCUMENTS

| 6,407,791 | B1 | 6/2002 | Suzuki et al. | |
| 6,665,023 | B1 * | 12/2003 | Watanabe et al. | ............... 349/38 |
| 6,958,791 | B2 * | 10/2005 | Shimoshikiryo | ............... 349/85 |
| 2001/0013852 | A1 | 8/2001 | Matsushima et al. | |
| 2003/0112397 | A1 | 6/2003 | Lee | |

FOREIGN PATENT DOCUMENTS

| JP | 7-64089 | 3/1995 |
| JP | 2000-66240 | 3/2000 |
| JP | 2001-249350 | 9/2001 |
| JP | 2001-343647 | 12/2001 |

* cited by examiner

*Primary Examiner* — Michael Caley
(74) *Attorney, Agent, or Firm* — Muramatsu & Associates

(57) ABSTRACT

A large screen display suitable for displaying moving images has a high operational property and is realized at low cost. A vertically aligned mode liquid crystal display comprises a scan wiring, a video signal wiring, a pixel electrode, an alignment directional control electrode, and a thin film transistor element formed in a position where a scan wiring and a video signal wiring intersect with each other, and a common electrode formed in a color filter substrate side. An electric field distribution formed with three electrodes comprising an alignment directional control electrode, a pixel electrode, and a common electrode formed in an countering substrate side controls motion directions of vertically aligned anisotropic liquid crystal molecules having a negative dielectric constant.

18 Claims, 92 Drawing Sheets

Fig. 2
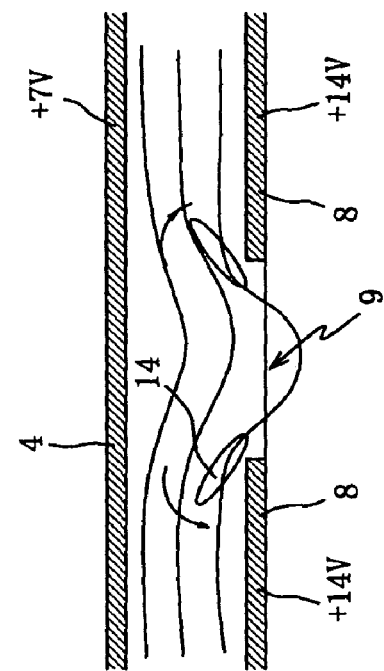
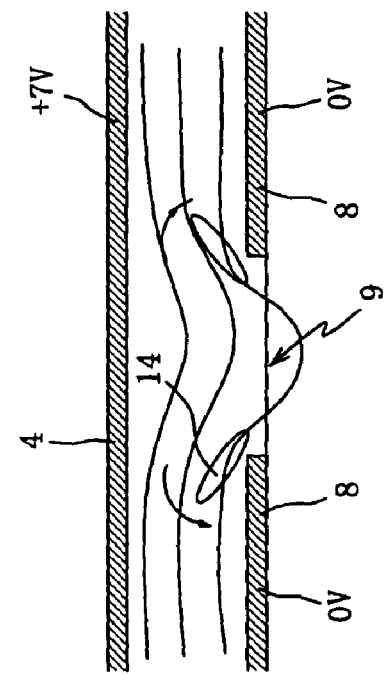

Fig. 3
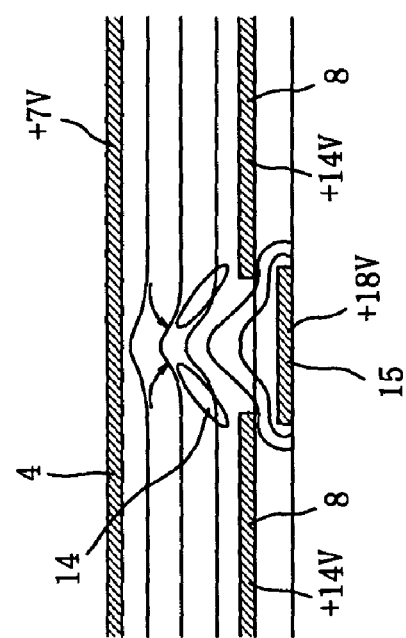
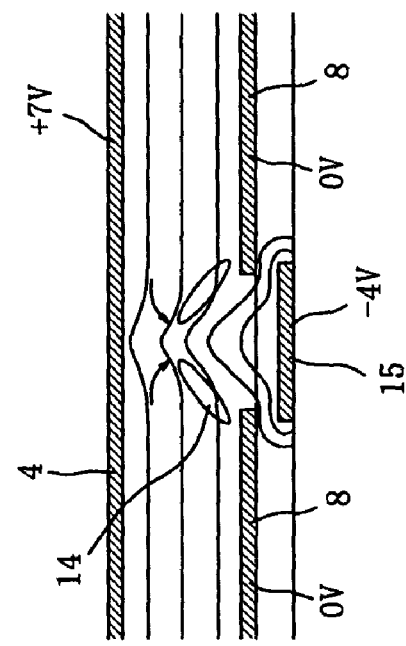

Fig. 51

[1] Scanning line

[2] Formation of thin film silicon island

[3] Video signal wiring
 & Liquid crystal alignment direction control electrode

[4] Contact hole

[5] Transparent pixel electrode

Fig. 52

[1] Scanning line

[2] Formation of thin film silicon island
 & Video signal wiring
 & Liquid crystal alignment direction control electrode

[3] Contact hole

[4] Transparent pixel electrode

Fig. 53

[1] Scanning line
  & Liquid crystal alignment direction control electrode

[2] Formation of thin film silicon island

[3] Video signal wiring

[4] Contact hole

[5] Transparent pixel electrode

Fig. 54

[1] Scanning line
  & Liquid crystal alignment direction control electrode

[2] Formation of thin film silicon island
  & Video signal wiring

[3] Contact hole

[4] Transparent pixel electrode

Fig. 55

- [1] Scanning line & Common electrode
- [2] Formation of thin film silicon island
- [3] Video signal wiring & Liquid crystal alignment direction control electrode
- [4] Contact hole
- [5] Transparent pixel electrode

Fig. 56

- [1] Scanning line & Common electrode
- [2] Formation of thin film silicon island & Video signal wiring & Liquid crystal alignment direction control electrode
- [3] Contact hole
- [4] Transparent pixel electrode

Fig. 57

[1] Scanning line
& Common electrode
& Liquid crystal alignment direction control electrode

[2] Formation of thin film silicon island

[3] Video signal wiring

[4] Contact hole

[5] Transparent pixel electrode

Fig. 58

[1] Scanning line
& Common electrode
& Liquid crystal alignment direction control electrode

[2] Formation of thin film silicon island
& Video signal wiring

[3] Contact hole

[4] Transparent pixel electrode

COLOR ACTIVE MATRIX TYPE VERTICALLY ALIGNED MODE LIQUID CRYSTAL DISPLAY AND DRIVING METHOD THEREOF

FIELD OF THE INVENTION

The present invention relates to a big screen active matrix type liquid crystal TV viewing display, and more particularly, to an active matrix type liquid crystal display having a wide viewing angle, high brightness, and a high response speed as well as low cost, and to a method for driving the display.

BACKGROUND OF THE INVENTION

As shown in FIG. 1, in conventional type vertically aligned mode liquid crystal displays, a mode is adopted in which bumps 5 for controlling a motion direction of liquid crystal molecules 14 are formed on a transparent common electrode 4 of a color filter side substrate 1, and slits 9 for controlling a motion direction of the liquid crystal molecules 14 are provided in transparent pixel electrodes 8 of an active matrix substrate 13, the bumps 5 and the slits 9 determine the motion direction of the liquid crystal molecules 14 serving as one set. There is also provided a method in which slits for controlling the motion direction of the liquid crystal molecules 14 in place of bumps 5 are formed on a transparent common electrode 4 on the color filter side substrate 1. Both of these modes are put in practical use for mass-production.

In the conventional type multi-domain vertically aligned mode liquid crystal displays, it is necessary that such bumps or slits are formed on the transparent common electrode in the color filter side substrate, which requires one excessive photo mask process. Therefore, in this conventional technology, cost increase is unavoidable.

Moreover, in the vertically aligned mode liquid crystal displays with the bumps 5 formed in the color filter layer 3 side, as shown in FIG. 1, when a width, a pitch, and an angle of the slope of the bumps 5 are not precisely controlled, variation in the tilting degree of liquid crystal molecules 14 is occurred, which frequently causes unevenness in half tone areas.

Since the bumps are made of positive type photoresists, perfect removal of organic solvents, and furthermore hardening by baking at high temperatures of no less than 200 degrees are furthermore required, leading to difficulty in shortening the processes. When contaminants are eluted out into liquid crystals from the bumps of positive type photoresists, a phenomenon of afterimage will occur, resulting in reliability problems.

In color filter substrates using the conventional bumps, positive type photoresists are used as materials for the bumps, and therefore, when a defect occurs in the application process of a vertical alignment film 6 and reworking is required, a dry ashing method using oxygen plasma can not be used. Therefore, a wet remove method requiring high running cost using organic solvents has to be used, which causes a disadvantage requiring a very high reworking cost.

In vertically aligned mode liquid crystal displays using the conventional type bumps and slits, when a display switchovers to a half tone display from a black display, or to a half tone display from a white display, there arises defects that the liquid crystals operate in a slow response speed.

SUMMARY OF THE INVENTION

The present invention has been made to solve the above-mentioned problems, and it is an object of the present invention to improve reliability of a large-sized vertically aligned mode liquid crystal display.

It is also an object of the present invention to provide a large-sized vertically aligned mode liquid crystal display that can be manufactured at low cost in a short time, while having capability of high brightness and high response speed.

In order to solve the problems in the conventional technology and to achieve the above-mentioned objects, following methods are used in the present invention.

[Method 1]

In order to impress a voltage to anisotropic liquid crystal molecules that are vertically aligned to an active matrix substrate and a color filter substrate and have a negative dielectric constant, and to make the liquid crystal molecules tilt in different two directions or four directions, two kinds of following electrode structures were formed in one pixel of the active matrix substrate.

i) A transparent flat common electrode is used in a color filter substrate side, and for transparent pixel electrodes countering the transparent flat common electrode in the active matrix substrate side, patterns (no transparent electrode in a slit part) having a shape of a long and slender slit are formed.

ii) a transparent flat common electrode is used in a color filter substrate side, and for transparent pixel electrodes countering the transparent flat common electrode in the active matrix substrate side, patterns having a shape of a long and slender slit are formed, two rows of liquid crystal alignment direction control electrodes that are mutually separated and set as potentials different from each other exist in a lower layer of the transparent pixel electrode via an insulated film, either of the liquid crystal alignment direction control electrodes have almost the same shape as a shape of a pattern of the shape of long and slender slits, and a larger dimension than a dimension of the slit; and two rows of the liquid crystal alignment direction control electrodes mutually separated are arranged in a direction of a scan signal wire in a lower layer of the long and slender slits that are formed, mutually exchanged in an every fixed pixel cycle, in the transparent pixel electrode.

[Method 2]

A following drive system is used as a method for driving the vertically aligned mode liquid crystal display having the electrode structure by the method 1.

There is used a drive system in which: when a potential of the transparent pixel electrode separated for every pixel of an active matrix substrate side is lower than a potential of the countering flat common electrode on a color filter substrate side, a potential of the liquid crystal alignment direction control electrode placed in a lower layer of the slit of the transparent pixel electrode is set lower than a potential of the transparent pixel electrode; and when a potential of the transparent pixel electrode is higher than a potential of the countering flat common electrode of the color filter substrate side, a potential of the liquid crystal alignment direction control electrode placed in a lower layer of the slit of the transparent pixel electrode is set higher than a potential of the transparent pixel electrode, and potentials of the liquid crystal alignment direction control electrodes arranged in the vicinity of both sides of the scan signal wiring are set as polar potentials different from each other, and polarities of the potential of the transparent pixel electrode, and each of the potential of the two rows of the liquid crystal alignment direction control electrodes mutually separated in one pixel are reversed to a polarity of a polarity of the potential of the flat common electrode in a color filter substrate side every vertical scanning period.

[Method 3]

In a color active matrix type vertically aligned mode liquid crystal display in which adjacent transparent pixel electrodes in a direction of a scan signal wiring are connected to a thin film transistor component controlled by mutually different scan signal wirings, in order to impress a voltage to liquid crystal molecules that are vertically aligned between an active matrix substrate and a color filter substrate and to make the liquid crystal molecules tilt in different two directions or different four directions, two kinds of following electrode structures were formed in one pixel of the active matrix substrate.

i) A transparent flat common electrode is used in a color filter substrate side, and for transparent pixel electrodes countering the transparent flat common electrode in the active matrix substrate side, patterns (no transparent electrode in a slit part) having a shape of a long and slender slit are formed.

ii) A transparent flat common electrode is used in a color filter substrate side, and for transparent pixel electrodes countering the transparent flat common electrode in the active matrix substrate side, patterns having a shape of a long and slender slit are formed, and a liquid crystal alignment direction control electrode having almost the same shape as a shape of the slit, and a larger dimension than a dimension of the slit are formed in a lower layer of the slit via an insulated film.

[Method 4]

A following drive system is used as a method for driving the vertically aligned mode liquid crystal display having the electrode structure by the method 3.

There is used a drive system in which: when a potential of the transparent pixel electrode separated for every pixel of an active matrix substrate side is lower than a potential of the countering flat common electrode on a color filter substrate side, a potential of the liquid crystal alignment direction control electrode placed in a lower layer of the slit of the transparent pixel electrode is set lower than a potential of the transparent pixel electrode; and when a potential of the transparent pixel electrode is higher than a potential of the countering flat common electrode of the color filter substrate side, a potential of the liquid crystal alignment direction control electrode placed in a lower layer of the slit of the transparent pixel electrode is set higher than a potential of the transparent pixel electrode; and polarities of the potential of the transparent pixel electrode, and the potential of the liquid crystal alignment direction control electrode are reversed to a polarity of a potential of the flat common electrode in a color filter substrate side every vertical scanning period.

[Method 5]

In order to impress a voltage to anisotropic liquid crystal molecules that are vertically aligned to an active matrix substrate and a color filter substrate and have a negative dielectric constant, and to make the liquid crystal molecules tilt in many directions, two kinds of following electrode structures were formed in one pixel of the active matrix substrate.

i) A transparent flat common electrode is used in a color filter substrate side, and for transparent pixel electrodes countering the transparent flat common electrode on the active matrix substrate side, many circular or polygonal holes (no transparent electrodes in a portion of a hole) are formed.

ii) A transparent flat common electrode is used in a color filter substrate side, and for transparent pixel electrodes countering the transparent flat common electrode in the active matrix substrate side, patterns having a shape of a long and slender slit are formed, two rows of liquid crystal alignment direction control electrodes that are mutually separated and set as potentials different from each other exist in a lower layer of the transparent pixel electrode via an insulated film, either of the liquid crystal alignment direction control electrodes has almost the same shape as a shape of a pattern of the shape of long and slender slits, and a larger dimension than a dimension of the slit, and two rows of the liquid crystal alignment direction control electrodes mutually separated are arranged in a direction of a scan signal wiring in a lower layer of the long and slender slits that are formed, mutually exchanged in an every fixed pixel cycle, in the transparent pixel electrode.

[Method 6]

A following drive system is used as a method for driving the vertically aligned mode liquid crystal display having the electrode structure by the method 5.

There is used a drive system in which: when a potential of the transparent pixel electrode separated for every pixel of an active matrix substrate side is lower than a potential of the countering flat common electrode on a color filter substrate side, a potential of the liquid crystal alignment direction control electrode placed in a lower layer of a slit of the transparent pixel electrode is set lower than a potential of the transparent pixel electrode; and when a potential of the transparent pixel electrode is higher than a potential of the countering flat common electrode of the color filter substrate side, a potential of the liquid crystal alignment direction control electrode placed in a lower layer of the slit of the transparent pixel electrode is set higher than a potential of the transparent pixel electrode; and potentials of the liquid crystal alignment direction control electrodes arranged in the vicinity of both sides of the scan signal wiring are set as polar potentials different from each other, and polarities of the potential of the transparent pixel electrode and the potentials of the two rows of the liquid crystal alignment direction control electrodes mutually separated in one pixel are reversed to a polarity of a potential of the flat common electrode in a color filter substrate side every vertical scanning period.

[Method 7]

In an active matrix type vertically aligned mode liquid crystal display in which adjacent transparent pixel electrodes in a direction of a scan signal wiring are connected to a thin film transistor component controlled by mutually different scan signal wirings, in order to impress a voltage to liquid crystal molecules that are vertically aligned between an active matrix substrate and a color filter substrate and to make the liquid crystal molecules tilt in many directions, two kinds of following electrode structures were formed in one pixel of the active matrix substrate.

i) A transparent flat common electrode is used in a color filter substrate side, and for transparent pixel electrodes countering the transparent flat common electrode in the active matrix substrate side, many circular or polygonal holes (no transparent electrodes in a portion of a hole) are formed.

ii) A transparent flat common electrode is used in a color filter substrate side, and for transparent pixel electrodes countering the transparent flat common electrode in the active matrix substrate side, patterns having a shape of a long and slender slit are formed, a liquid crystal alignment direction control electrode having almost the same shape as a shape of the slit, and a larger dimension than a dimension of the slit are formed in a lower layer of the slit via an insulated film.

[Method 8]

A following drive system is used as a method for driving the vertically aligned mode liquid crystal display having the electrode structure by the method 7.

There is used a drive system in which: when a potential of the transparent pixel electrode separated for every pixel on an active matrix substrate side is lower than a potential of the countering flat common electrode on a color filter substrate side, a potential of the liquid crystal alignment direction control electrode placed in a lower layer of a slit of the transparent pixel electrode is set lower than a potential of the transparent pixel electrode; and when a potential of the transparent pixel electrode is higher than a potential of the countering flat common electrode of the color filter substrate side, a potential of the liquid crystal alignment direction control electrode placed in a lower layer of the slit of the transparent pixel electrode is set higher than a potential of the transparent pixel electrode; and polarities of the potential of the transparent pixel electrode, and of the potential of the liquid crystal alignment direction control electrode are reversed to a polarity of a potential of the flat common electrode in a color filter substrate side every vertical scanning period.

[Method 9]

In the method 1 and 3, the slit formed in the transparent pixel electrode in an active matrix substrate side and extending long and slender, and the slit forming a group with the liquid crystal alignment direction control electrode are arranged alternately, maintaining an almost parallel relationship in a direction making about ±45 degrees to a direction of the scan signal wiring; and polarization axes of two polarizing plates placed in exterior of a liquid crystal cell are arranged in a direction of the scan signal wiring and in a direction of the video signal wiring, and are arranged so that they may perpendicularly mutually intersect.

[Method 10]

In the method 1 and 3, there was adopted a structure that the slit formed in the transparent pixel electrode in an active matrix substrate side and extending long and slender is arranged in a direction making ±45 degrees to a direction of a scan signal wiring; and the slit forming a group with the liquid crystal alignment direction control electrode are arranged in a parallel direction and in a perpendicular direction to a direction of the scan signal wirings; and the liquid crystal alignment direction control electrode encloses a periphery of the transparent pixel electrode while overlapping with the transparent pixel electrode via the insulated film; and polarization axes of two polarizing plates placed in exterior of a liquid crystal cell are arranged in the direction of the scan signal wiring and in a direction of the video signal wiring, and are arranged so that they may perpendicularly mutually intersect.

[Method 11]

In the method 1 and 3, there was adopted a structure that the slit formed in a transparent pixel electrode in an active matrix substrate side and extending long and slender is arranged in a parallel direction and in a perpendicular direction to the direction of the scan signal wiring; and the slit forming a group with the liquid crystal alignment direction control electrode is arranged in parallel to a direction of the scan signal wiring; and the liquid crystal alignment direction control electrode encloses a periphery of the transparent pixel electrode while overlapping with the transparent pixel electrode via the insulated film; and polarization axes of two polarizing plates placed in exterior of a liquid crystal cell are arranged a direction of the scan signal wiring and in a direction of the video signal wiring, and are arranged so that they may perpendicularly mutually intersect.

[Method 12]

In the method 1 and 3, the slit formed in a transparent pixel electrode in an active matrix substrate side and extending long and slender is arranged in a parallel direction and in a perpendicular direction to a direction of the scan signal wiring; and the slit forming a group with the liquid crystal alignment direction control electrode have a structure arranged in directions making ±45 degrees to a direction of the scan signal wiring; and polarization axes of two polarizing plates placed in exterior of a liquid crystal cell are arranged in a direction of the scan signal wiring and in a direction of the video signal wiring, and are arranged so that they may perpendicularly mutually intersect.

[Method 13]

In the method 5 and 7, there was adopted a structure that the slit forming a group with the liquid crystal alignment direction control electrode are arranged in a parallel direction and in a perpendicular direction relative to a direction of the scan signal wiring so as to enclose two or more circular or polygonal holes formed in the transparent pixel electrode in an active matrix substrate side; and the liquid crystal alignment direction control electrode encloses a periphery of the transparent pixel electrode while overlapping with the transparent pixel electrode via the insulated film; and polarization axes of two polarizing plates placed in exterior of a liquid crystal cell are arranged in a direction of the scan signal wiring and in a direction of the video signal wiring, and are arranged so that they may perpendicularly mutually intersect.

[Method 14]

In the method 1, 3, 5, and 7, the liquid crystal alignment direction control electrode formed in a lower layer of the slit of the transparent pixel electrode via the insulated film is simultaneously formed in the same layer at the time of formation of the scan signal wiring.

[Method 15]

In the methods 1, 3, 5, and 7, an additional capacitance was formed with the liquid crystal alignment direction control electrode formed in a lower layer of the slit of the transparent pixel electrode via the insulated film, and the transparent pixel electrode.

[Method 16]

In the method 1 and 5, all of the scan signal wirings and the liquid crystal alignment direction control electrodes are completely separated, and are connected to output terminals of different drive ICs, respectively; and contact terminals of the two rows of liquid crystal alignment direction control electrodes for controlling one row of pixels are arranged so that they may be sandwiched between contact terminals of different scan signal wirings.

[Method 17]

In the method 3 and 7, all of the scan signal wirings and the liquid crystal alignment direction control electrodes are completely separated and independent, and are connected to output terminals of different drive ICs, respectively; and contact terminals of the one row of liquid crystal alignment direction control electrodes for controlling one row of pixels are arranged so that they may be sandwiched between contact terminals of different scan signal wirings.

[Method 18]

In the method 1, 3, 5, and 7, contact terminals of the scan signal wiring are arranged in either of right side or left side of a display screen part, and contact terminals of the liquid crystal alignment direction control electrode are arranged on another side different from a side of the contact terminals of the scan signal wiring, each contact terminal is mutually completely separated and independent, and is connected to output terminals of different drive ICs, respectively.

[Method 19]

In the method 1 and 5, the scan signal wirings and the liquid crystal alignment direction control electrodes are completely separated and independent, each contact terminal is arranged on both of right and left sides of a display screen part, and contact terminals of the two rows of the liquid crystal alignment direction control electrodes for controlling one row of pixels are arranged so that they may be sandwiched between contact terminals of different scan signal wirings.

[Method 20]

In the method 3 and 7, all of scan signal wirings and liquid crystal alignment direction control electrodes are completely separated and independent, each contact terminal is arranged on both of right and left sides of a display screen part, and contact terminals of the one row of liquid crystal alignment direction control electrodes for controlling one row of pixels are arranged so that they may be sandwiched between contact terminals of different scan signal wirings.

[Method 21]

In the methods 2, 4, 6, and 8, at the time of moving image displaying, a bias voltage impressed between the liquid crystal alignment direction control electrode formed in a lower layer of the slit of the transparent pixel electrode and the transparent pixel electrode is set higher than a voltage at the time of still picture displaying, and thereby, a tilting speed of anisotropic liquid crystal molecules having a negative dielectric constant are set higher.

[Method 22]

In order to impress a voltage to anisotropic liquid crystal molecules having a negative dielectric constant that are vertically aligned to an active matrix substrate and a color filter substrate and to make the liquid crystal molecules tilt in different two directions or different four directions, two kinds of following electrode structure and structure arrangement were formed in one pixel of the active matrix substrate.
i) A transparent flat common electrode is used in a color filter substrate side, and for transparent pixel electrodes countering the transparent flat common electrode in the active matrix substrate side, patterns (no transparent electrode in a slit part) having a shape of a long and slender slit are formed.
ii) A transparent flat common electrode is used in a color filter substrate side, and for transparent pixel electrodes countering the transparent flat common electrode in the active matrix substrate side, patterns having a shape of a long and slender slit are formed, and a liquid crystal alignment direction control electrode having almost the same shape as a shape of the slit, and a larger dimension than a dimension of the slit are formed in a lower layer of the slit via an insulated film.
iii) In a pixel of n row m column, a thin film transistor element is formed in a position where a scan signal wiring of (n−1) row and a video signal wiring of (m+1) column intersect with each other, and a video signal wiring of (m+1) column and a liquid crystal alignment direction control electrode used for a pixel of n row m column are connected via the thin film transistor element; and a thin film transistor element is formed in a position where a scan signal wiring of n row and a video signal wiring of m column intersect, and a video signal wiring of m column and a transparent pixel electrode used for a pixel of n row m column are connected via the thin film transistor element.

[Method 23]

In order to impress a voltage to anisotropic liquid crystal molecules having a negative dielectric constant that are vertically aligned to an active matrix substrate and a color filter substrate and to make the liquid crystal molecules tilt in different two directions or different four directions, two kinds of following electrode structure and structure arrangement were formed in one pixel of the active matrix substrate.
i) A transparent flat common electrode is used in a color filter substrate side, and for transparent pixel electrodes countering the transparent flat common electrode in the active matrix substrate side, patterns (no transparent electrode in a slit part) having a shape of a long and slender slit are formed.
ii) A transparent flat common electrode is used in a color filter substrate side, and for transparent pixel electrodes countering the transparent flat common electrode in the active matrix substrate side, patterns having a shape of a long and slender slit are formed, and a liquid crystal alignment direction control electrode having almost the same shape as a shape of the slit, and a larger dimension than a dimension of the slit is formed in a lower layer of the slit via an insulated film.
iii) In a pixel of n row m column, a thin film transistor element is formed on a scan signal wiring of (n−1) row, a common electrode of n row, and a liquid crystal alignment direction control electrode used for a pixel of n row m column are connected via the thin film transistor element, and a thin film transistor element is formed in a position where a scan signal wiring of n row and a video signal wiring of m column intersect with each other, and the video signal wiring of m column, and a transparent pixel electrode used for a pixel of n row m column are connected via the thin film transistor element.

[Method 24]

In order to impress a voltage to liquid crystal molecules that are vertically aligned to an active matrix substrate and a color filter substrate and to make the liquid crystal molecules tilt in many directions, two kinds of following electrode structure and structure arrangement were formed in one pixel of the active matrix substrate.
i) A transparent flat common electrode is used in a color filter substrate side, and for transparent pixel electrodes countering the transparent flat common electrode in the active matrix substrate side, circular or polygonal holes (no transparent electrodes in a portion of a hole) are formed.
ii) A transparent flat common electrode is used in a color filter substrate side, and for transparent pixel electrodes countering the transparent flat common electrode in the active matrix substrate side, patterns having a shape of a long and slender slit are formed, a liquid crystal alignment direction control electrode having almost the same shape as a shape of the slit, and a larger dimension than a dimension of the slit are formed in a lower layer of the slit via the insulated film.
iii) In a pixel of n row m column, a thin film transistor element is formed in a position where a scan signal wiring of (n−1) row and a video signal wiring of (m+1) column intersect with each, and a video signal wiring of (m+1) column and a liquid crystal alignment direction control electrode used for a pixel of n row m column are connected via the thin film transistor element; and a thin film transistor element is formed in a position where a scan signal wiring of n row and a video signal wiring of m column intersect with each other, and the video signal wiring of m column and a transparent pixel electrode used for pixel of n row m column are connected via the thin film transistor element.

[Method 25]

In order to impress a voltage to liquid crystal molecules that are vertically aligned between an active matrix substrate and a color filter substrate and to make the liquid crystal molecules tilt in many directions, two kinds of following electrode structures and structure arrangements were formed in one pixel of the active matrix substrate.
i) A transparent flat common electrode is used in a color filter substrate side, and for transparent pixel electrodes countering the transparent flat common electrode in the active matrix substrate side many circular or polygonal holes (no transparent electrodes in a portion of a hole) are formed.
ii) A transparent flat common electrode is used in a color filter substrate side, and for transparent pixel electrodes countering the transparent flat common electrode in the active matrix substrate side, patterns having a shape of a long and slender slit are formed, and a liquid crystal alignment direction control electrode having almost the same shape as a shape of the slit, and a larger dimension than a dimension of the slit are formed in a lower layer of the slit via an insulated film.
iii) In a pixel of n row m column, a thin film transistor element is formed on a scan signal wiring of (n−1) row, a common electrode of n row and a liquid crystal alignment direction control electrode used for a pixel of n row m column are connected via the thin film transistor element, and a thin film transistor element is formed in a position where a scan signal wiring of n row and a video signal wiring of m column intersect with each other, and the video signal wiring of m column and a transparent pixel electrode used for a pixel of n row m column are connected via the thin film transistor element.

[Method 26]

In the methods 22, 23, 24, and 25, a time width of a scan signal waveform in the scan signal wiring is no less than two times of a horizontal period, a scan signal waveform in a scan signal wiring of (n−1)th row and a scan signal waveform in a scan signal wiring of (n)th row overlap one another by no less than one time of a horizontal period; and polarities of a video signal voltage of a video signal wiring of m column, and a video signal voltage of a video signal wiring of (m+1) column are different from each other, and the polarities being mutually exchanged every horizontal period, and the polarities being mutually exchanged every vertical period.

[Method 27]

In the methods 22 and 24, a channel length ($L_2$) of a thin film transistor element that is formed in a position where a scan signal wiring of (n−1) row and a video signal wiring of column (m+1) intersect, and is connected with the liquid crystal alignment direction control electrode was set larger than a channel length ($L_1$) of a thin film transistor element that is formed in a position where a scan signal wiring of n row and a video signal wiring of m column intersect, and is connected with the transparent pixel electrode ($L_1 < L_2$)

[Method 28]

In the methods 23 and 25, a channel length ($L_2$) of a thin film transistor element that is formed on a scan signal wiring of (n−1) row, and is connected with the liquid crystal alignment direction control electrode was set larger than a channel length ($L_1$) of a thin film transistor element that is formed in a position where a scan signal wiring of n row and a video signal wiring of m column intersect, and is connected with the transparent pixel electrode ($L_1 < L_2$).

[Method 29]

In the methods 22, 23, 24, and 25, a double transistor element structure or an offset channel element structure was used for a thin film transistor element connected with the liquid crystal alignment direction control electrode.

[Method 30]

In the methods 22 and 23, a slit formed in the transparent pixel electrode in the active matrix substrate side and extending long and slender, and a slit forming a group with the liquid crystal alignment direction control electrode are arranged alternately, maintaining a relationship almost parallel to each other in an angle direction of about ±45 degrees to an extending direction of the scan signal wiring; polarization axes of two polarizing plates placed in exterior of a liquid crystal cell are arranged in a direction of the scan signal wiring and in a direction of the video signal wiring, and are arranged so that they may perpendicularly mutually intersect.

[Method 31]

In the methods 22 and 23, a slit formed in a transparent pixel electrode in the active matrix substrate side and extending long and slender are arranged in a parallel direction and in a perpendicular direction to an extending direction of the scan signal wiring; and a slit forming a group with the liquid crystal alignment direction control electrode is arranged in a angle direction of about ±45 degrees to a direction of the scan signal wirings; and polarization axes of two polarizing plates placed in exterior of a liquid crystal cell are arranged in a direction of the scan signal wiring and in a direction of the video signal wiring, and are arranged so that they may perpendicularly mutually intersect.

[Method 32]

In methods 22 and 23, there was adopted a structure that a slit formed in the transparent pixel electrode in the active matrix substrate side and extending long and slender is arranged in a angle direction of about ±45 degrees to an extending direction of the scan signal wiring; and a slit forming a group with the liquid crystal alignment direction control electrode is arranged in a parallel direction and in a perpendicular direction to an extending direction of the scan signal wiring; and the liquid crystal alignment direction control electrode encloses a periphery of the transparent pixel electrode while overlapping with the transparent pixel electrode via the insulated film; and polarization axes of two polarizing plates placed in exterior of a liquid crystal cell are arranged in a direction of the scan signal wiring and in a direction of the video signal wiring, and are arranged so that they may perpendicularly mutually intersect.

[Method 33]

In methods 24 and 25, there was adopted a structure that a slit forming a group with the liquid crystal alignment direction control electrode is arranged in a direction perpendicular to a direction and parallel to an extending direction of the scan signal wiring so that two or more circular or polygonal holes formed in the transparent pixel electrode in the active matrix substrate side may be surrounded; and the liquid crystal alignment direction control electrode encloses a periphery of the transparent pixel electrode while overlapping with the transparent pixel electrode via the insulated film; and polarization axes of two polarizing plates placed in exterior of a liquid crystal cell are arranged in a direction of the scan signal wiring and in a direction of the video signal wiring, and are arranged so that they may perpendicularly mutually intersect.

[Method 34]

In the methods 22, 23, 24, and 25, the liquid crystal alignment direction control electrode formed in a lower layer of a slit of the transparent pixel electrode via the insulated film is simultaneously formed in the same layer at the time of formation of the scan signal wiring.

[Method 35]

In the methods 22 and 23, the liquid crystal alignment direction control electrode formed in a lower layer of a slit of the transparent pixel electrode via the insulated film is simultaneously formed in the same layer at the time of formation of the video signal wiring.

[Method 36]

In the method 22, two thin film transistor elements are required in one pixel in order to drive the one pixel and only one contact hole exists for electrically connecting a drain electrode of a thin film transistor element formed in a position where a scan signal wiring of n row and a video signal wiring of m column intersect with each other, and the transparent pixel electrode.

[Method 37]

In the methods 22 and 24, two thin film transistor elements are required in one pixel in order to drive the one pixel and two contact holes exist for electrically connecting a drain electrode of a thin film transistor element formed in a position where a scan signal wiring of (n−1) row and a video signal wiring of (m+1) column intersect with each other, and the liquid crystal alignment direction control electrode; and only one contact hole exists for electrically connecting a drain electrode of a thin film transistor element formed in a position where a scan signal wiring of n row and a video signal wiring of m column intersect with each other, and the transparent pixel electrode.

[Method 38]

In the methods 22, 23, 24, and 25, two thin film transistor elements are required in one pixel in order to drive the one pixel and one thin film transistor element is connected to the transparent pixel electrode, another remaining thin film transistor element is connected to the liquid crystal alignment direction control electrode, and the transparent pixel electrode and the liquid crystal alignment direction control electrode were overlapped via the insulated film to form a capacitance.

[Method 39]

In the methods 22, 23, 24, and 25, an intermediate electrode of a thin film transistor element connected with the liquid crystal alignment direction control electrode and having a double transistor structure and the transparent pixel electrode overlap via the insulated film to form a capacitance.

[Method 40]

In the methods 22 and 24, a transparent pixel electrode of n row and m column and a scan signal wiring of (n−1)th row may overlap one another via an insulated film to form a storage capacitor.

[Method 41]

In the methods 23 and 25, a transparent pixel electrode of n row and m column and a common electrode of n row may overlap one another via the insulated film to form a storage capacitor.

Use of the methods 1, 2, 3, 4, 5, 6, 7, and 8, enables anisotropic liquid crystal molecules having a negative dielectric constant in a state of being vertically aligned to tilt in a target direction, as shown in FIG. 2, FIG. 3, FIG. 5, and FIG. 6.

This makes unnecessary formation of a bump 5 that had to be formed on a color filter side substrate of a vertically aligned mode liquid crystal display, for motion directional control of liquid crystal molecules, as is shown in conventional method of FIG. 1. Moreover, this enables manufacture of a multi-domain vertically aligned mode liquid crystal display using a low cost color filter, as shown in FIG. 4.

Furthermore, only alignment layers 6 and 7 and anisotropic liquid crystal molecules having a negative dielectric constant 14 exist between a flat common electrode 4 in a color filter side, and a transparent pixel electrode 8 of an active matrix substrate as shown in FIG. 4, which completely solves problems, such as diffusion of contaminants from the bump 5, and remarkably improves reliability.

Additionally, even in case of failure in application of an alignment layer, omission of bump 5 enables simple and short time regeneration with oxygen plasma by a dry-asher. That is, in surface treatment process before alignment layer application, a plasma treatment with oxygen and argon using a dry-asher becomes usable, which remarkably decrease repelling and generation of pinhole in alignment layer application process.

Use of the methods 9, 10, 11, 12, and 13 may sharply improve effective use efficiency of polarizing plates, and thereby may reduce a cost of polarizing plates used for very large-sized liquid crystal displays. In addition, effective use efficiency of a polarizer having reflexibility comprising multilayer laminated body of two kinds of materials used for a backlight may also be sharply improved, which may also reduce cost of a backlight for very large-sized liquid crystals display. Moreover, possibility of control for a motion direction of liquid crystal molecules in four directions may provide wide viewing angles.

Use of the methods 14 and 15 enables manufacture of an active matrix substrate of the present invention using completely same processes, without changing manufacturing processes of conventional active matrix substrate.

In addition, since a liquid crystal alignment direction control electrode is arranged close to both sides of a video signal wiring and, as shown in FIG. 7, FIG. 8, FIG. 9, FIG. 10, FIG. 14, FIG. 16, FIG. 17, FIG. 18, and FIG. 25, a potential variation of a video signal wiring is easily shielded, which may completely control a cross talk generation in a vertical direction.

Use of the methods 16, 17, 18, 19, and 20 enables separate drive for every row of liquid crystal alignment direction control electrodes formed in a lower layer of slits of transparent pixel electrodes of each row, enabling uniform display by same conditions in all portions of upper part, central part, and lower part of a display screen.

Use of the methods 2, 4, 6, 8, and 21 enables anisotropic liquid crystal molecules having a negative dielectric constant in a state of being vertically aligned to tilt in a target direction, preventing generation of disclination to enable uniform half tone display. Additionally, use of the method of the present invention may sharply improve a late response speed, in a change to a half tone display from a black display, and to a half tone display from a white display, that has been a problem in a conventional vertically aligned mode liquid crystal display mode. In case of responding animated pictures, increase of a bias voltage impressed between a certain transparent pixel electrode and a liquid crystal alignment direction control electrode formed in a lower layer of slits of the transparent pixel electrode may further improve a speed of response. In the present invention, since a display approaches closer to black display and the above-mentioned bias voltage may become larger, a speed of response is improvable in all regions.

Use of the methods 22, 23, 24, 25, and 26 makes unnecessary formation of a bump 5 in a color filter (CF) substrate 3 for motion directional control of liquid crystal molecules as is shown in FIG. 1 of conventional methods, which may enable a simple color filter structure as is shown in FIG. 34, FIG. 40, FIG. 45, and FIG. 46 to realize low price. Furthermore, a problem of diffusion into liquid crystals of contaminant from bumps, which conventionally has been a problem, may completely be solved, and also a problem of unevenness in a half tone area induced from heterogeneity of shape of the bumps may completely be wiped away, leading to simultaneous realization of remarkable improvement in yield, and improvement in reliability.

Moreover, since a method of the present invention does not require bumps, in failure in application of an alignment layer, regeneration can be easily performed in a short time using oxygen plasma by a dry-asher. In surface treatment process before alignment layer application, a plasma treatment with oxygen and argon using a dry-asher becomes usable, which remarkably decrease repelling and generation of pinhole in alignment layer application process.

Use of the methods 22, 23, 24, 25, 26, 27, 28, 29, and 39 makes unnecessary special drive ICs for driving liquid crystal alignment direction control electrodes, and contact button parts, which may realize low price products. Furthermore, use of a double transistor structure, or an offset transistor structure may reduce leakage current. Since electric field is dispersed and concentration is prevented, even if a large voltage is impressed between a source and a drain electrode of a transistor, shift of a threshold voltage (Vth) of thin film transistors is reduced, leading to realization of a reliable liquid crystal panel. Increase in a channel length ($L_2$) of thin film transistor elements connected to liquid crystal alignment direction control electrodes may reduce a leakage current.

Use of the methods 22, 23, 24, 25, 26, 30, 31, 32, and 33 may sharply improve effective use efficiency of a polarizing plate compared with conventional liquid crystal panels in TN (Twisted Nematic) mode, which may reduce a cost of a polarizing plate used in very large-sized liquid crystal displays. In addition, effective use efficiency of a polarizer having reflexibility comprising multilayer laminated body of two kinds of materials (brand name: DBEF by 3M Inc.) used for a backlight may also be sharply improved, which may also reduce a cost of a backlight for very large-sized liquid crystal displays.

Since use of the methods 22, 23, 24, 25, 34, and 35 enables manufacture of active matrix liquid crystal panels of the present invention using same processes, without changing most of conventional manufacturing processes of an active matrix substrate and manufacturing processes of a color filter in TN mode, leading to demonstration of predominancy in respect of yield and low cost.

Use of the methods 22, 23, 24, 25, 26, 36, 37, and 38 may realize vertically aligned mode liquid crystal display having a simplest structure. This method does not have excessive and unnecessary thin film transistor elements in one pixel, but an aperture ratio may be set large in the highest, being able to realize a bright display.

Since use of the methods 22, 23, 24, 25, 26, 27, 28, 29, and 39 enables impression of a large voltage between a transparent pixel electrode and a liquid crystal alignment direction control electrode, deformation of an electric field for driving vertically aligned liquid crystal molecules may be set significantly large. This may improve a rate of reaction of the liquid crystal molecules, and even in moving image displaying, a flow of image and a residual image phenomenon are scarcely generated.

When a scanning line of n row is set as OFF, use of the methods 22, 23, 24, 25, 40, and 41 may decrease a potential variation of a transparent pixel electrode, and reduce flicker.

Use of the methods 22, 23, 24, 25, and 26 may provide vertically aligned liquid crystal molecules with alignment almost perpendicular in all areas at the time of black display, which reduces light leakage more than in conventional methods using bumps, and may realize completely uniform black display also in a dark room.

BRIEF DESCRIPTION OF THE DRAWINGS

FIG. 2 shows a motion direction of molecules of anisotropic liquid crystal having a negative dielectric constant vertically aligned by an electric field formed with a flat electrode and a slit electrode;

FIG. 3 shows a motion direction of molecules of anisotropic liquid crystal having a negative dielectric constant vertically aligned by an electric field formed with a flat electrode, a slit electrode, and liquid crystal alignment direction control electrode;

FIG. 51 shows a description of a flow of five-photo-mask-process for a multi-domain vertically aligned mode liquid crystal panel manufacturing of the present invention;

FIG. 52 shows a description of a flow of four-photo-mask-process for a multi-domain vertically aligned mode liquid crystal panel manufacturing of the present invention;

FIG. 53 shows a description of a flow of five-photo-mask-process for a multi-domain vertically aligned mode liquid crystal panel manufacturing of the present invention;

FIG. 54 shows a description of a flow of four-photo-mask-process for a multi-domain vertically aligned mode liquid crystal panel manufacturing of the present invention;

FIG. 55 shows a description of a flow of five-photo-mask-process for a multi-domain vertically aligned mode liquid crystal panel manufacturing of the present invention;

FIG. 56 shows a description of a flow of four-photo-mask-process for a multi-domain vertically aligned mode liquid crystal panel manufacturing of the present invention;

FIG. 57 shows a description of a flow of five-photo-mask-process for a multi-domain vertically aligned mode liquid crystal panel manufacturing of the present invention;

FIG. 58 shows a description of a flow of four-photo-mask-process for a multi-domain vertically aligned mode liquid crystal panel manufacturing of the present invention;

DETAILED DESCRIPTION OF THE PREFERRED EMBODIMENTS

Hereinafter, with reference to accompanying drawings, description about preferred Example of the present invention will be provided.

Example 1

Figure 4:
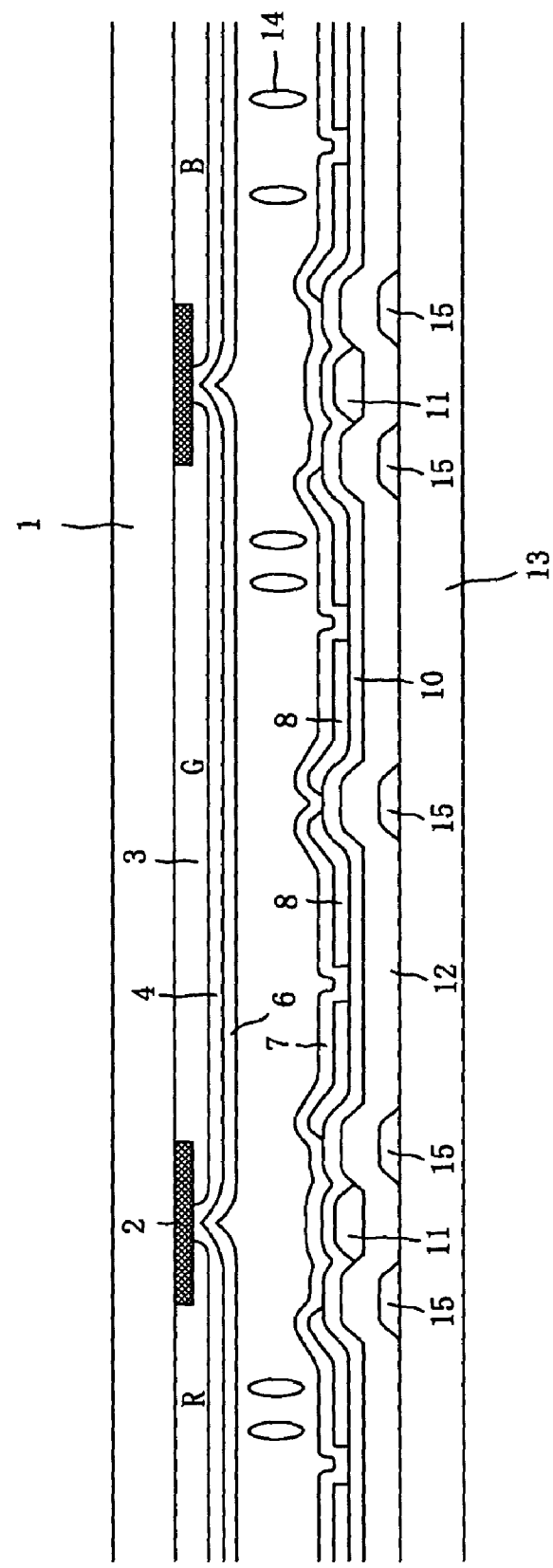
FIG. 4 shows a cross section structural figure of a multi-domain vertically aligned mode liquid crystal panel of the present invention.
Figure 5:
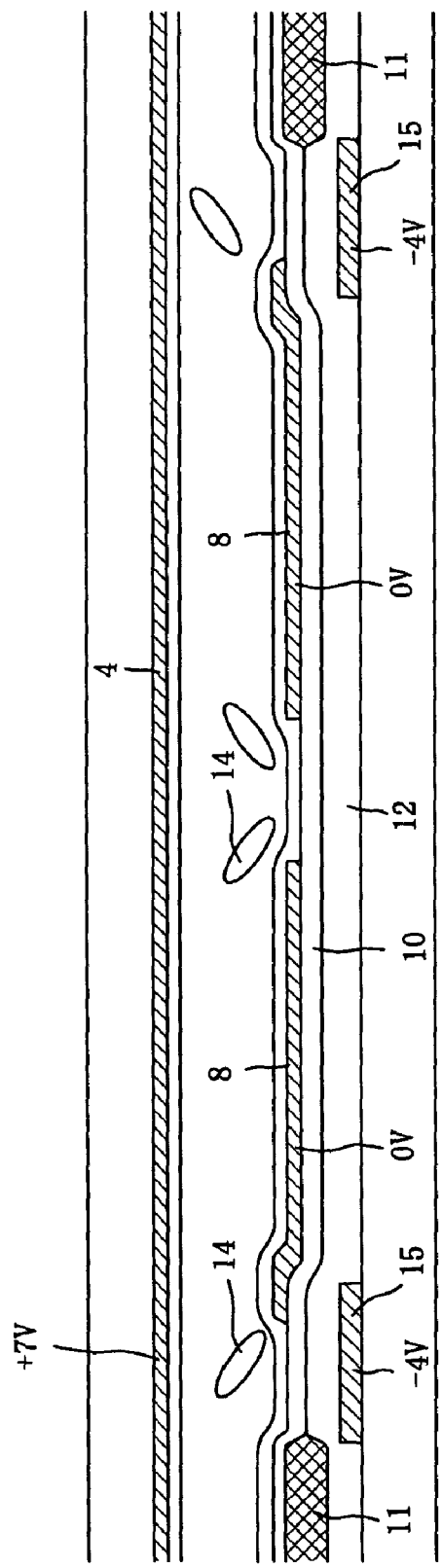
FIG. 5 shows a drive principle cross section structural figure of a multi-domain vertically aligned mode liquid crystal panel of the present invention (when a pixel electrode has negative data)
Figure 6:
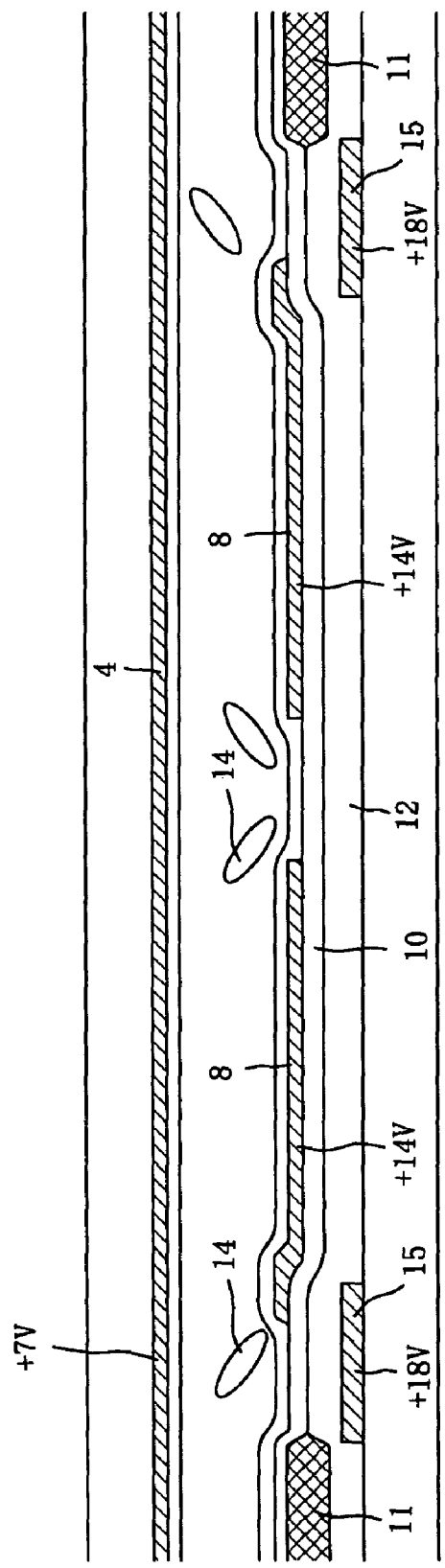
FIG. 6 shows a drive principle cross section structural figure of a multi-domain vertically aligned mode liquid crystal panel of the present invention (when a pixel electrode has positive data)

FIGS. 4, 5, and 6 show sectional views of Example 1 of the present invention. A color filter substrate 1 has a flat transparent common electrode 4, and an active matrix substrate 13 is arranged facing the substrate 1 and in parallel.

In the active matrix substrate 13, firstly, a scan signal wiring 17 and a liquid crystal alignment direction control electrode 15 are simultaneously formed in the same layer, and subsequently, a gate insulator film 12, an amorphous silicone layer, and an n$^+$ amorphous silicone layer for ohmic contacts are deposited.

After formation of a thin film transistor element part, a video signal wiring 11 and a drain electrode are formed.

Figure 7:
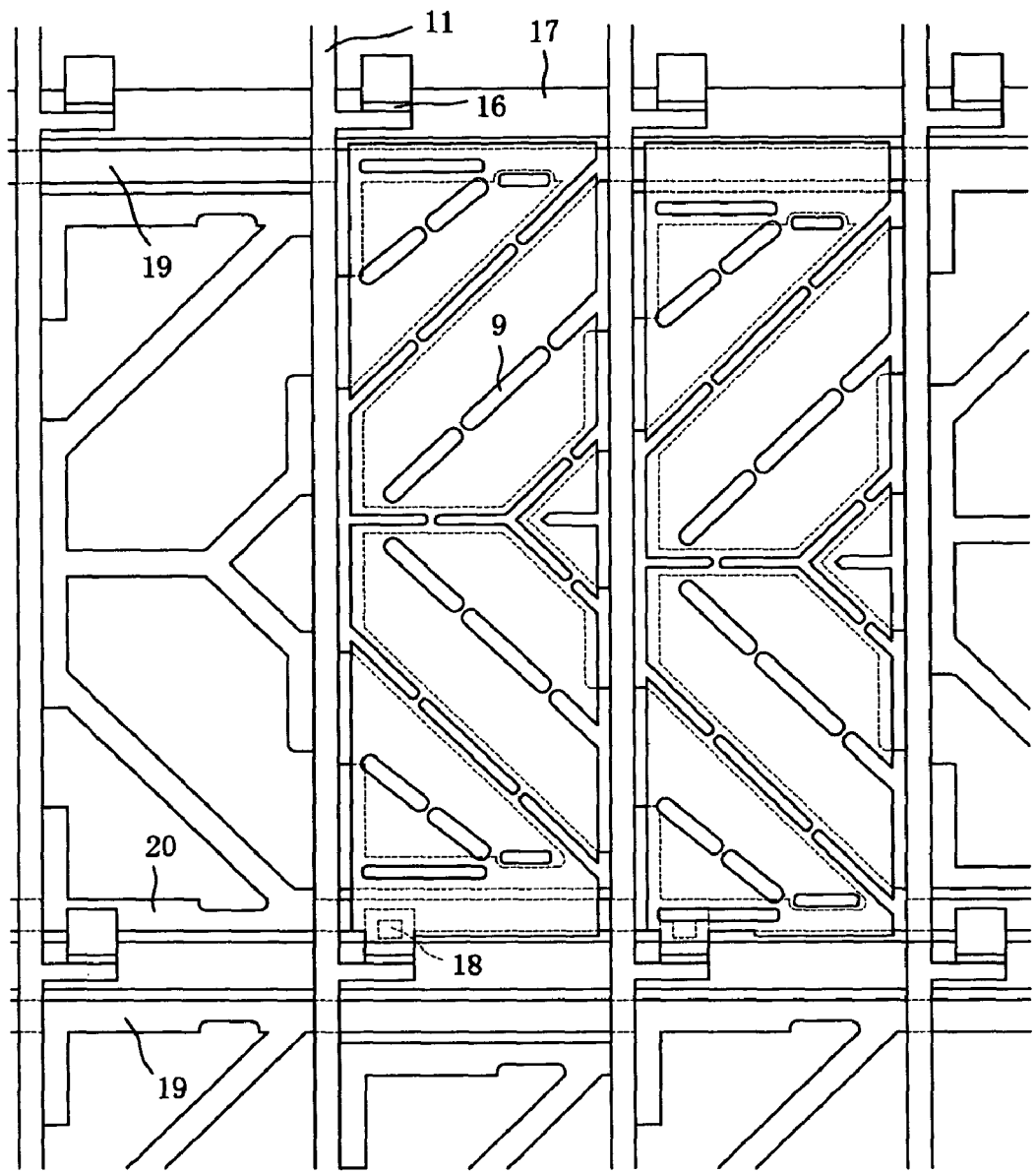
FIG. 7 shows a plane structural figure of a multi-domain vertically aligned mode liquid crystal panel of the present invention.

Next, a contact hole 18 is formed in a portion of a drain electrode after deposition of a passivation film 10, and then a transparent electric conductive film is deposited. In the transparent electric conductive film, as shown in FIG. 7, some slits are formed and each pixel is completely separated for every pixel to provide a transparent pixel electrode 8.

An electrode structure of the present invention has the following special features: there exist one another in one pixel a portion in which a long and slender slit 9, or a circular or polygonal hole is formed facing a flat transparent common electrode 4 on a color filter side, as shown in FIG. 2; and a portion in which a long and slender slit 9 and a liquid crystal alignment direction control electrode 15 having almost the same shape as the slit, and having a larger dimension than a dimension of the slit are formed facing the flat transparent common electrode 4 on a color filter side, as shown in FIG. 3.

As shown in FIG. 5 and FIG. 6, these two kinds of electrode structures control to tilt correctly anisotropic liquid crystal molecules having a negative dielectric constant 14 in two directions, four directions, or many directions, that is, in target directions within one pixel. Distribution of equipotential lines is shown in FIG. 2 and FIG. 3.

As shown in FIG. 4, FIG. 5, and FIG. 6, in Example 1, the liquid crystal alignment direction control electrodes 15 are arranged close to both of right and left sides of a video signal wiring 11. Since the liquid crystal alignment direction control electrode 15 shields a signal voltage variation of the video signal wiring 11, effect of the video signal wiring 11 is not transmitted to the transparent pixel electrode 8. As compared with the conventional vertically aligned mode liquid crystal displays shown in FIG. 1, a vertically aligned mode liquid crystal display of the present invention of FIG. 4 generates very little vertical stroke. Since a width of BM (shading film (Black Matrix)) 2 of a color filter may also be set more narrowly than in conventional products, a vertically aligned mode liquid crystal display with a large aperture ratio can be realized.

Example 2

Figure 30:
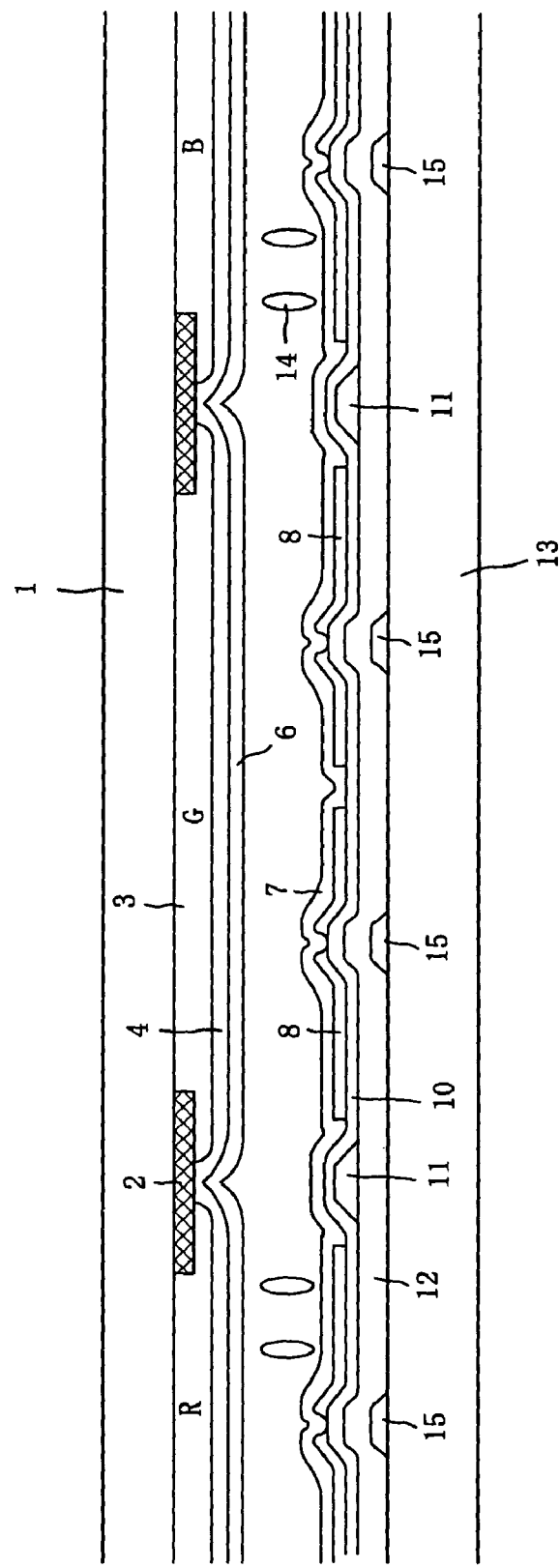
FIG. 30 shows a cross section structural figure of a multi-domain vertically aligned mode liquid crystal panel of the present invention.
Figure 31:
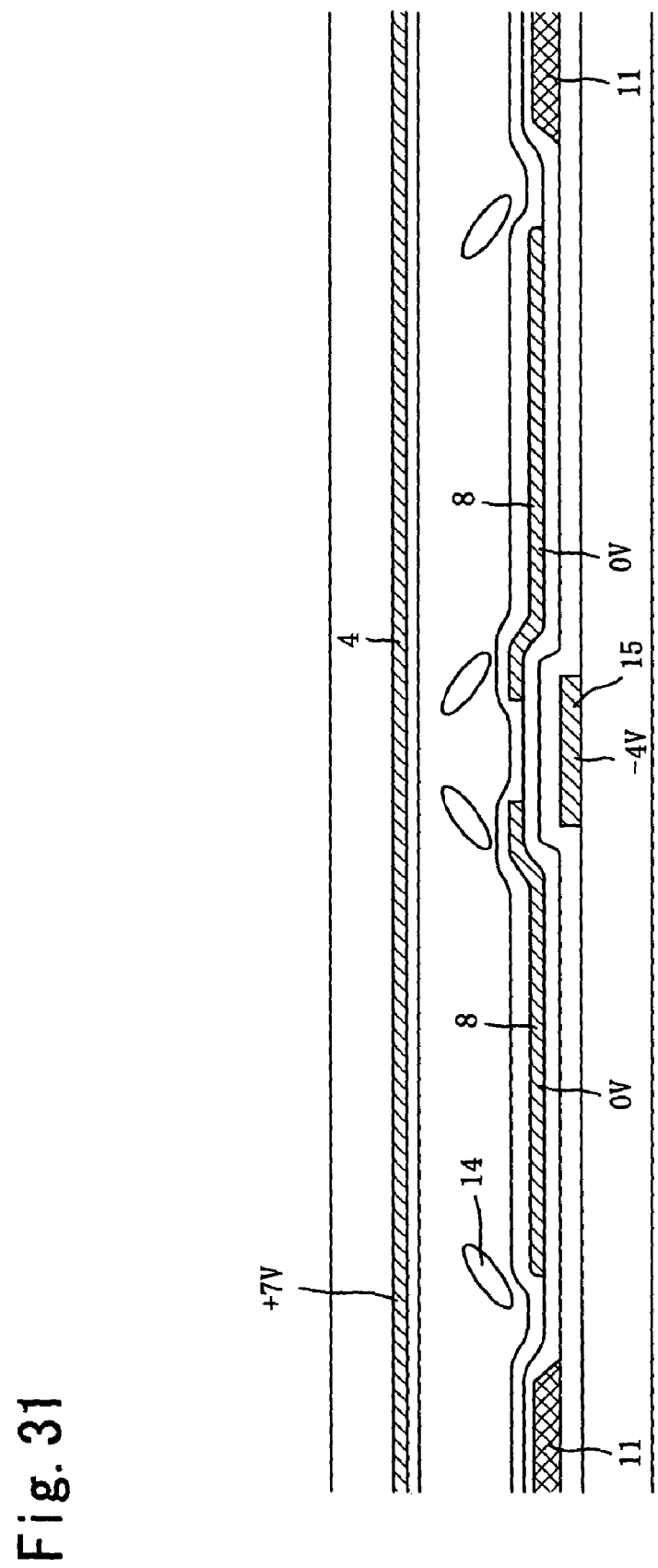
FIG. 31 shows a drive principle cross section structural figure of a multi-domain vertically aligned mode liquid crystal panel of the present invention (when a pixel electrode has negative data)
Figure 32:
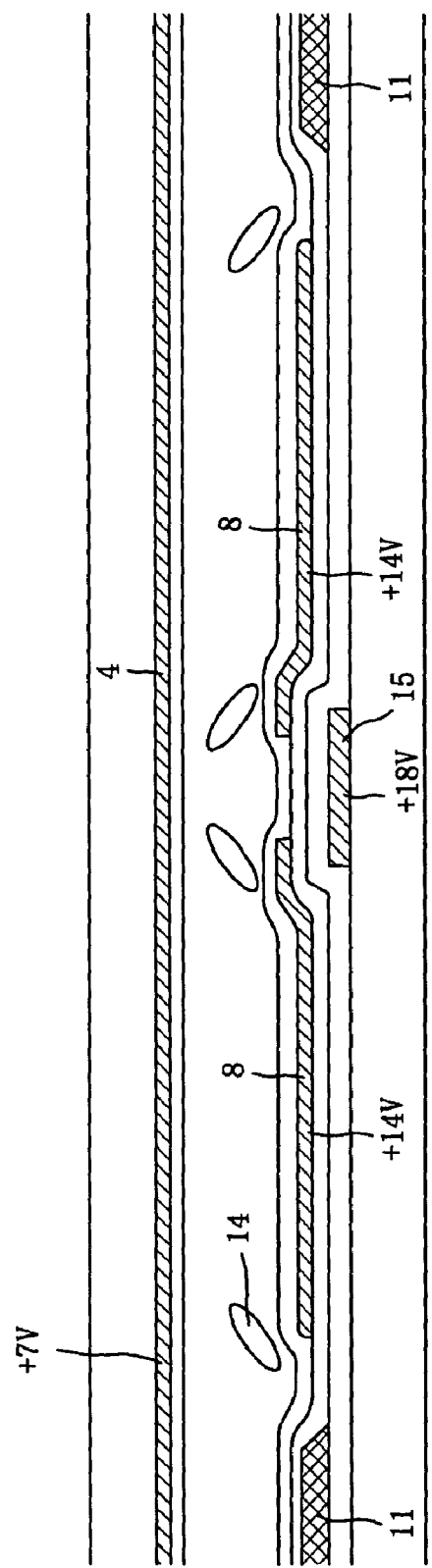
FIG. 32 shows a drive principle cross section structural figure of a multi-domain vertically aligned mode liquid crystal panel of the present invention (when pixel electrode has positive data)

FIG. 30, FIG. 31, and FIG. 32 show sectional views of Example 2 of the present invention. In fundamental aspect, almost the same structure as in Example 1 is used for Example 2. An electrode structure of the Example has special features that two kinds of electrode structures as shown in FIG. 2 and FIG. 3 exist together in one pixel.

As shown in FIG. 30, FIG. 31, and FIG. 32, since a video signal wiring 11 is only sandwiched by transparent pixel electrodes 8 from both of right and left sides, capacitance of a video signal wiring 11 can be designed minimal, and accordingly, even if a resistance of the video signal wiring 11 is high, a problem of signal delay is hard to be generated.

Figure 24:
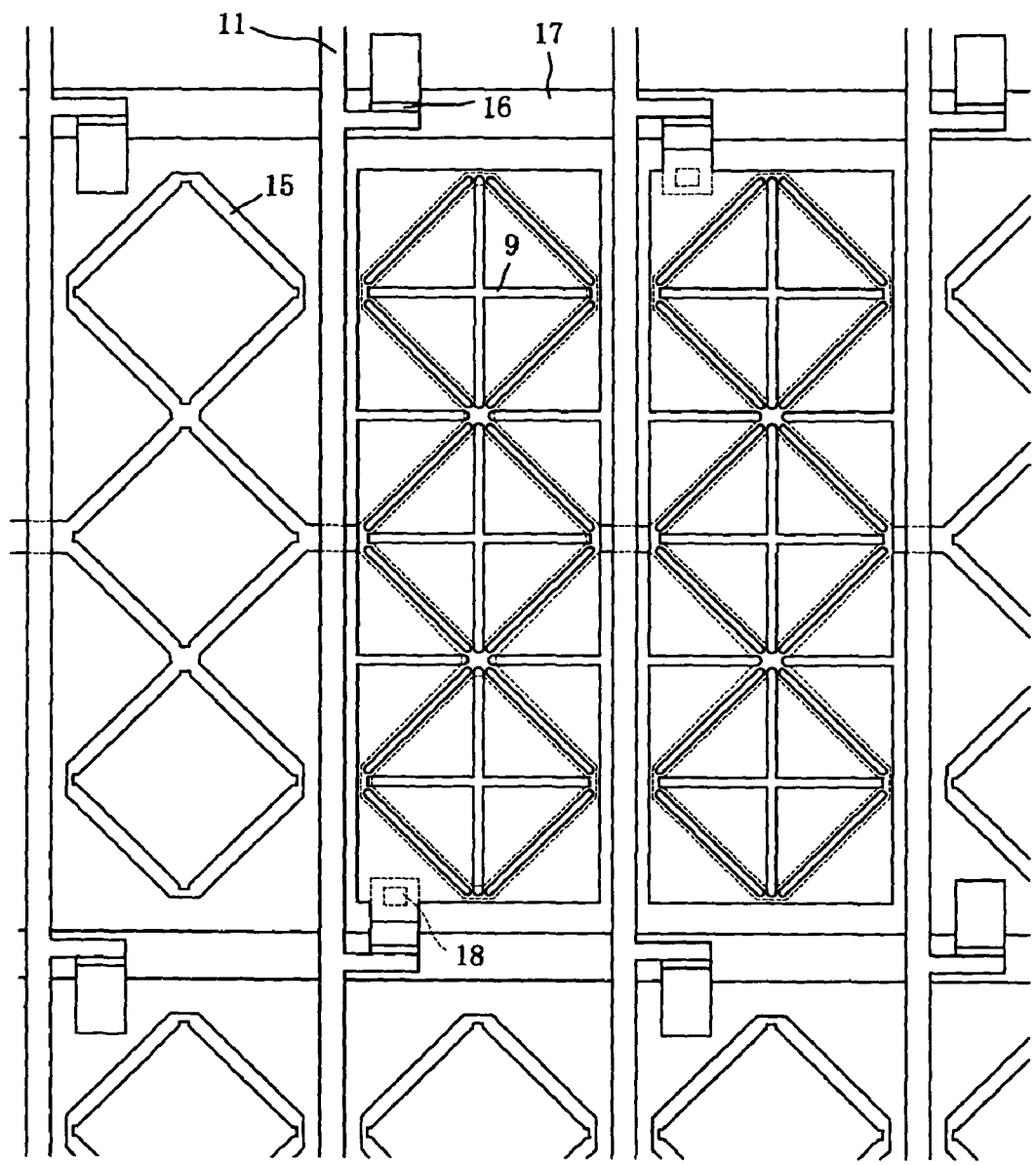
FIG. 24 shows a plane structural figure of a multi-domain vertically aligned mode liquid crystal panel of the present invention.

FIG. 24 shows a plan view of Example 2. Only one row of liquid crystal alignment direction control electrode 15 exists in one pixel. Adjacent transparent pixel electrodes 8 are connected to a thin film transistor element 16 controlled by a different scan signal wiring 17, respectively.

As a plan view of FIG. 24 shows, since an area in which the liquid crystal alignment direction control electrode 15 exists close to a scan signal wiring 17 is small, even if the scan signal wiring 17 and the liquid crystal alignment direction control electrode 15 are simultaneously formed in the same layer, a probability that a defect in which electric short-circuit is provided by a connection of each other will occur is extremely small.

Figure 28:
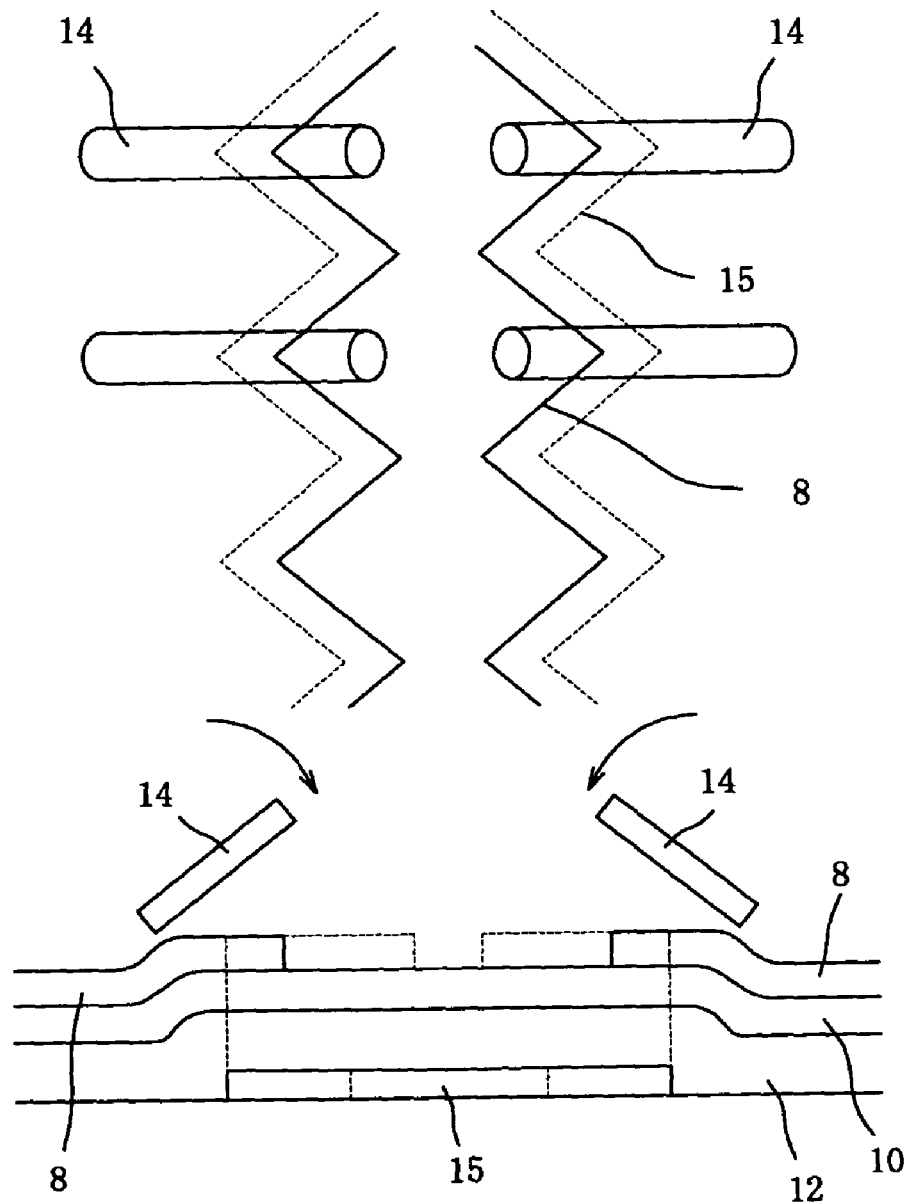
FIG. 28 shows a plan view and a cross section structural figure of slits formed in a liquid crystal alignment direction control electrode and a transparent pixel electrode of the present invention.
Figure 29:
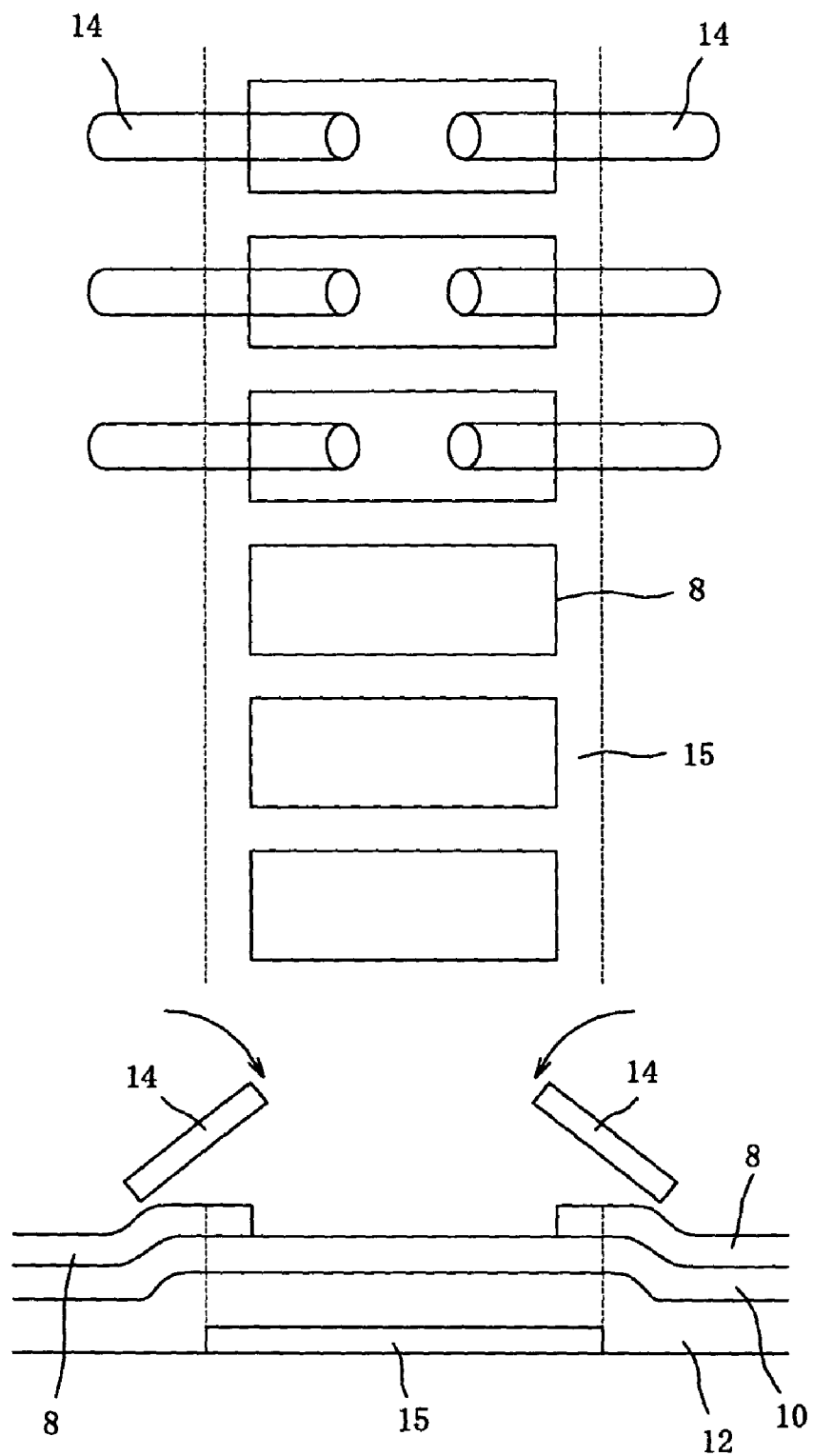
FIG. 29 shows a plan view and a cross section structural figure of slits formed in a liquid crystal alignment direction control electrode and a transparent pixel electrode of the present invention.

Slits 9 are formed in a parallel direction and a perpendicular direction relative to the scan signal wiring 17, and slits forming a group with a liquid crystal alignment direction control electrode 15 are extended in angle directions of ±45 degrees relative to the scan signal wiring direction. Slits forming a group with a liquid crystal alignment direction control electrode may have a form like connected diamond-shapes, and may have a form like squares located in a line as shown in FIG. 28 and FIG. 29.

Example 3

FIG. 7 shows a plan view of Example 3 of the present invention. The Example has a structure where two kinds of structures, a structure shown in a cross section structural figure of Example 1 and a structure shown in a cross section structural figure of Example 2, are mixed inside one pixel. In one pixel, two rows of liquid crystal alignment direction control electrodes of an upper liquid crystal alignment direction control electrode 19 and a lower liquid crystal alignment direction control electrode 20 are arranged, each potential is set as positive electrode potential and negative electrode potential on the basis of a potential of a countering flat common electrode 4 of a color filter side substrate. Adjacent transparent pixel electrodes 8 are controlled by a different liquid crystal alignment direction control electrode, respectively.

Figure 11:
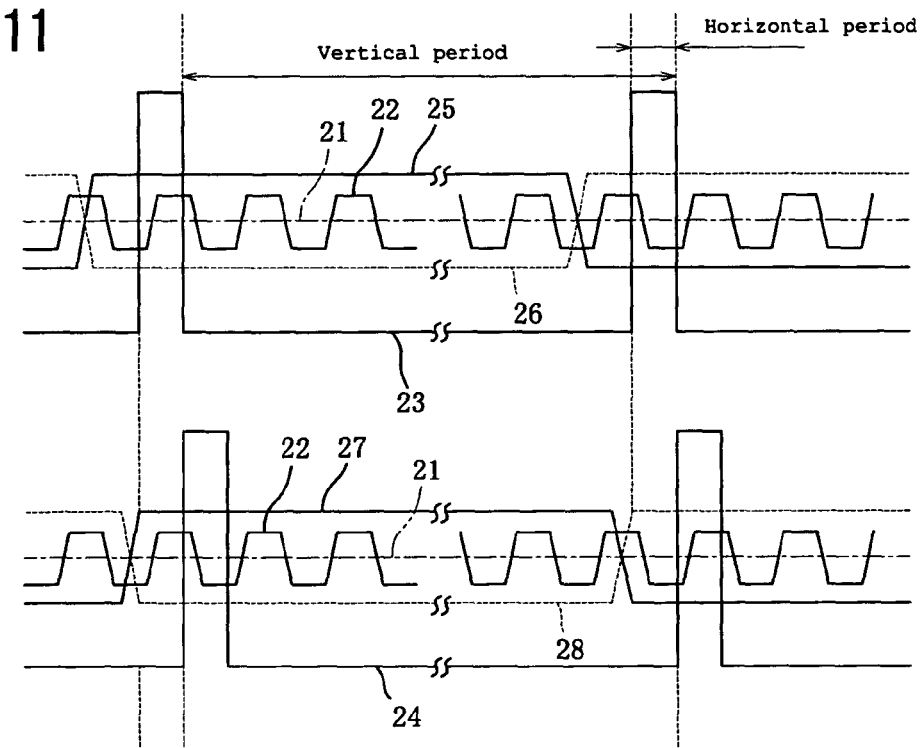
FIG. 11 shows a waveform chart of a voltage impressed to a thin film transistor element of an odd number column of (n)th row and (n+1)th row of a multi-domain vertically aligned mode liquid crystal panel of the present invention.
Figure 12:
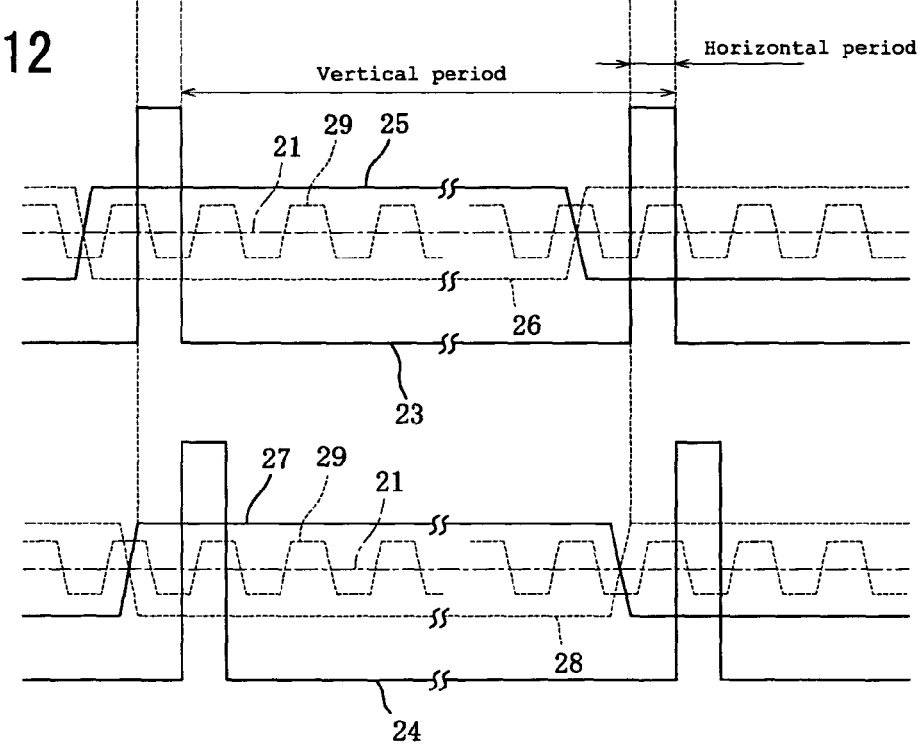
FIG. 12 shows a waveform chart of a voltage impressed to a thin film transistor element of an even number column of (n)th row and (n+1)th row of a multi-domain vertically aligned mode liquid crystal panel of the present invention.

FIG. 11 and FIG. 12 show a transparent common electrode potential 21, a video signal wiring waveform 22 of odd number column, a scanning line signal waveform 23 of n row, a scanning line signal waveform 24 of (n+1) row, an upper liquid crystal alignment direction control electrode signal waveform 25 of n row, a lower liquid crystal alignment direction control electrode signal waveform 26 of n row, an upper liquid crystal alignment direction control electrode signal wave form 27 of (n+1) row, a lower liquid crystal alignment direction control electrode signal wave form 28 of (n+1) row, and a video signal wiring waveform 29 of even number column.

As shown in FIG. 11 and FIG. 12, when a signal having a positive polarity is supplied to a transparent pixel electrode 8, a potential of a liquid crystal alignment direction control electrode formed via an insulator film 12 in a lower layer of a slit 9 of the transparent pixel electrode 8 has a positive polar potential higher than a potential of the transparent pixel electrode 8, and when a signal having a negative polarity is supplied to the transparent pixel electrode 8, a potential of a liquid crystal alignment direction control electrode formed via an insulator film 12 in a lower layer of a slit 9 of the transparent pixel electrode 8 has a negative polar potential lower than a potential of the transparent pixel electrode 8.

Transparent pixel electrode 8, and liquid crystal alignment direction control electrodes 19 and 20 of two rows arranged in one pixel have exchanged polarity, respectively, every vertical period.

As shown in FIG. 7, slits 9 formed in a transparent pixel electrode 8 and liquid crystal alignment direction control electrodes 19 and 20 arranged in a lower layer of the slit are arranged in angles of ±45 degrees relative to a direction of a scan signal wiring 17.

In an upper half and a lower half in one pixel, the slit 9 and the liquid crystal alignment direction control electrodes 19 and 20 of a lower layer of the slit, respectively, are arranged alternately and almost in parallel each other. Special feature is that a liquid crystal alignment direction control electrode is arranged in a central part of the pixel so as to divide the upper half and the lower half. Polarizing plates are arranged so that polarization axes may become parallel and perpendicular to the scan signal wiring 17 and may have a relationship of intersecting mutually perpendicular, in an exterior of the liquid crystal cell.

Example 4

Figure 8:
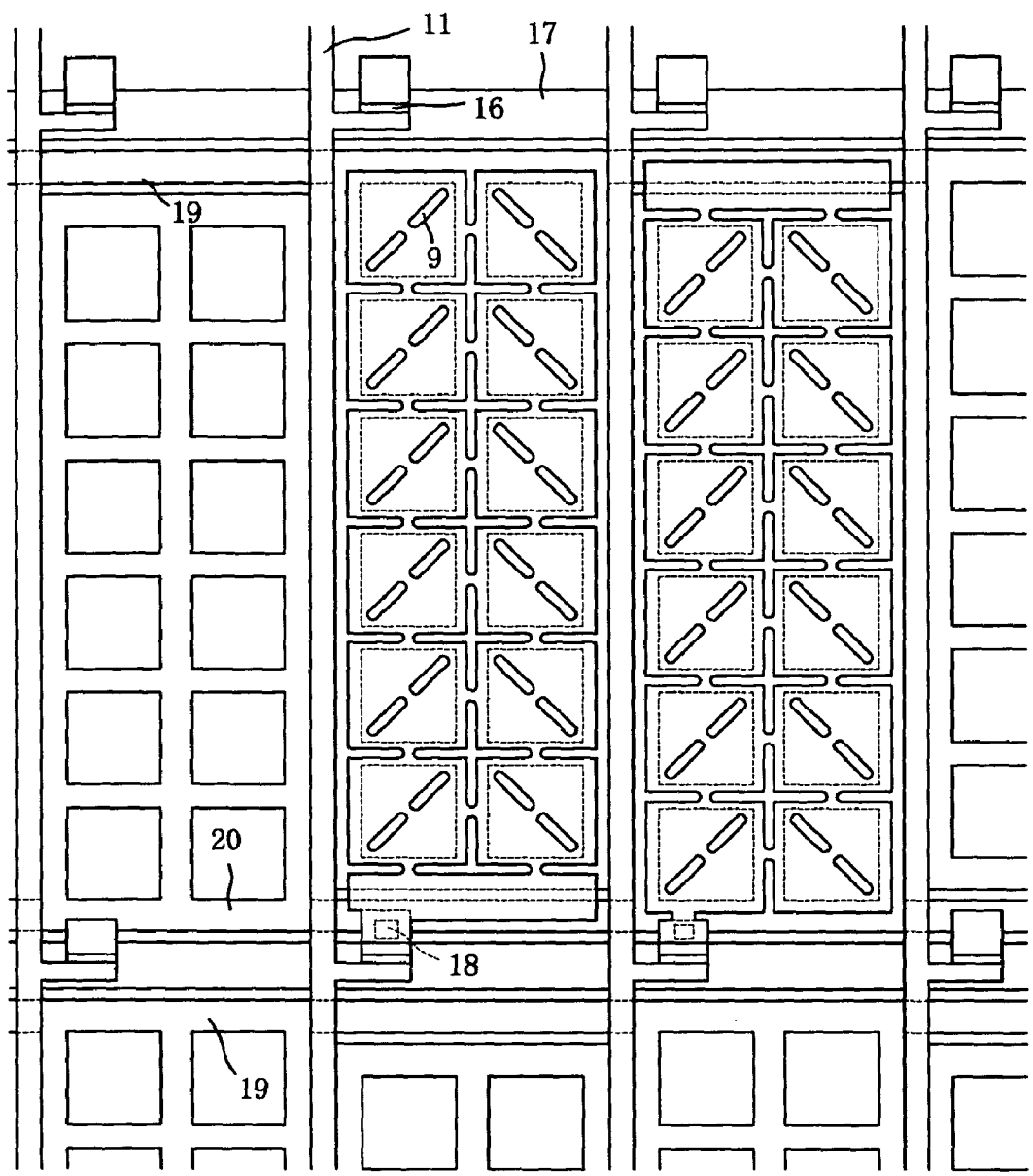
FIG. 8 shows a plane structural figure of a multi-domain vertically aligned mode liquid crystal panel of the present invention.
Figure 9:
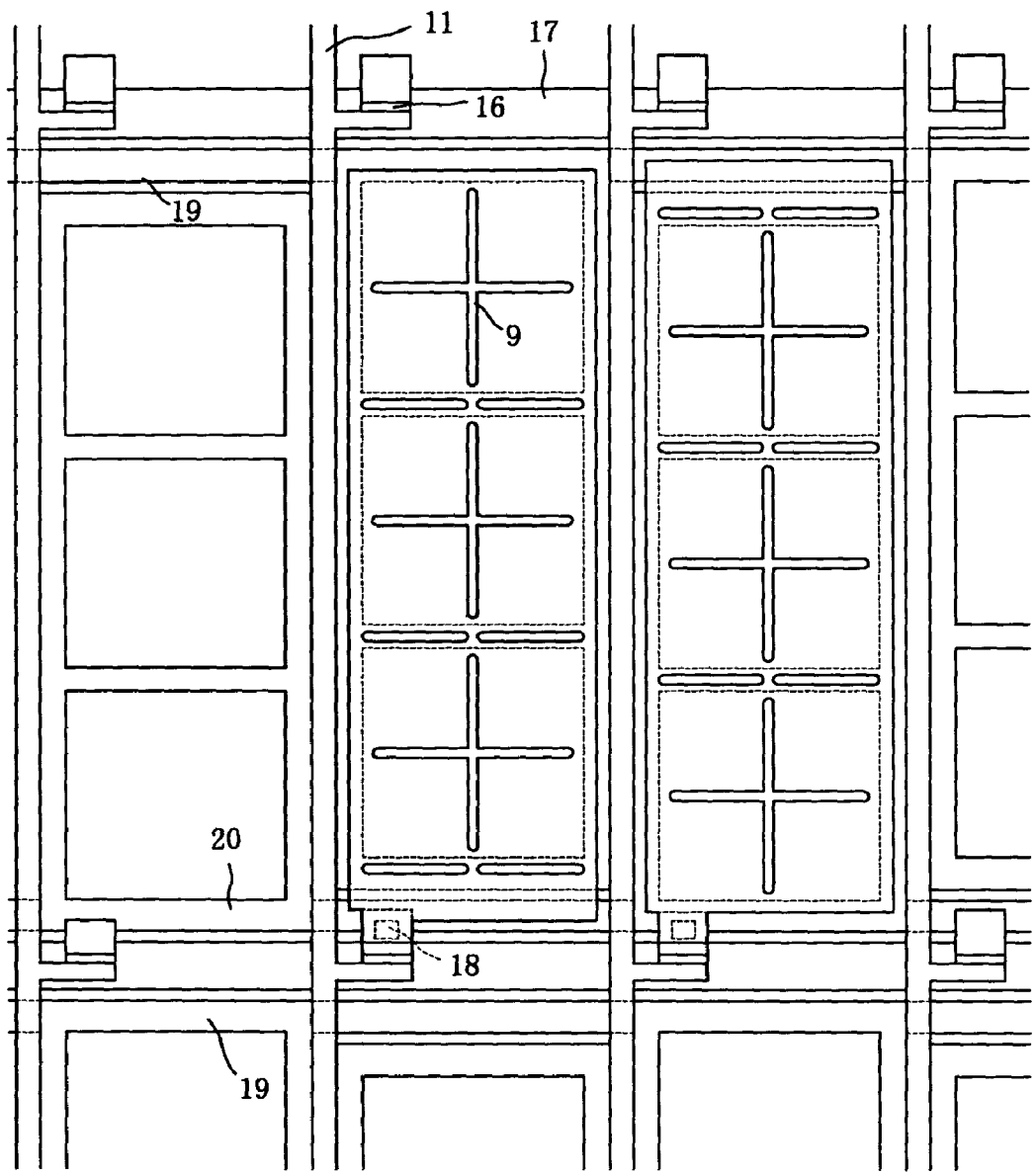
FIG. 9 shows a plane structural figure of a multi-domain vertically aligned mode liquid crystal panel of the present invention.
Figure 10:
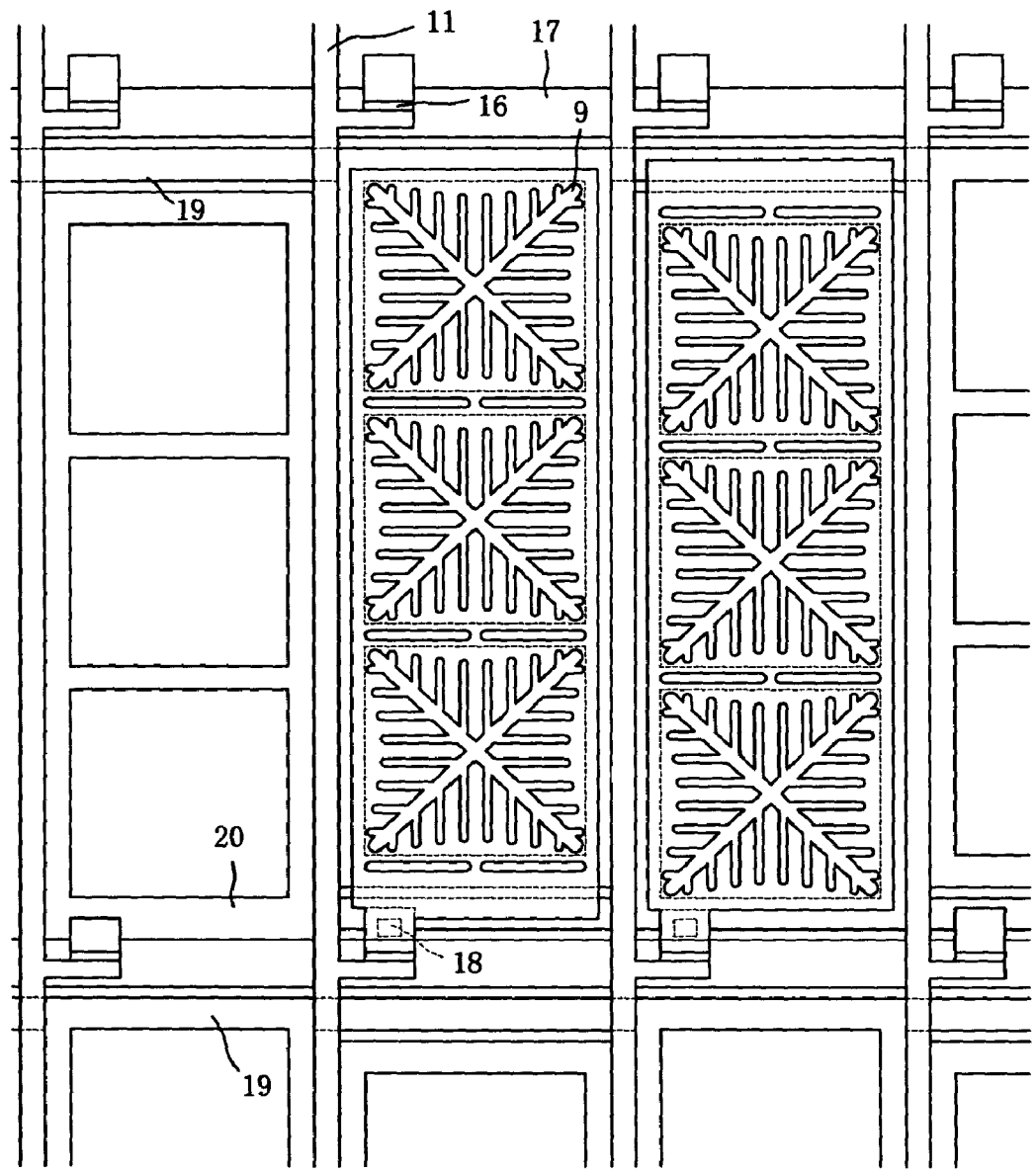
FIG. 10 shows a plane structural figure of a multi-domain vertically aligned mode liquid crystal panel of the present invention.

FIG. 8, FIG. 9, and FIG. 10 show a plan view of Example 4 of the present invention. This Example adopts a cross section structural figure of Example 1, and liquid crystal alignment direction control electrodes 19 and 20 enclose periphery of a transparent pixel electrode 8, which makes it difficult that the transparent pixel electrode 8 is influenced by a potential variation of a video signal wiring 11, and thus hardly generates a vertical cross talk. Moreover, since the liquid crystal alignment direction control electrodes 19 and 20 and the transparent pixel electrode 8 are overlapped, a width of a shading film 2 of a color filter (BM) may be narrowed, and an aperture ratio can be increased.

In addition, liquid crystal alignment direction control electrodes 19 and 20 of two rows exist in one pixel, and thereby almost the same system as the drive system in Example 3 may be used.

In FIG. 8, slits 9 formed in the transparent pixel electrode 8 are arranged in directions of ±45 degrees to a direction of the scan signal wirings. In FIG. 9, slits 9 formed in the transparent pixel electrode 8 are arranged in two directions perpendicular and horizontal to a direction of the scan signal wirings. In FIG. 10, fine notches of slit are formed in motion directions of liquid crystal molecules in the transparent pixel electrode 8. Arrangement of polarizing plates may be completely the same arrangement as an arrangement in Example 3.

Example 5

Figure 14:
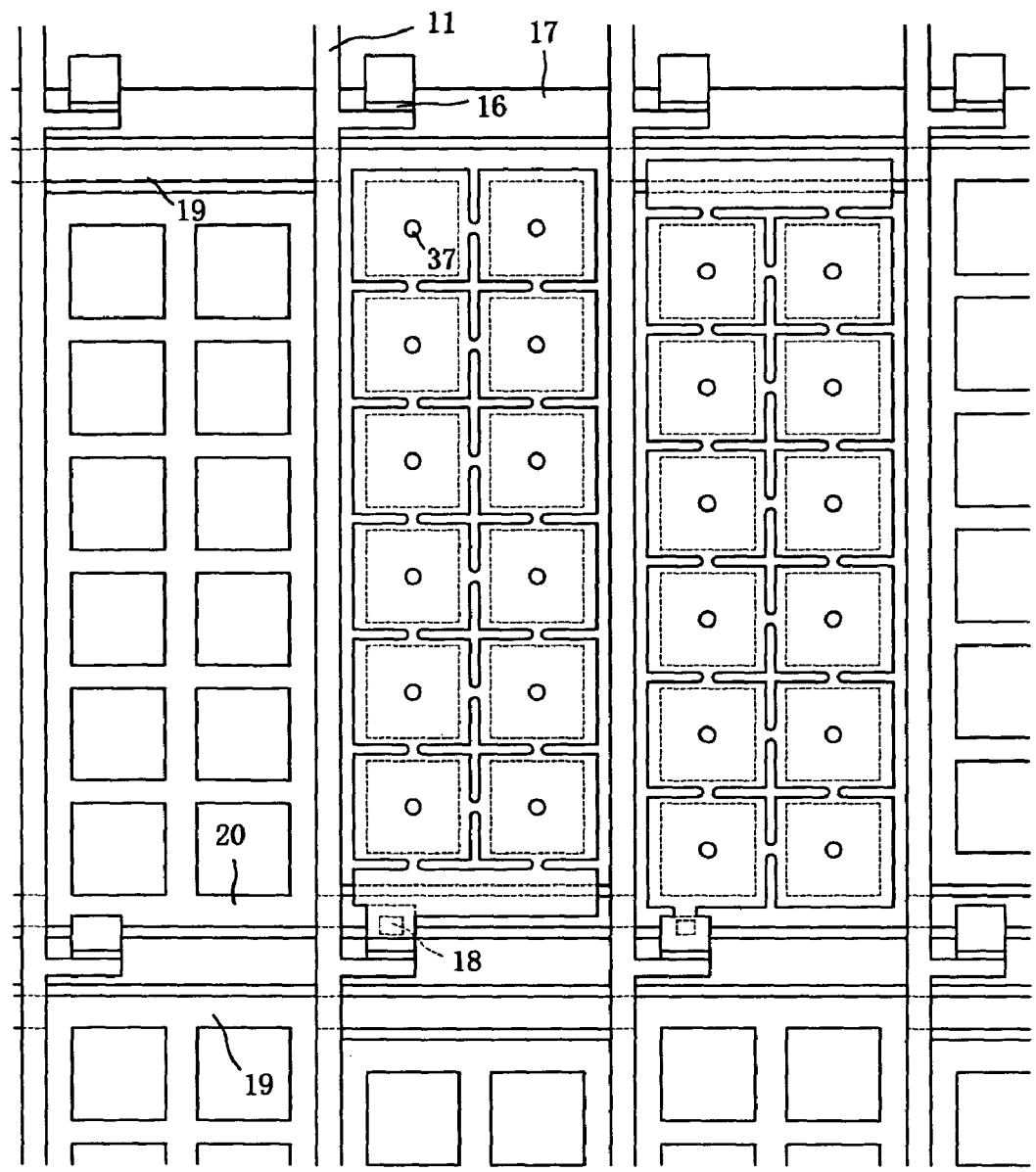
FIG. 14 shows a plane structural figure of a vertically aligned mode liquid crystal panel of the present invention.

FIG. 14 shows a plan view of Example 5 of the present invention. This Example adopts a cross section structural figure of Example 1, and liquid crystal alignment direction control electrodes 19 and 20 enclose periphery of a transparent pixel electrode 8, which makes it difficult that the transparent pixel electrode 8 is influenced by a potential variation of a video signal wiring 11, and thus hardly generates a vertical cross talk. This Example differs from Example 4 in a point that many circular holes 37 are formed in the transparent pixel electrode 8. As long as they are holes, polygonal forms may be of any kinds other than a circular form. Liquid crystal alignment direction control electrodes 19 and 20 of two rows exist in one pixel, and the same drive system as in Example 3 may be used. Arrangement of polarizing plates may be the same as that in Example 3.

Example 6

Figure 16:
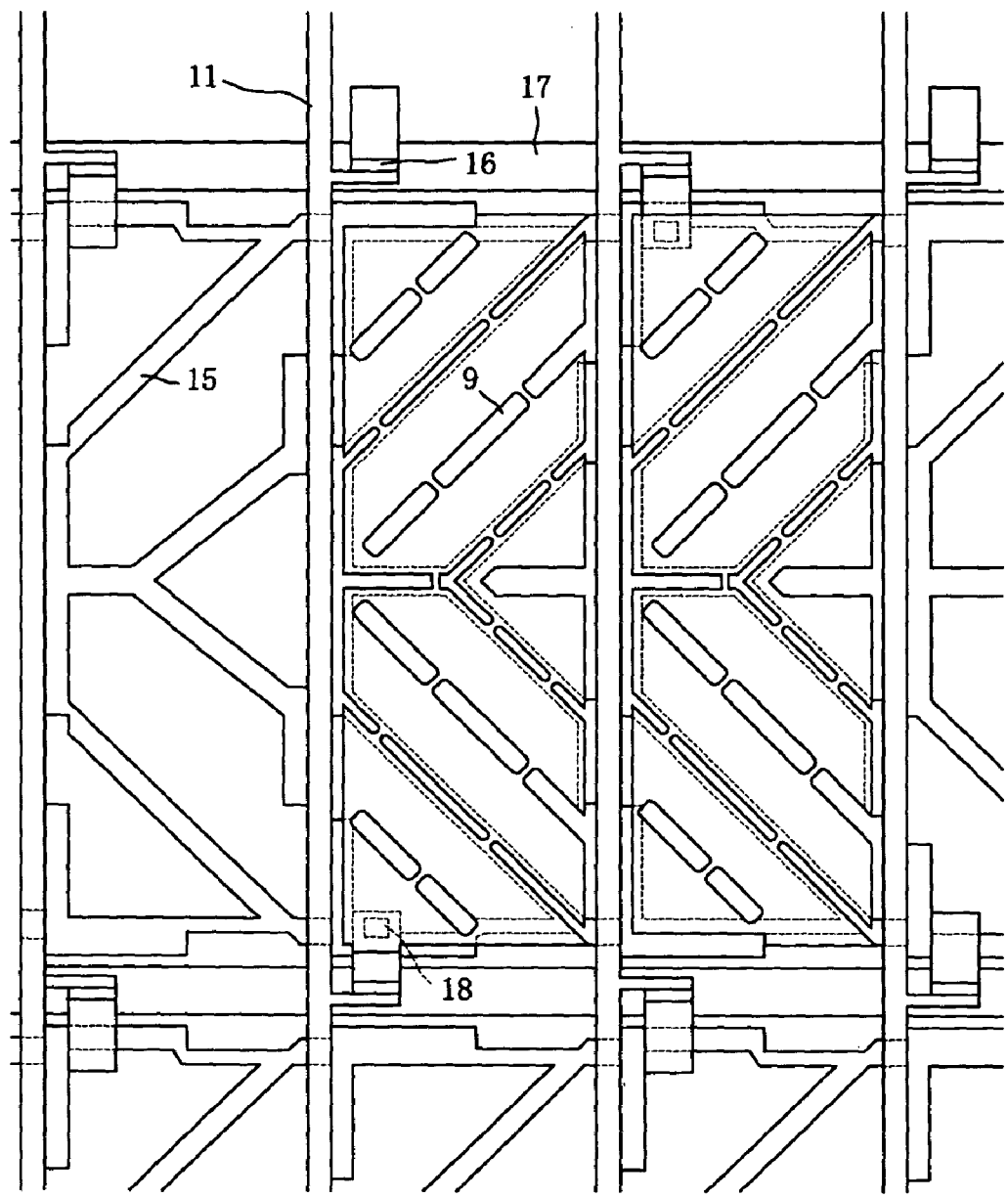
FIG. 16 shows a plane structural figure of a multi-domain vertically aligned mode liquid crystal panel of the present invention.

FIG. 16 shows a plan view of Example 6 of the present invention. This Example has a structure where two kinds, a cross section structural figure of Example 1 and a cross section structural figure of Example 2, are mixed inside one pixel. A liquid crystal alignment direction control electrode of one row is arranged in one pixel, and adjacent transparent pixel electrodes 8 are connected, respectively, with a thin film transistor element 16 currently controlled by a different scan signal wiring 17. Forms of a long and slender slit 9 formed in the transparent pixel electrode 8 and of the liquid crystal alignment direction control electrode 15 formed in a lower layer of the slit via an insulator film 12 are almost the same as that shown in Example 3, and are arranged to make angles of ±45 degrees to the direction of scan signal wiring 17.

In an upper half and a lower half in one pixel, the slit 9 and the liquid crystal alignment direction control electrode 15 formed in a lower layer of the slit, respectively, are arranged alternately and almost in parallel each other. A liquid crystal alignment direction control electrode 15 is arranged that divides an upper half and a lower half in a central part of a pixel. Polarizing plates are arranged so that polarization axes may become parallel and perpendicular to the scan signal wiring 17 and may have a relationship of intersecting mutually perpendicular, in an exterior of the liquid crystal cell.

In all Examples of the present invention, a transparent pixel electrode 8, and liquid crystal alignment direction control electrodes 15, 19, and 20 overlap mutually via the insulator film 12, and form an additional capacity (storage capacitor). When a larger additional capacity is required, an overlapping area may be set larger. When a smaller additional capacity is required, an overlapping area may be set smaller. In an usual range, an overlapping width of about 2 micron (2 micrometers) provides a sufficient additional capacity.

Figure 22:
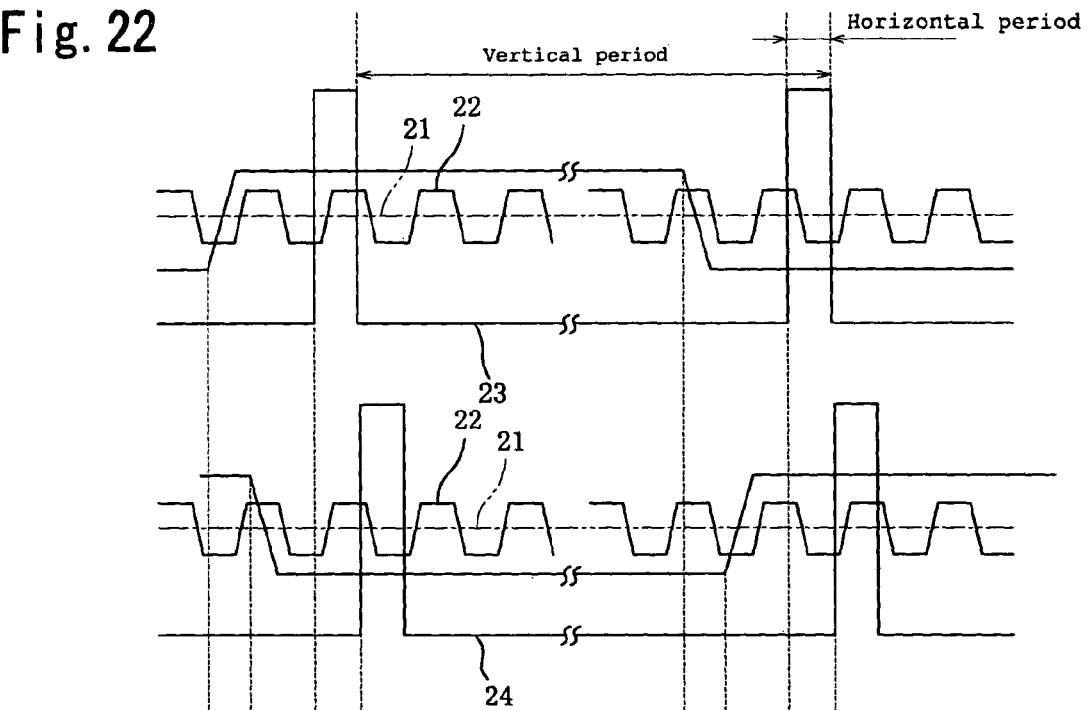
FIG. 22 shows a waveform of a voltage impressed to a thin film transistor element corresponding to a pixel of an odd number column of (n)th row and of (n+1)th row of a multi-domain vertically aligned mode liquid crystal panel of the present invention.
Figure 23:
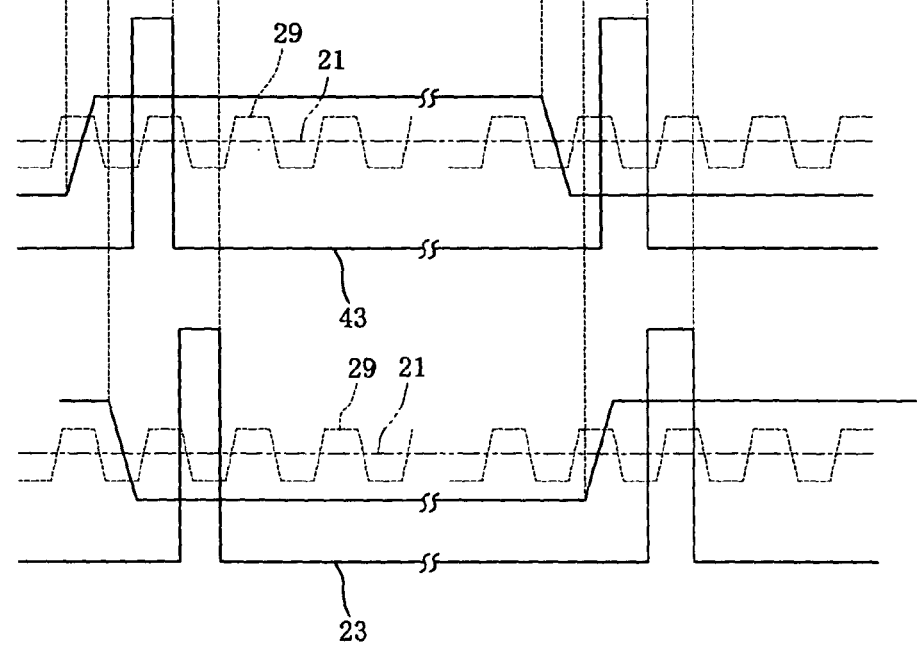
FIG. 23 shows a waveform of a voltage impressed to a thin film transistor element corresponding to a pixel of an even number column of (n)th row and of (n+1)th row of a multi-domain vertically aligned mode liquid crystal panel of the present invention.

FIG. 22 and FIG. 23 show a driving method of Example 6. A driving method of the Example slightly differs from a driving method of Example 3.

FIG. 22 and FIG. 23 show a transparent common electrode potential 21, a video signal wiring waveform of odd number column 22, a scanning line signal waveform of n row 23, a scanning line signal waveform of row (n+1) 24, a video signal wiring waveform of even number column 29, and a scanning line signal waveform of (n−1) row 43.

In Example 3, there is used a method that adjacent transparent pixel electrodes 8 are controlled by the same scan signal wiring 17 in Example 3, and video signals having different polarity, respectively, are supplied from a video signal wiring 11. In Example 6, there is used a method that the adjacent transparent pixel electrodes 8 are controlled by a different scan signal wiring 17, and video signals having the same polarity are supplied after a shift of one horizontal scanning-period from a video signal wiring 11. As FIG. 22 and FIG. 23 show, when a positive signal is supplied to a transparent pixel electrode, a potential of a liquid crystal alignment direction control electrode has a positive potential higher than the transparent pixel electrode, and when a negative signal is supplied to the transparent pixel electrode, a potential of the liquid crystal alignment direction control electrode has a negative potential lower than the transparent pixel electrode. The transparent pixel electrode and the liquid crystal alignment direction control electrode reverse each polarity for every vertical period.

In all Examples of the present invention, it is possible to tilt the molecules of anisotropic liquid crystal having a negative dielectric constant 14 in a target direction from a perpendicular direction by setting a potential difference between a transparent pixel electrode 8 and liquid crystal alignment direction control electrodes 15, 19, and 20. In this case tilt angle may only be one-two degrees from a vertical direction (90 degrees). Usually, a bias potential of no less than 4-5 V is impressed. When a high-speed response is required, it is necessary to set a tilt angle as no less than 10 degrees, and a bias potential of no less than 6-8 V is impressed in this case. When the present invention is used for a liquid crystal TV, it is effective to set a bias potential between a transparent pixel electrode 8 and liquid crystal alignment direction control electrodes 15, 19, and 20 larger. When the present invention is made to serve a double purpose for a display of computers, and for a moving image displaying apparatus for TV, it is effective to design a bias circuit so that this bias potential may be variable.

Example 7

Figure 17:
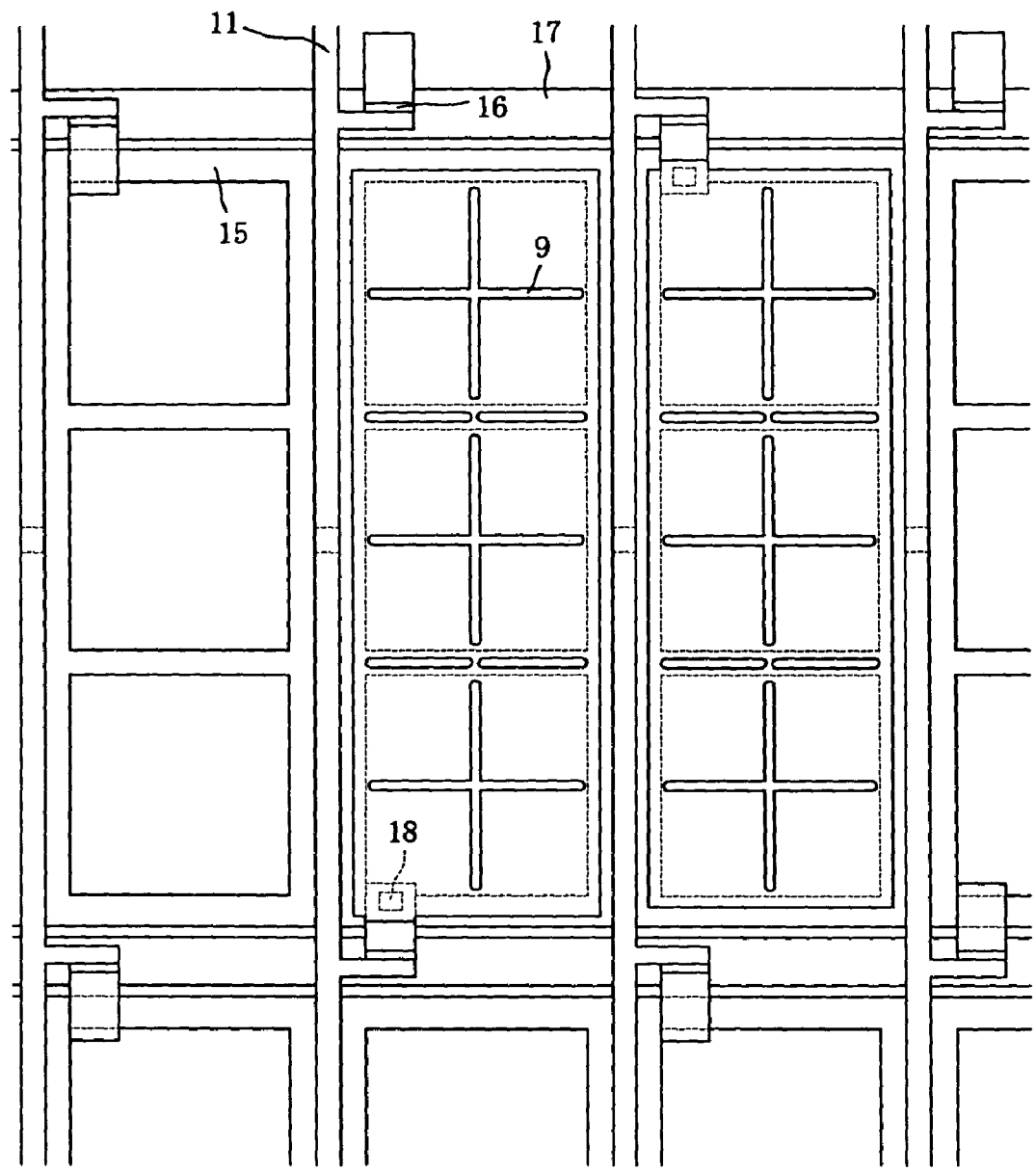
FIG. 17 shows a plane structural figure of a multi-domain vertically aligned mode liquid crystal panel of the present invention.
Figure 18:
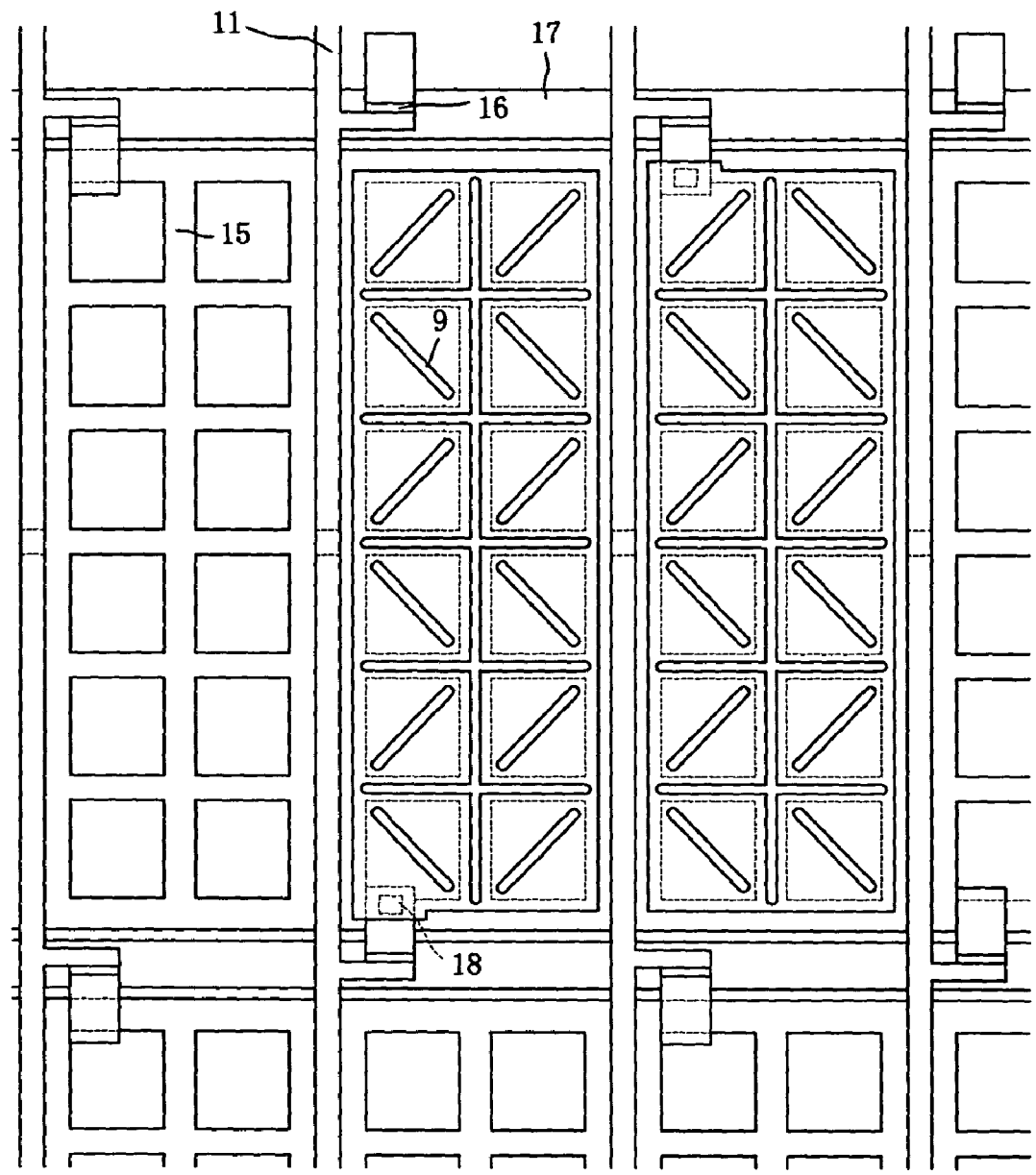
FIG. 18 shows a plane structural figure of a multi-domain vertically aligned mode liquid crystal panel of the present invention.

FIG. 17 and FIG. 18 show plan view of Example 7 of the present invention. This Example adopts a cross section structural figure of Example 1, a liquid crystal alignment direction control electrode 15 encloses a periphery of a transparent pixel electrode 8, which makes it difficult that the transparent pixel electrode 8 is influenced by a potential variation of a video signal wiring 11, and hardly generates a vertical cross talk. One row of liquid crystal alignment direction control electrode 15 exists in one pixel, and adjacent transparent pixel electrodes 8 are connected to a thin film transistor element 16 controlled by a different scan signal wiring 17, respectively. A driving method of this Example is same as that shown in Example 6. Arrangement of polarizing plate is also same as that shown in Example 6.

Example 8

Figure 25:
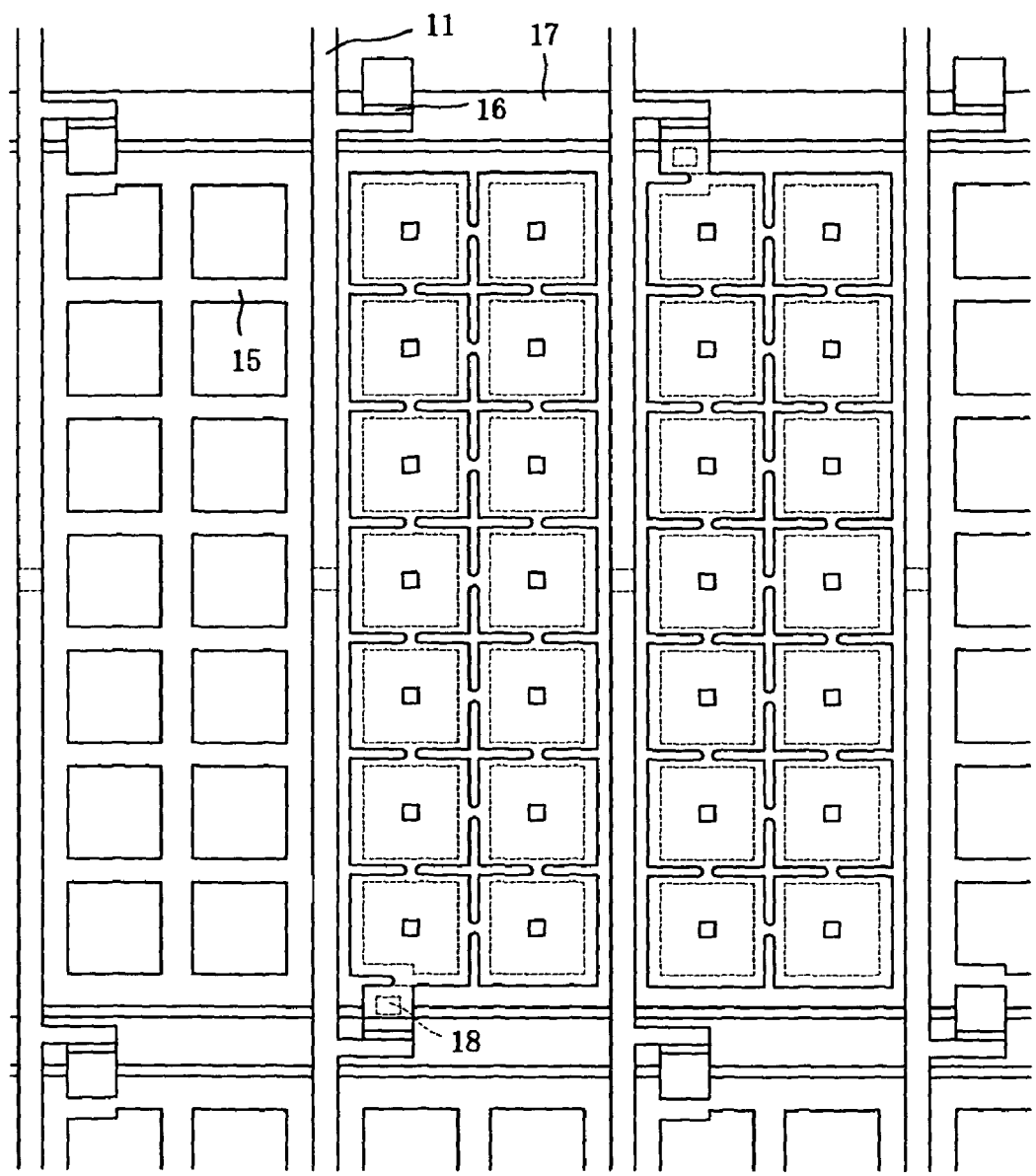
FIG. 25 shows a plane structural figure of a multi-domain vertically aligned mode liquid crystal panel of the present invention.

FIG. 25 shows a plan view of Example 8 of the present invention. This Example adopts a cross section structural figure of Example 1, and a liquid crystal alignment direction control electrode 15 encloses a periphery of a transparent pixel electrode 8, which makes it difficult that the transparent pixel electrode 8 is influenced by a potential variation of a video signal wiring 11, and hardly generates a vertical cross talk. One row of liquid crystal alignment direction control electrode 15 exists in one pixel, and adjacent transparent pixel electrodes 8 are connected to a thin film transistor element 16 controlled by a different scan signal wiring 17, respectively. A driving method of this Example is same as that shown in Example 6. Many circular holes are formed in the transparent pixel electrode 8. As long as they are holes, polygonal forms may be of any kinds other than a circular form. A rotatory polarization liquid crystal display mode may be realizable by blending one of chiral material of left-handed rotation or right-handed rotation to an anisotropic liquid crystal having a negative dielectric constant. In this case, a value of product of a liquid crystal cell gap d and a refractive index anisotropy Δn should just be in a range of 0.30-0.60 micrometer. Molecules of anisotropic liquid crystal having a negative dielectric constant tilt aligning in a shape of a swirl, while performing a left slewing motion or a right slewing motion centering on a circular hole, can pass a light from a backlight from perpendicularly arranged polarizing plates.

Example 9

Figure 19:
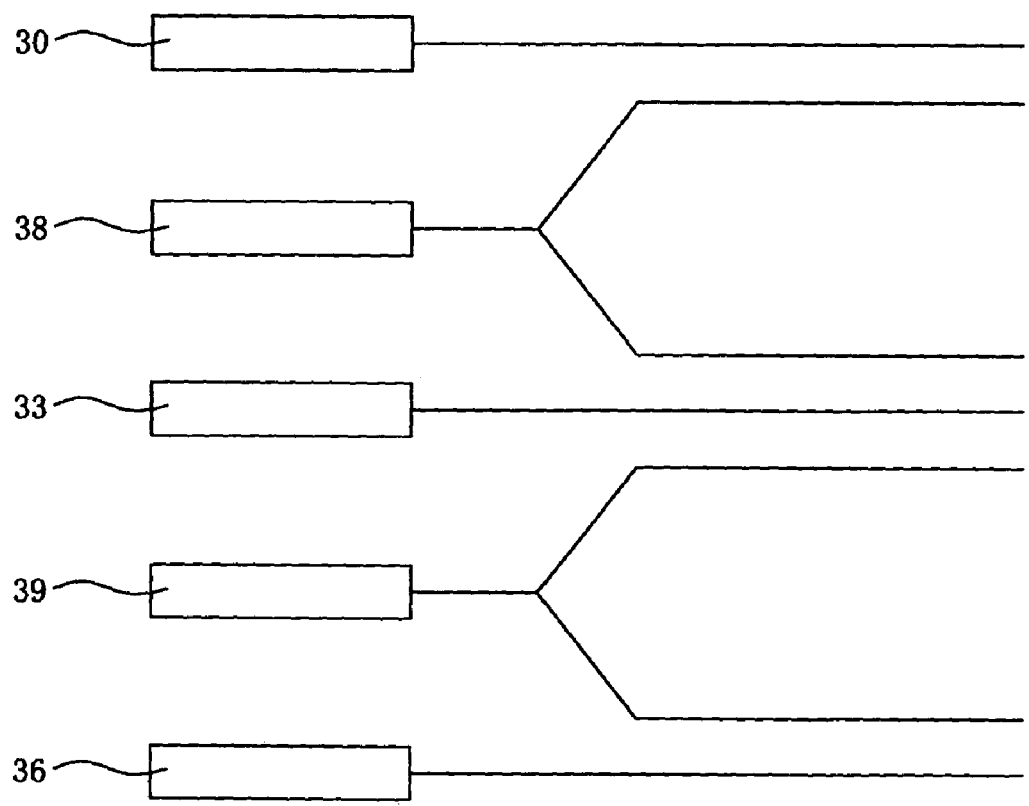
FIG. 19 shows a plan view of contact terminals of scanning lines and liquid crystal alignment direction control electrodes of a multi-domain vertically aligned mode liquid crystal panel of the present invention.
Figure 20:
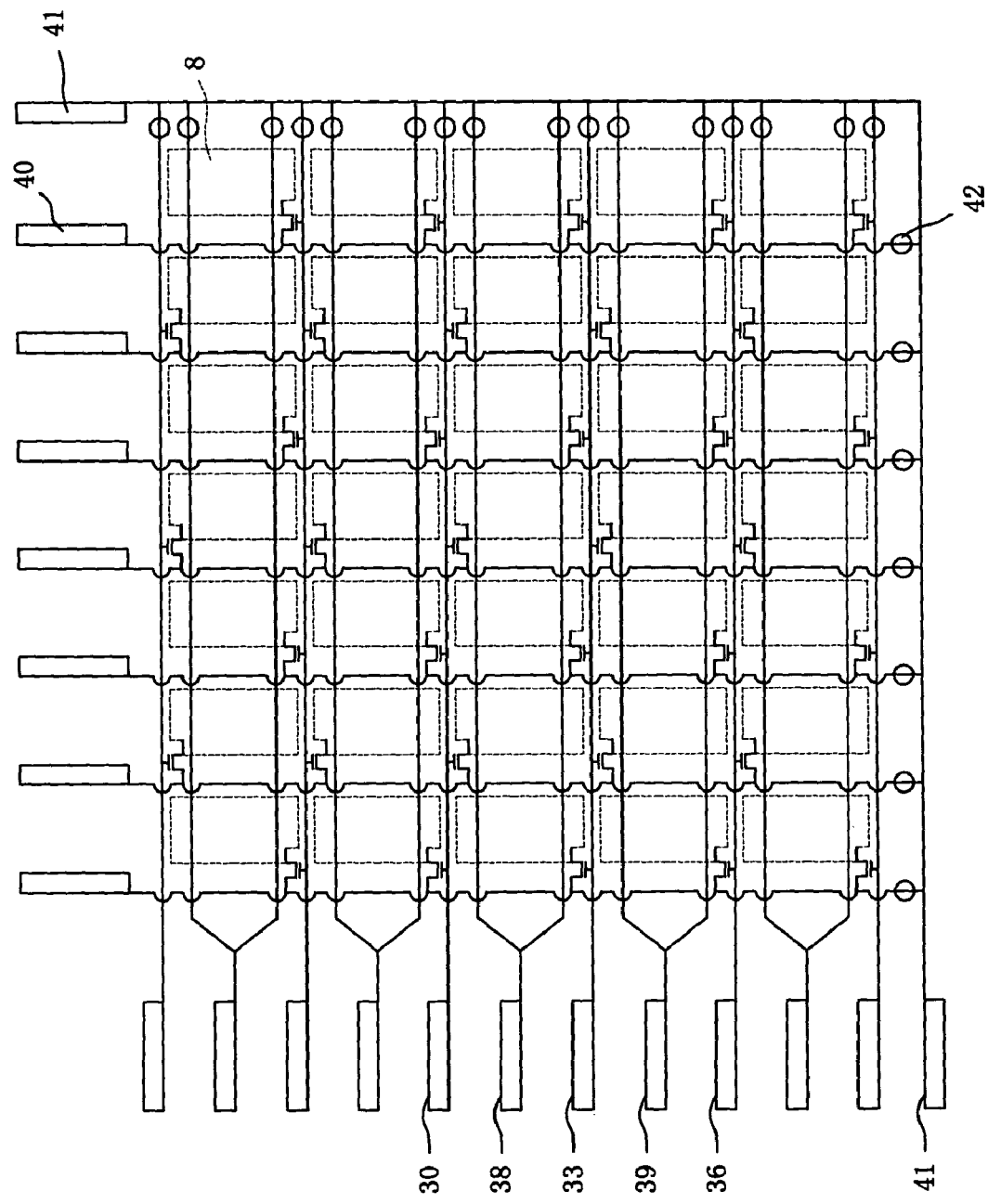
FIG. 20 shows a plan view of a vertically aligned mode active matrix substrate of the present invention.

FIG. 20 shows a plan view of active matrix substrate of Example 9 of the present invention. Both of contact terminals 30, 33, and 36 of a scan signal wiring and contact terminals 38 and 39 of a liquid crystal alignment direction control electrode are provided at a left side of a display screen. FIG. 19 shows an enlarged plan view of the contact terminal.

Figure 13:
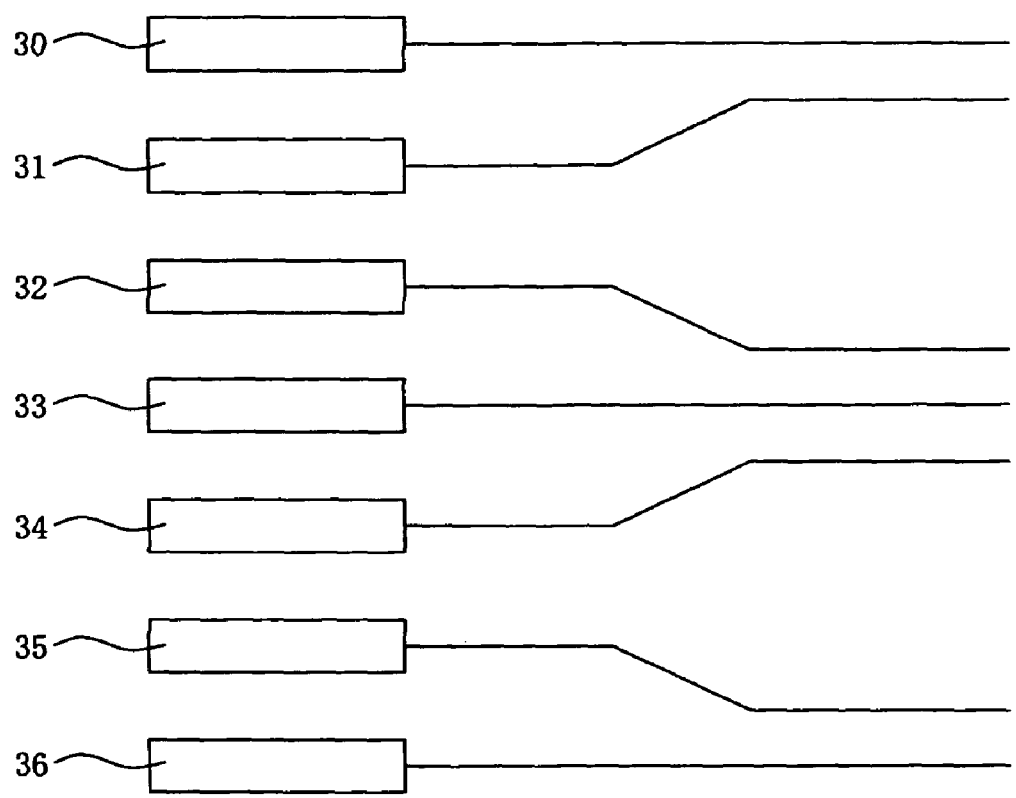
FIG. 13 shows a plan view of contact terminals of scanning lines and liquid crystal alignment direction control electrodes of a multi-domain vertically aligned mode liquid crystal panel of the present invention.
Figure 33:
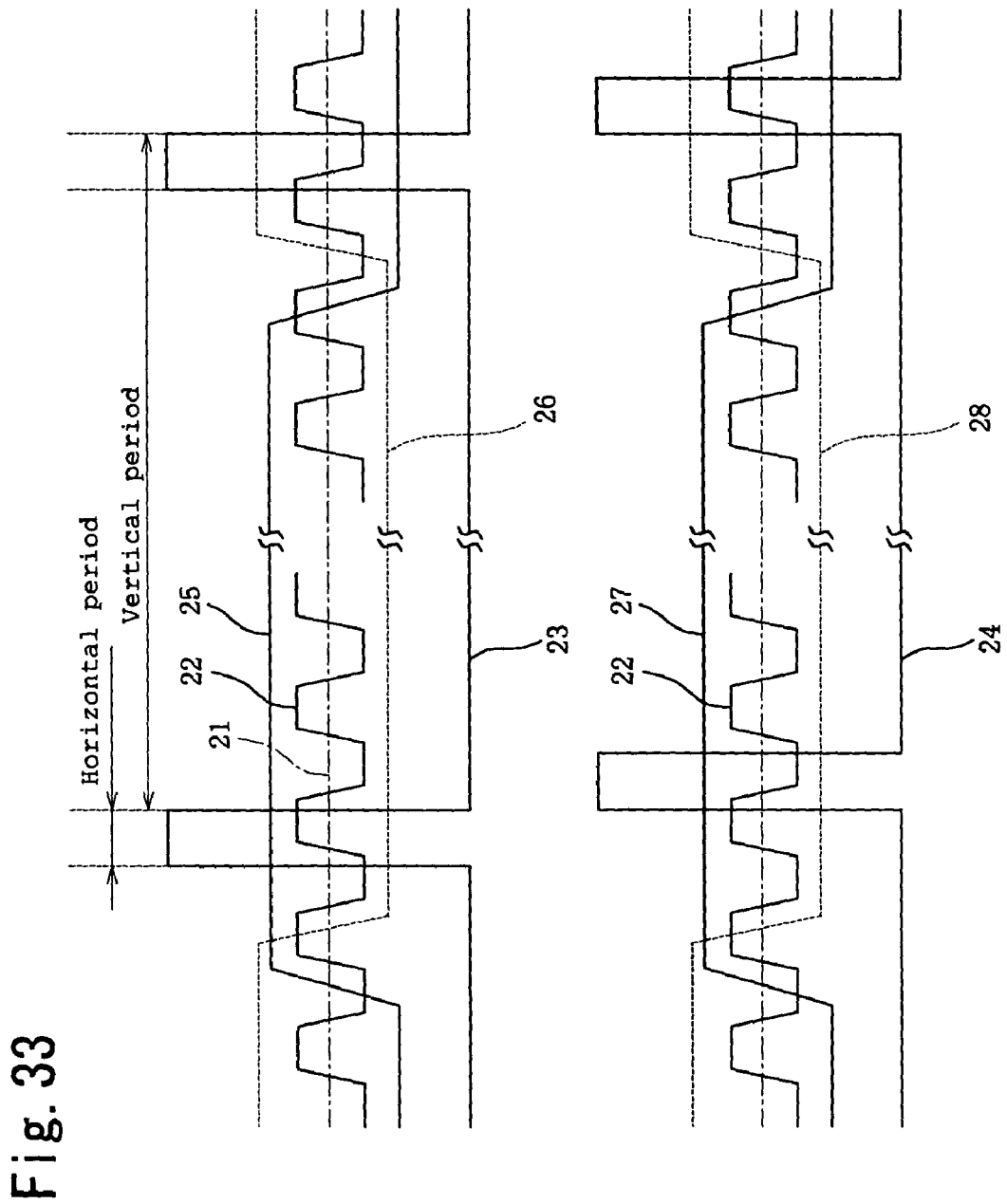
FIG. 33 shows a waveform chart of a voltage impressed to a thin film transistor element of an odd number column (n)th row, and (n+1)th row of a multi-domain vertically aligned mode liquid crystal panel of the present invention.

FIG. 13 shows an enlarged plan view of a contact terminal in the case where liquid crystal alignment direction control electrodes of two rows exist in one pixel. FIG. 13 shows an upper liquid crystal alignment direction control electrode contact terminal 31 of n row, a lower liquid crystal alignment direction control electrode contact terminal 32 of n row, an upper liquid crystal alignment direction control electrode contact terminal 34 of (n+1) row, and a lower liquid crystal alignment direction control electrode contact terminal 35 of (n+1) row. One scan signal wiring is sandwiched from both of upper side and lower side by liquid crystal alignment direction control electrodes of different rows. Polarity switching of upper-side and lower-side liquid crystal alignment direction control electrodes is simultaneously performed based on a timing as shown in FIG. 33, and thereby a potential variation of the scan signal wiring may be controlled minimal, which suppresses generation of horizontal periodic unevenness in a display screen. As FIG. 13 show, a short-circuit between contact terminals may be prevented by providing a distance between the contact terminals 30, 33, and 36 of the can signal wiring, and the contact terminals 31, 32, 34, and 35 of the liquid crystal alignment direction control electrode.

Example 10

Figure 15:
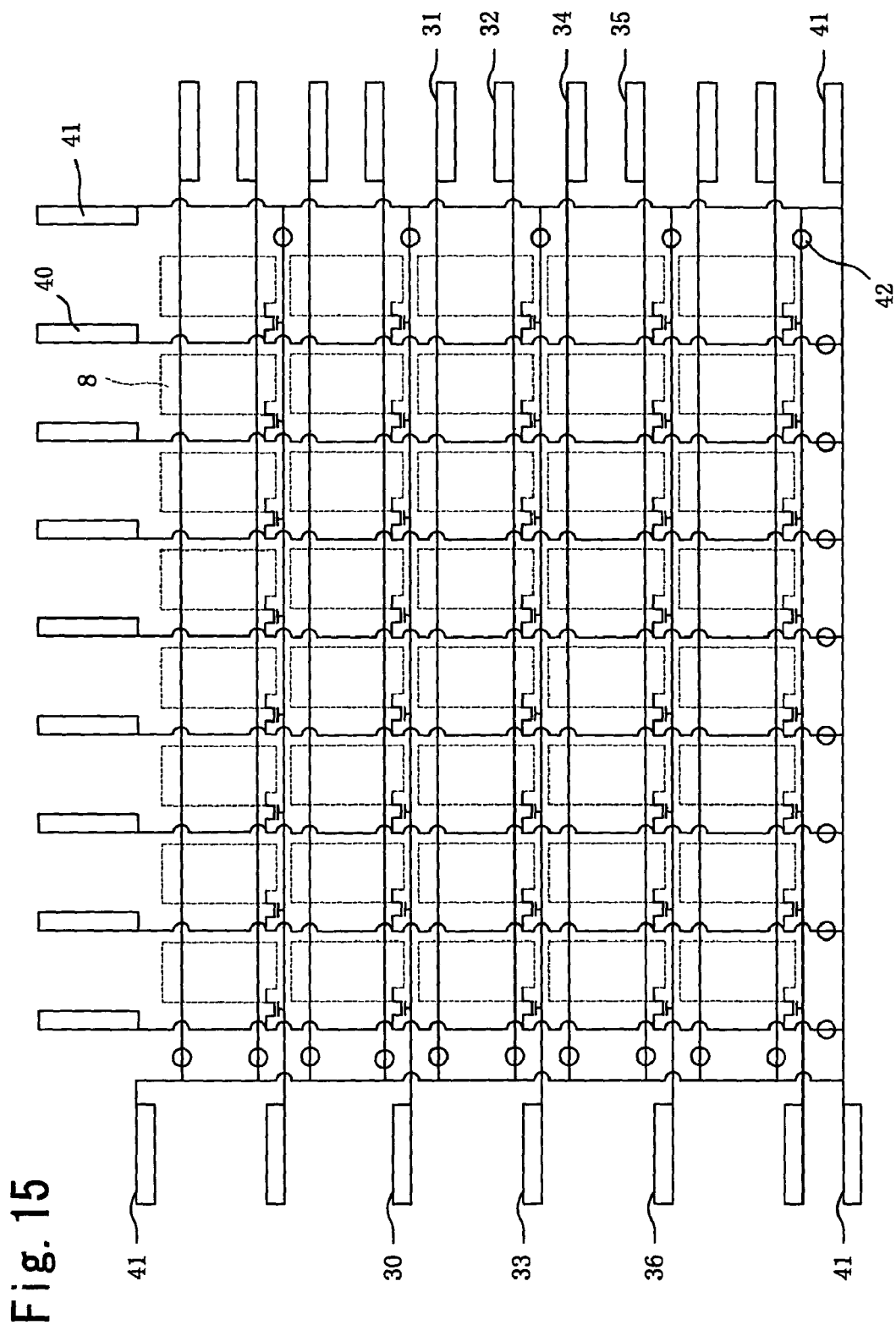
FIG. 15 shows a plan view of a vertically aligned mode active matrix substrate of the present invention.
Figure 21:
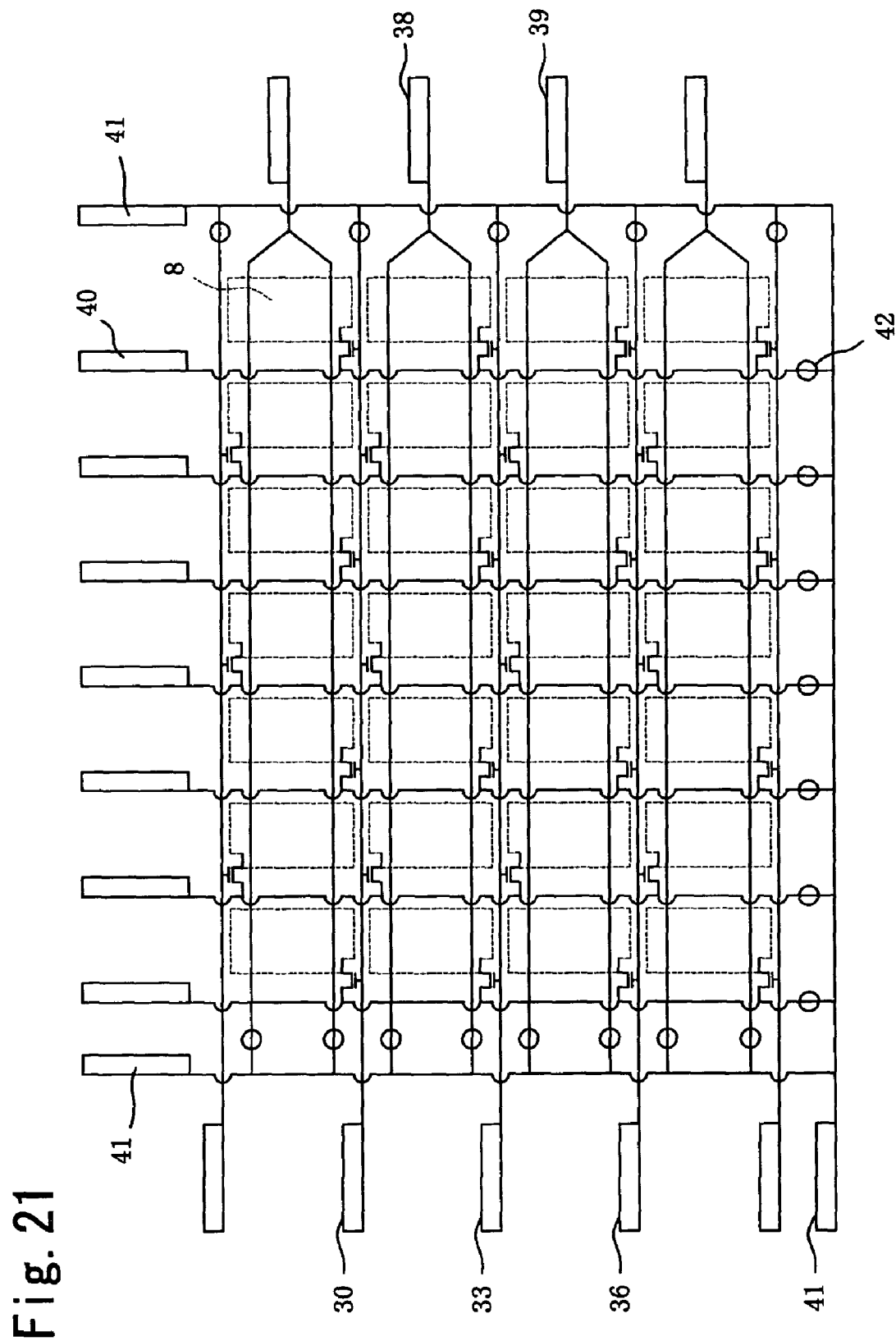
FIG. 21 shows a plan view of a vertically aligned mode active matrix substrate of the present invention.

FIG. 15 and FIG. 21 show a plan view of an active matrix substrate of Example 10 of the present invention. Contact terminals 30, 33, and 36 of a scan signal wiring and contact terminals 38 and 39 of a liquid crystal alignment direction control electrode are divided into left side and right side of a display screen, respectively. A driving method of this Example may be methods as shown in FIG. 11 and FIG. 12, and may be a method as shown in FIG. 33. In Example of the present invention, since a distance between contact terminals is expandable by adopting arrangements shown in FIG. 15 and FIG. 21, a short-circuit between contact terminals can be prevented. Furthermore, usual scan signal wiring drive IC in TN mode may be used, which enables cost reduction in development and production.

Example 11

Figure 26:
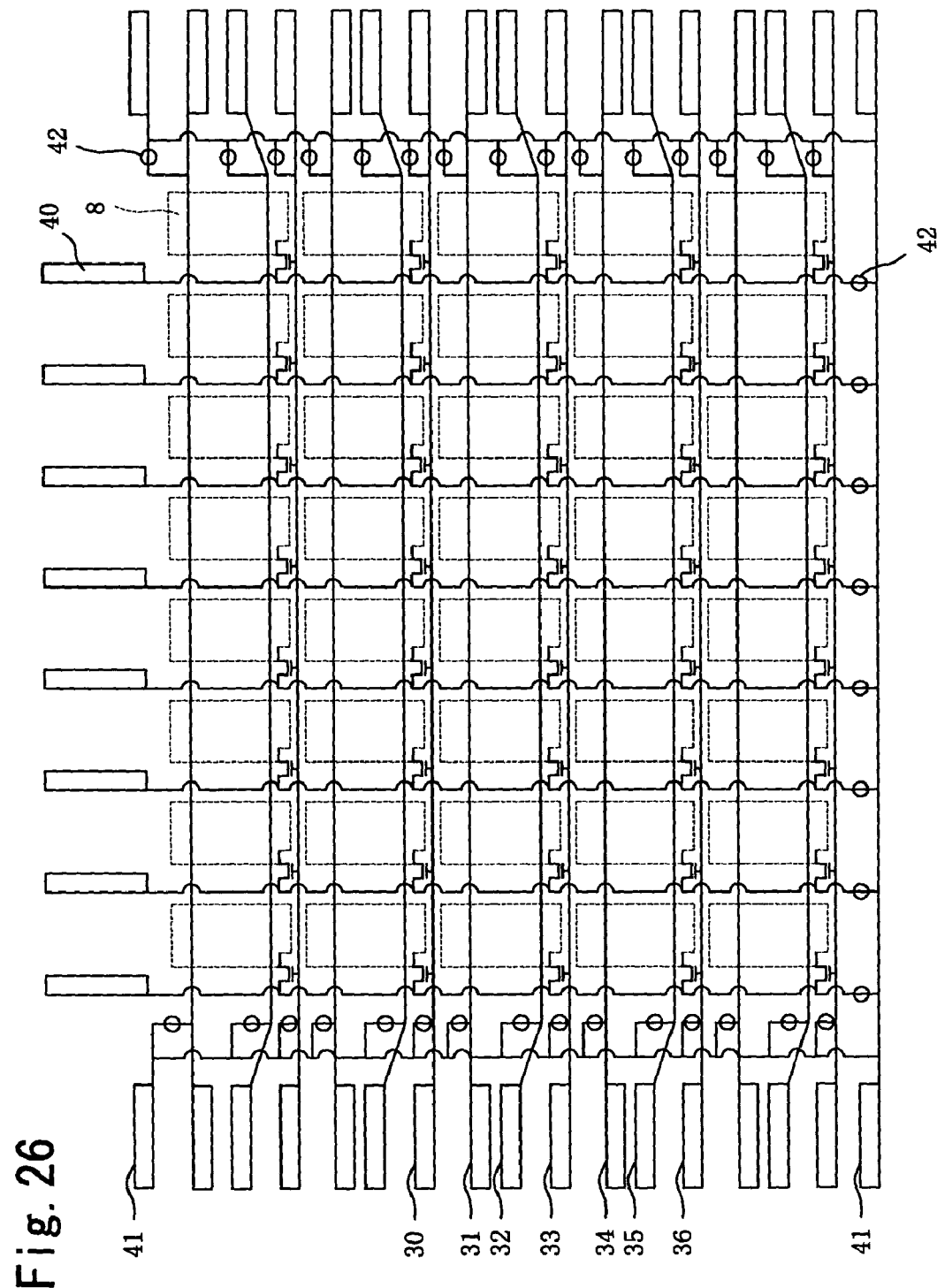
FIG. 26 shows a plan view of a vertically aligned mode active matrix substrate of the present invention.
Figure 27:
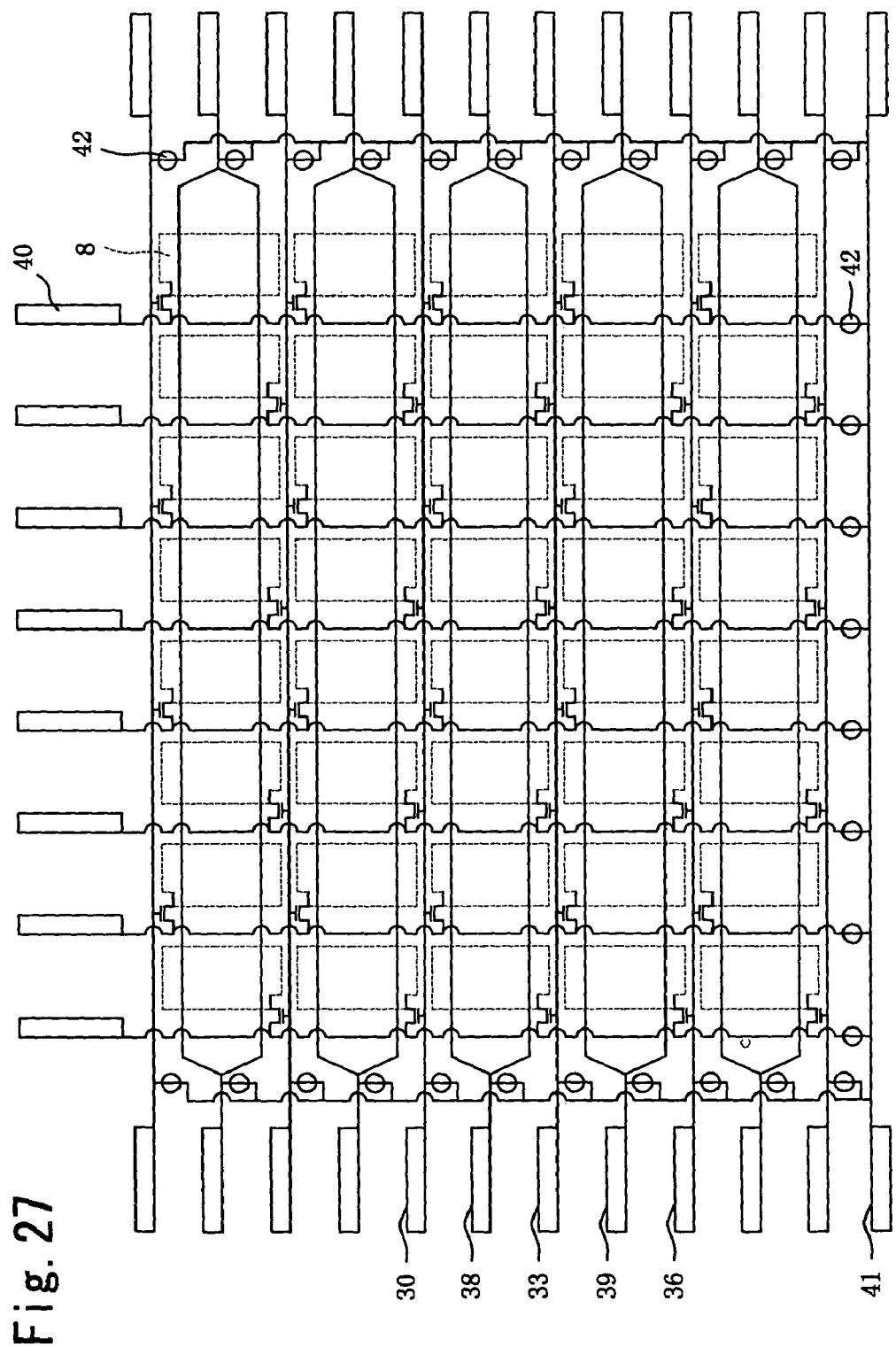
FIG. 27 shows a plan view of a vertically aligned mode active matrix substrate of the present invention.

FIG. 26 and FIG. 27 show a plan view of an active matrix substrate of Example 11 of the present invention. Contact terminals 30, 33, and 36 of a scan signal wiring and contact terminals 31, 32, 34, 35, 38, and 39 of a liquid crystal alignment direction control electrode are provided in both of right and left ends of a display screen, which may solve easily a problem of delay of scan signal waveform, a largest problem when driving a large-sized liquid crystal display.

In addition, FIG. 15, FIG. 20, FIG. 21, FIG. 26, and FIG. 27 show a video signal wiring terminal area 40, a pixel circumference common electrode terminal area 41, and a protection network 42 for static electricity countermeasure.

Example 12

Figure 34:
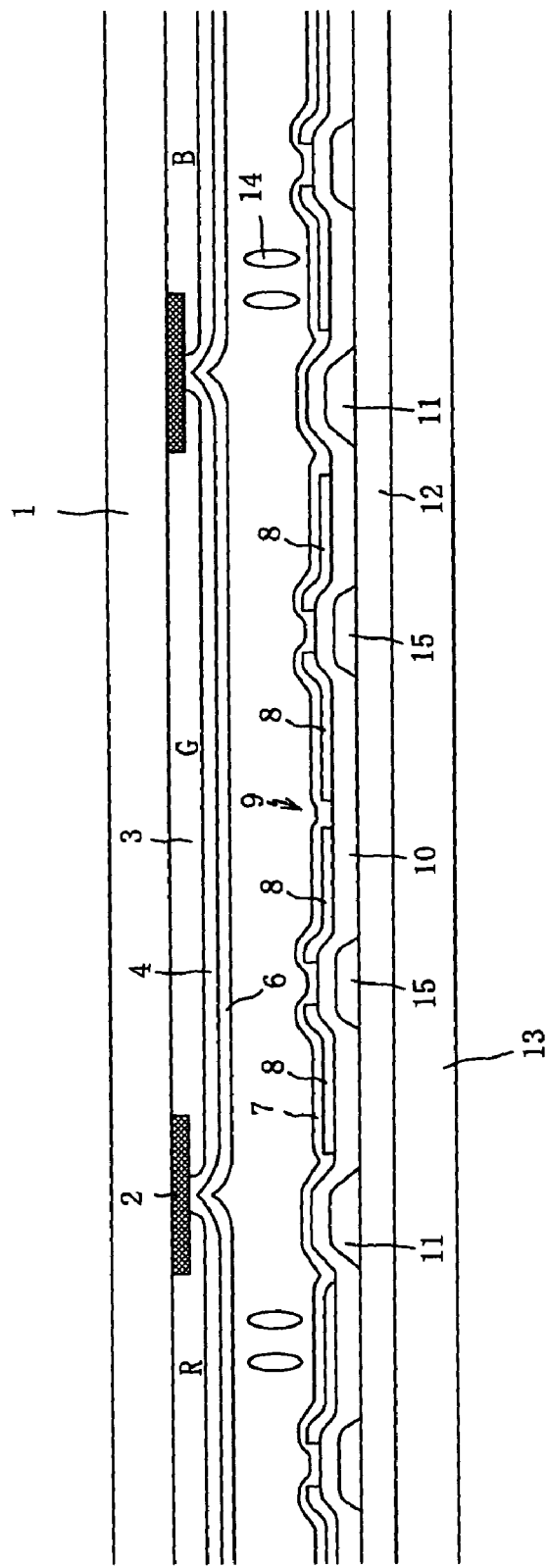
FIG. 34 shows a cross section structural figure of a multi-domain vertically aligned mode liquid crystal panel of the present invention.
Figure 35:
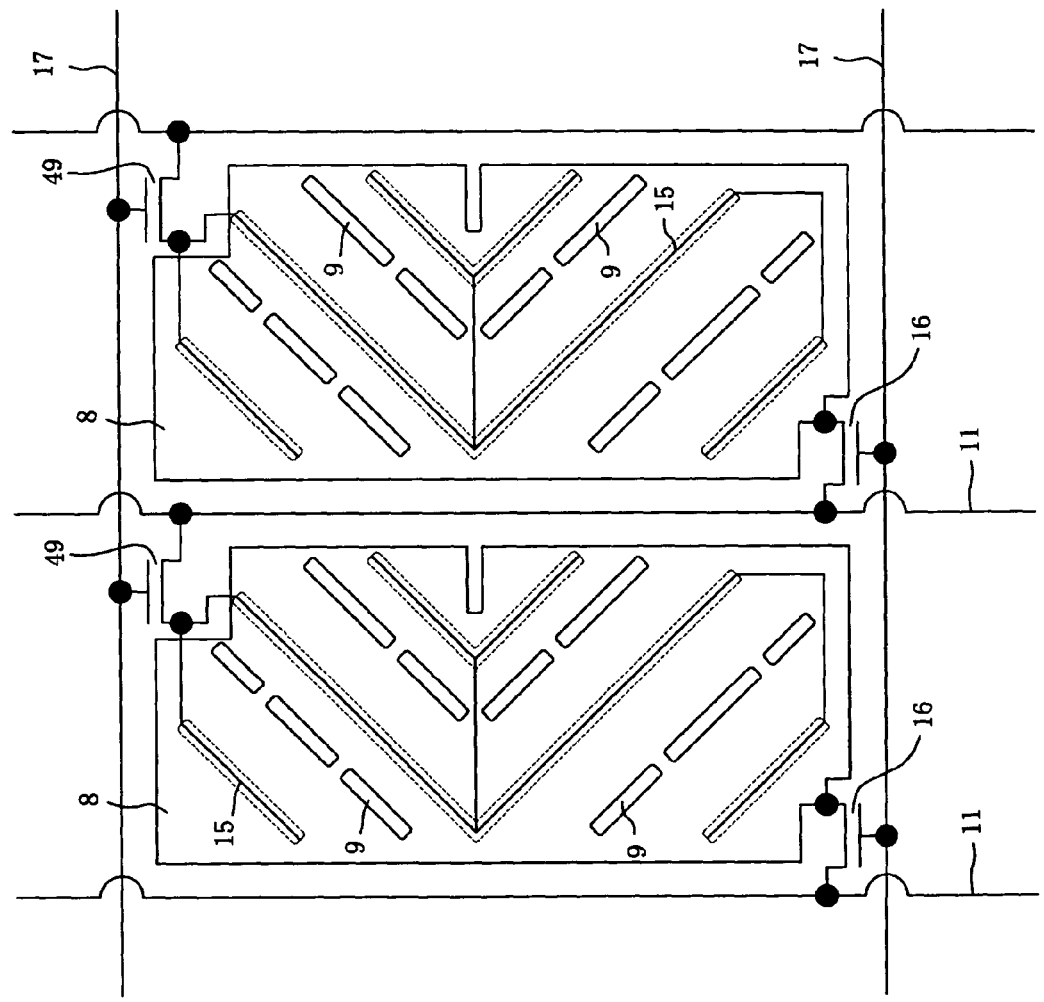
FIG. 35 shows a plane structural figure of a multi-domain vertically aligned mode liquid crystal panel of the present invention.
Figure 38:
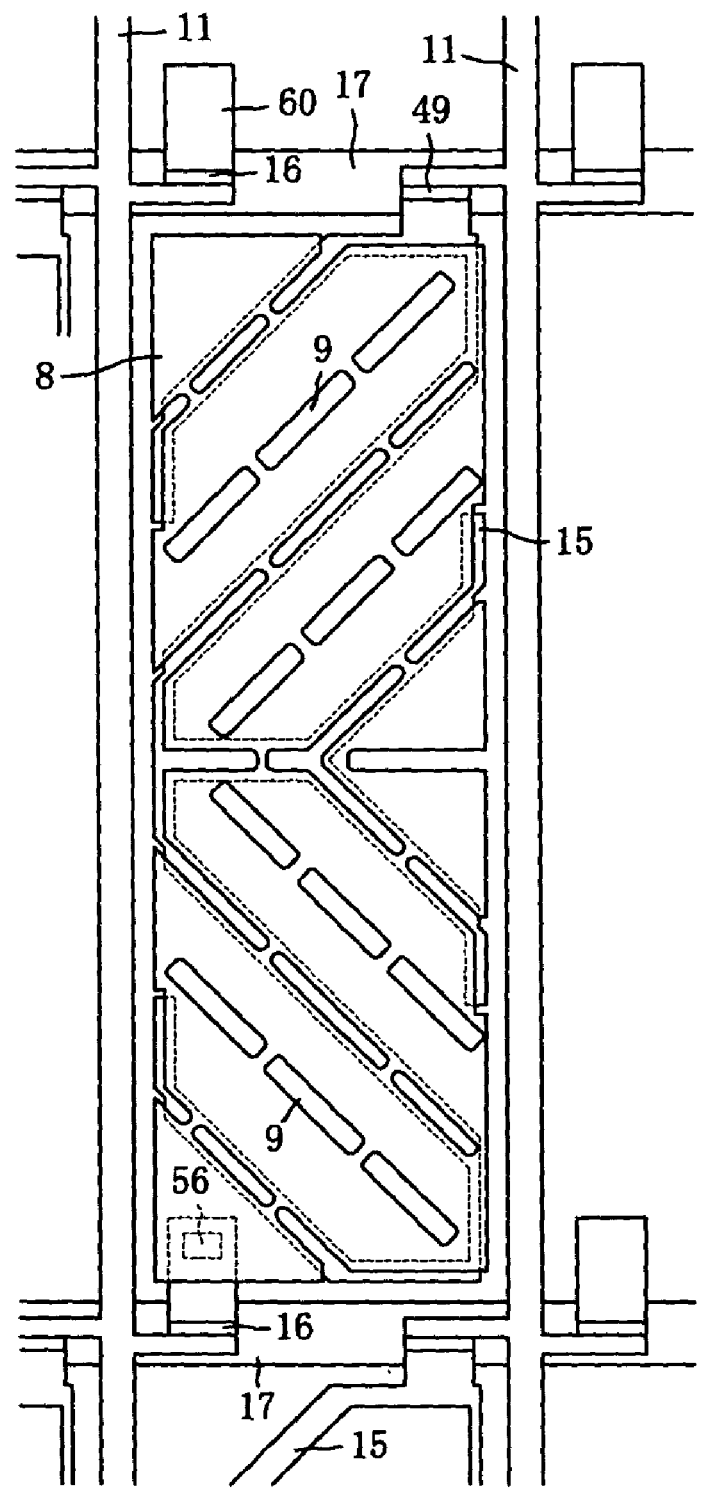
FIG. 38 shows a plane structural figure of a multi-domain vertically aligned mode liquid crystal panel of the present invention.
Figure 63:
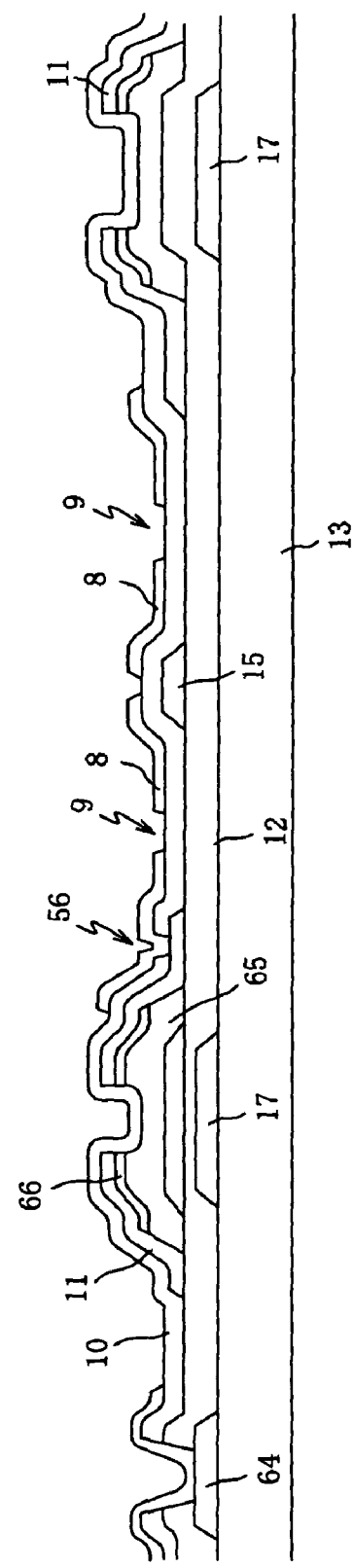
FIG. 63 shows a cross section structural figure of a multi-domain vertically aligned mode liquid crystal panel of the present invention.
Figure 64:
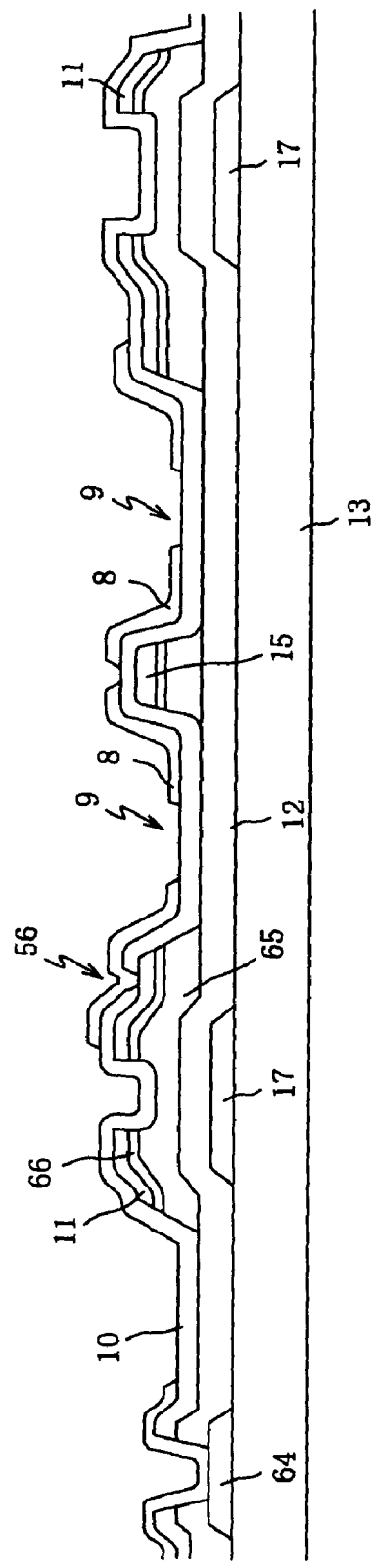
FIG. 64 shows a cross section structural figure of a multi-domain vertically aligned mode liquid crystal panel of the present invention.

FIG. 34, FIG. 35, and FIG. 38 show a sectional view, a circuit model view, and a plan view of Example 12 of the present invention. FIG. 51 and FIG. 52 show a manufacturing process flow of a TFT (Thin Film Transistor) array substrate of Example 12 of the present invention. FIG. 63 and FIG. 64 show an enlarged sectional view of the TFT array substrate.

Figure 1:
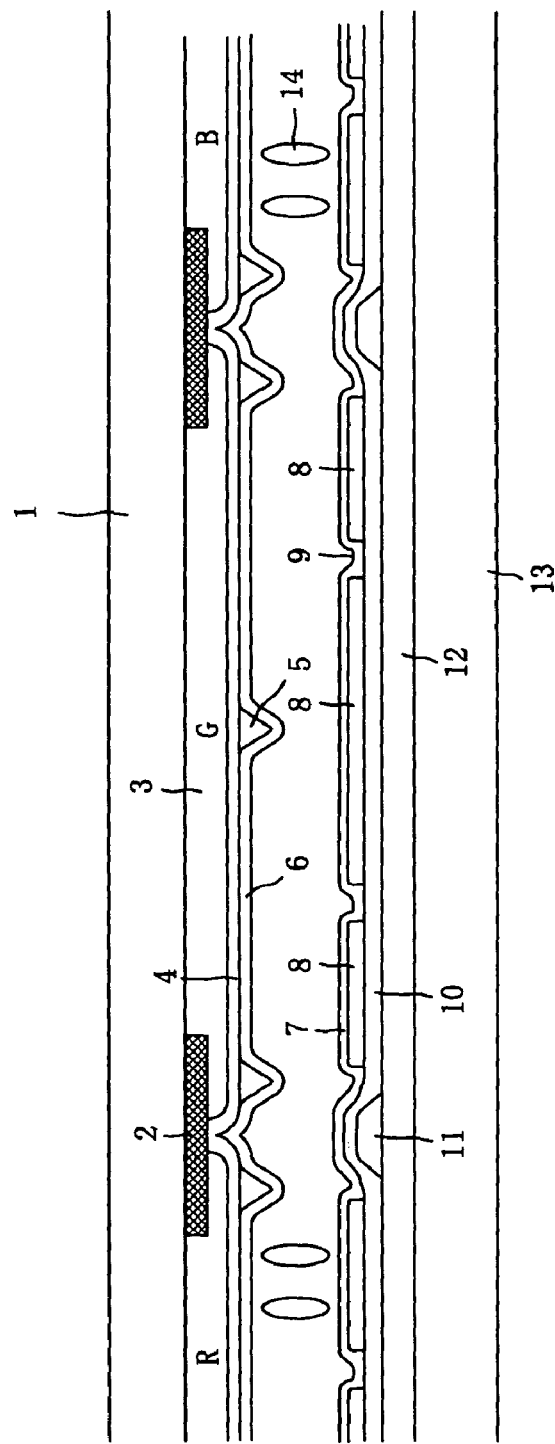
FIG. 1 shows a cross section structural figure of a conventional multi-domain vertically aligned mode liquid crystal panel.

Color filter substrate 1 has a flat transparent common electrode 4, and an active matrix substrate 13 is arranged in parallel countering this substrate 1. Although bumps 5 for controlling a motion direction of a liquid crystal are formed on a flat transparent common electrode 4 as shown in FIG. 1 in conventional liquid crystal panel in vertically aligned mode, a liquid crystal panel in vertically aligned mode of the present invention does not require such bumps.

In the active matrix substrate 1, after formation of the scan signal wiring 17, an insulator film 12 and an amorphous silicone layer (non doped layer) 65 and an n$^+$ amorphous silicone layer 66 for ohmic contacts are deposited. A video signal wiring 11, a drain electrode, and a liquid crystal alignment direction control electrode 15 are simultaneously formed in the same layer after formation of a thin film transistor element. A thin film transistor element, a video signal wiring 11, a drain electrode, and a liquid crystal alignment direction control electrode 15 are possible to be prepared in the same layer simultaneously, using a half-tone exposure technique disclosed in Japanese Patent Laid-Open No. 2000-066240. FIG. 64 shows a sectional view of a thin film transistor element and an active matrix substrate of Example 12 of the present invention using the half-tone exposure. In addition, FIGS. 63 and 64 show a scanning line terminal area 64.

As shown in FIG. 38, in Example 12 of the present invention, a number of thin film transistor elements required in one pixel is only two. A transparent pixel electrode 8 of n row and m column is connected with a thin film transistor element 16 formed in a position where a scan signal wiring of n row 17 and a video signal wiring of m column 11 intersect with each other, and a liquid crystal alignment direction control electrode 15 is connected with a thin film transistor element 49 formed in a position where a scan signal wiring of (n−1) row 17 and a video signal wiring of (m+1) column 11 intersect with each other. Two kinds of slits are formed in the transparent pixel electrode 8, and FIG. 99 and FIG. 100 show enlarged cross sectional views of the slits.

Figure 41:
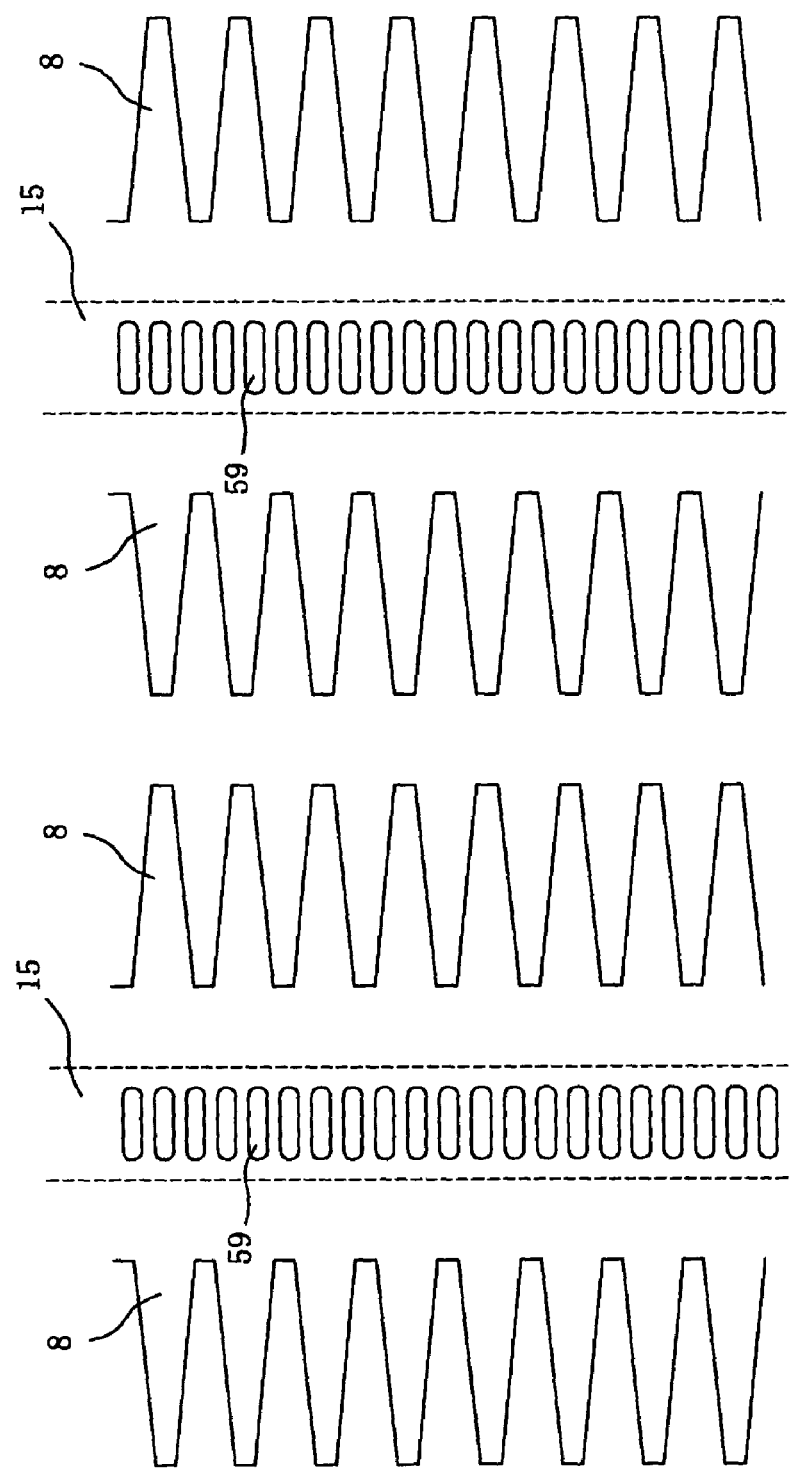
FIG. 41 shows a plane structural figure of slits formed in a liquid crystal alignment direction control electrode and a transparent pixel electrode of the present invention.
Figure 42:
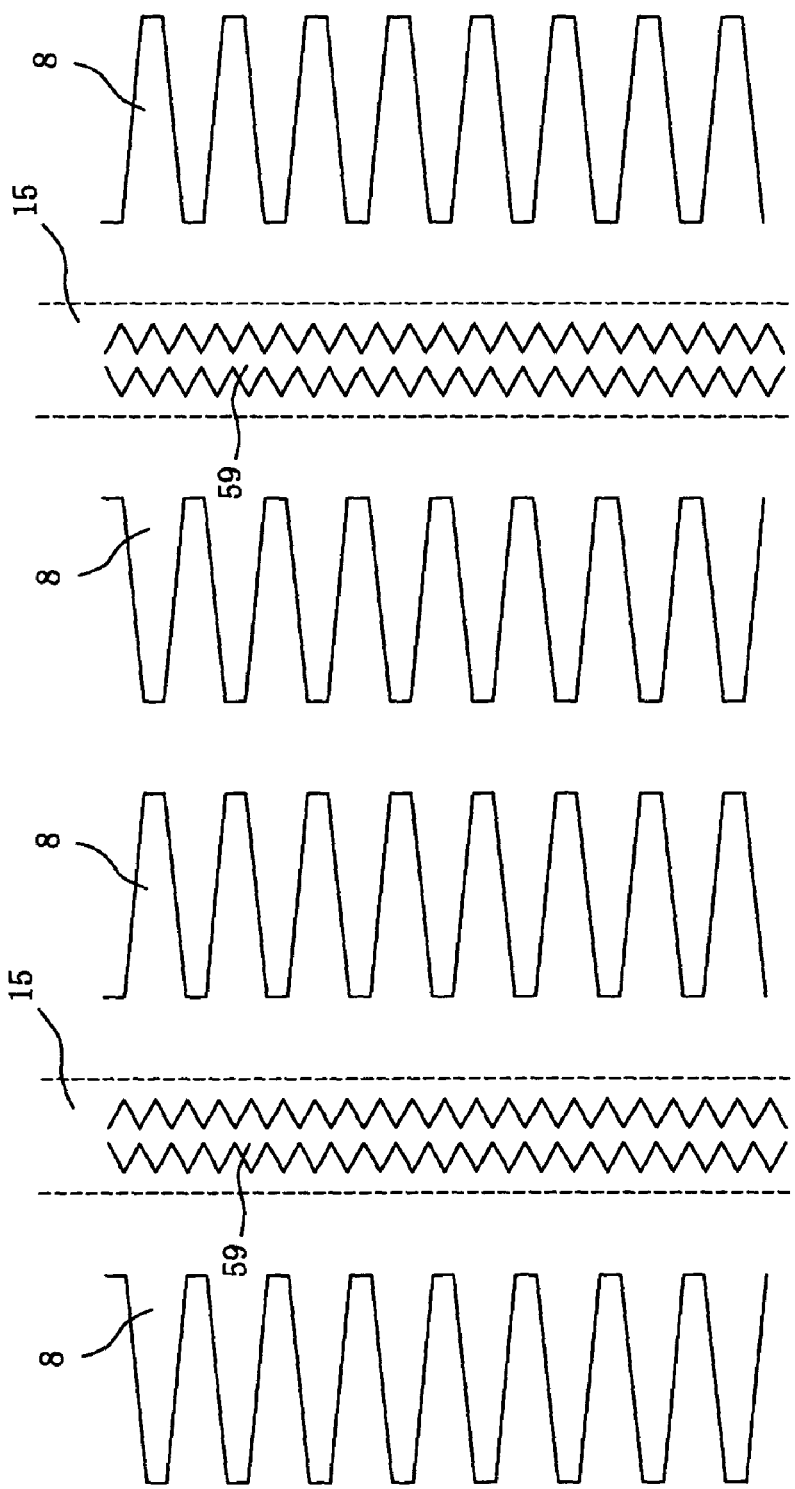
FIG. 42 shows a plane structural figure of slits formed in a liquid crystal alignment direction control electrode and a transparent pixel electrode of the present invention.
Figure 99:
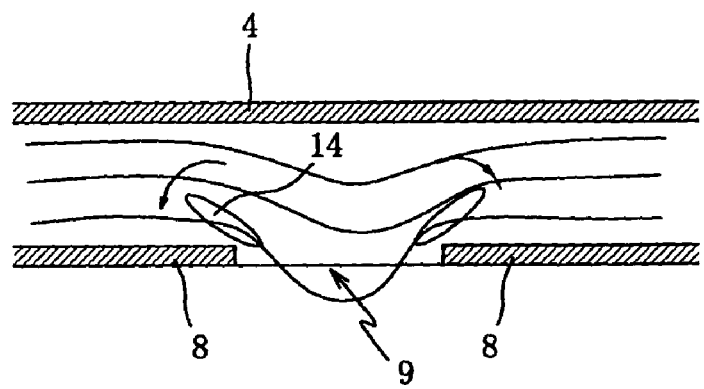
FIG. 99 shows a motion direction of molecules of anisotropic liquid crystal having a negative dielectric constant vertically aligned by an electric field formed with a flat electrode and a slit electrode.

In a slit 9 of type in FIG. 99, when a voltage is impressed, vertically aligned liquid crystal molecules 14 tilt in directions shown in FIG. 99. In a slit of a type in FIG. 100, a liquid crystal alignment direction control electrode 15 is arranged via an insulator film on a lower layer of the slit. In a slit of a type in FIG. 100, when a voltage is impressed, vertically aligned liquid crystal molecules 14 tilt in directions shown in FIG. 100. FIG. 41 and FIG. 42 show modified methods of FIG. 99 and FIG. 100. FIG. 41 and FIG. 42 show an opening 59 formed in a transparent pixel electrode on a liquid crystal alignment direction control electrode 15. In FIG. 100, the liquid crystal alignment direction control electrode 15 has a larger size than that of a slit of the transparent pixel electrode 8, and overlaps each other via an insulator film. An important point of the present invention is that the transparent pixel electrode 8 and the liquid crystal alignment direction control electrodes 15 overlap one another via an insulator film 12 to form a capacitance.

Figure 93:
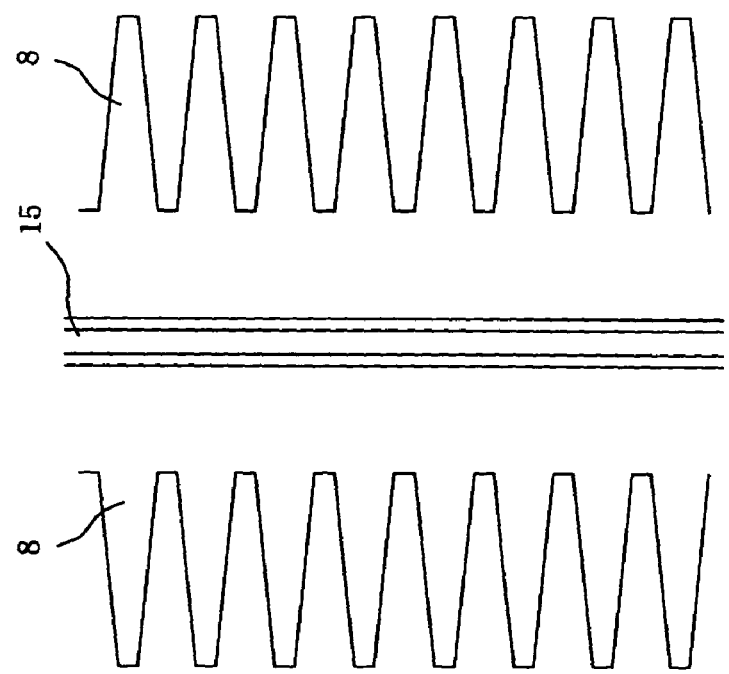
FIG. 93 shows a plane structural figure of slits formed in a liquid crystal alignment direction control electrode and a transparent pixel electrode of the present invention.
Figure 100:
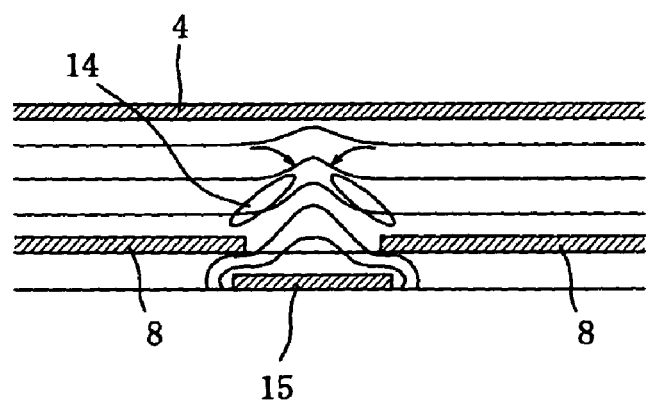
FIG. 100 shows a motion direction of molecules of anisotropic liquid crystal having a negative dielectric constant vertically aligned by an electric field formed with a flat electrode, a slit electrode, and a liquid crystal alignment direction control electrode.
Figure 101:
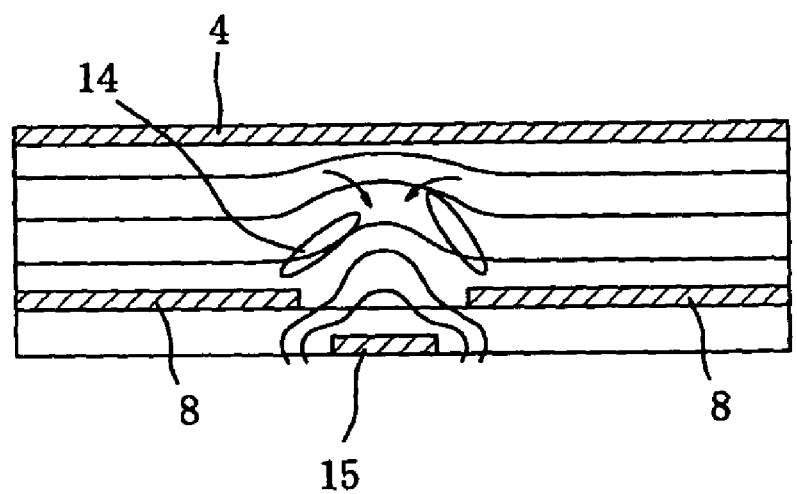
FIG. 101 shows a motion direction of molecules of anisotropic liquid crystal having a negative dielectric constant vertically aligned by an electric field formed with a flat electrode, a slit electrode, and a liquid crystal alignment direction control electrode.

Molecules of anisotropic liquid crystal having a negative dielectric constant 14 may be made to move in same directions as in FIG. 100 also in an electrode structure arrangement as shown in FIG. 101, in a planar structure as shown in FIG. 93, a transparent pixel electrode 8 and a liquid crystal alignment direction control electrodes 15 do not overlap one another, and a capacitance formed by the transparent pixel electrode 8 and the liquid crystal alignment direction control electrode 15 is small, but problems will be caused if a drive system of the present invention is used.

Figure 94:
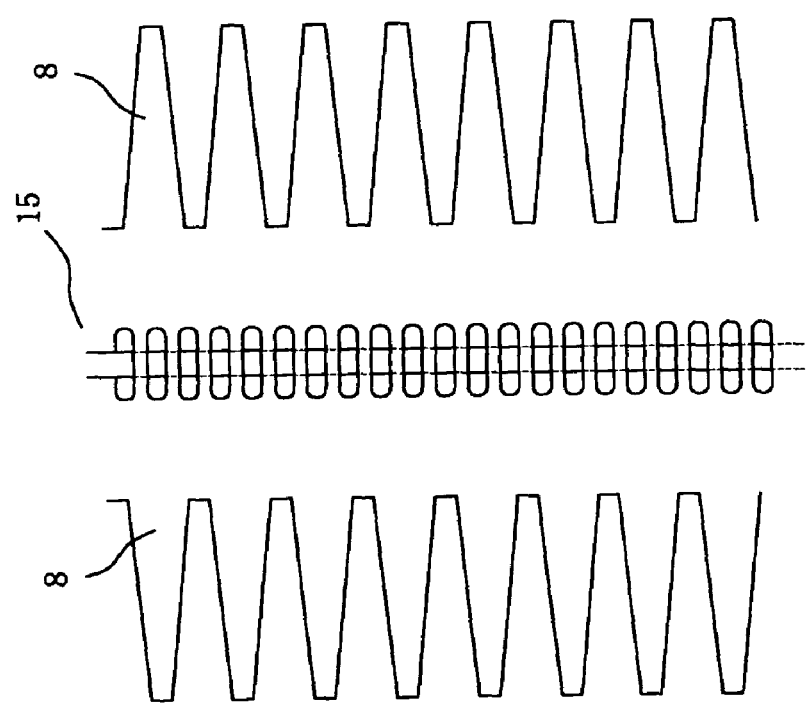
FIG. 94 shows a plane structural figure of slits formed in a liquid crystal alignment direction control electrode and a transparent pixel electrode of the present invention.
Figure 95:
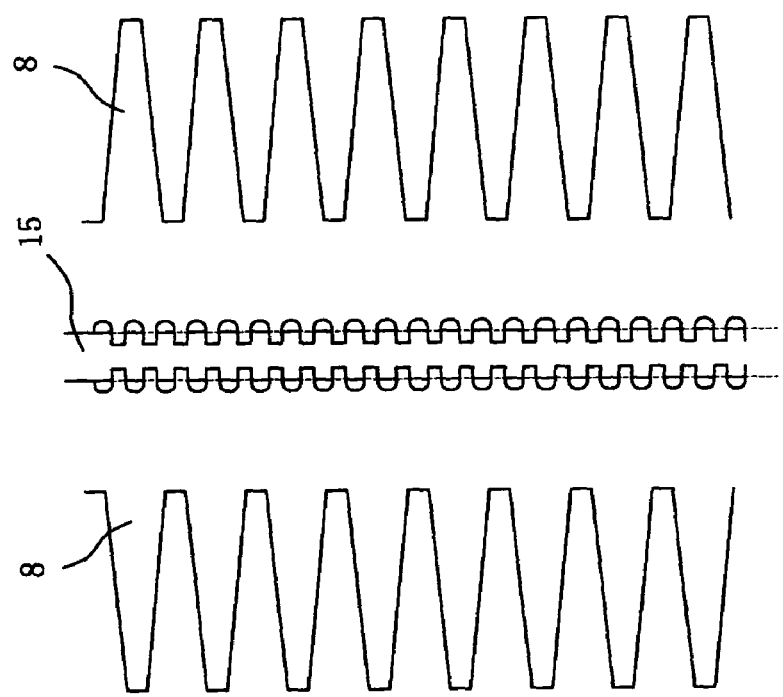
FIG. 95 shows a plane structural figure of slits formed in a liquid crystal alignment direction control electrode and a transparent pixel electrode of the present invention.

As shown in FIG. 94 and FIG. 95, it is particularly important in a drive system of the present invention that a transparent pixel electrode 8 and a liquid crystal alignment direction control electrodes 15 overlap at least in some area via an insulator film.

Example 13

Figure 40:
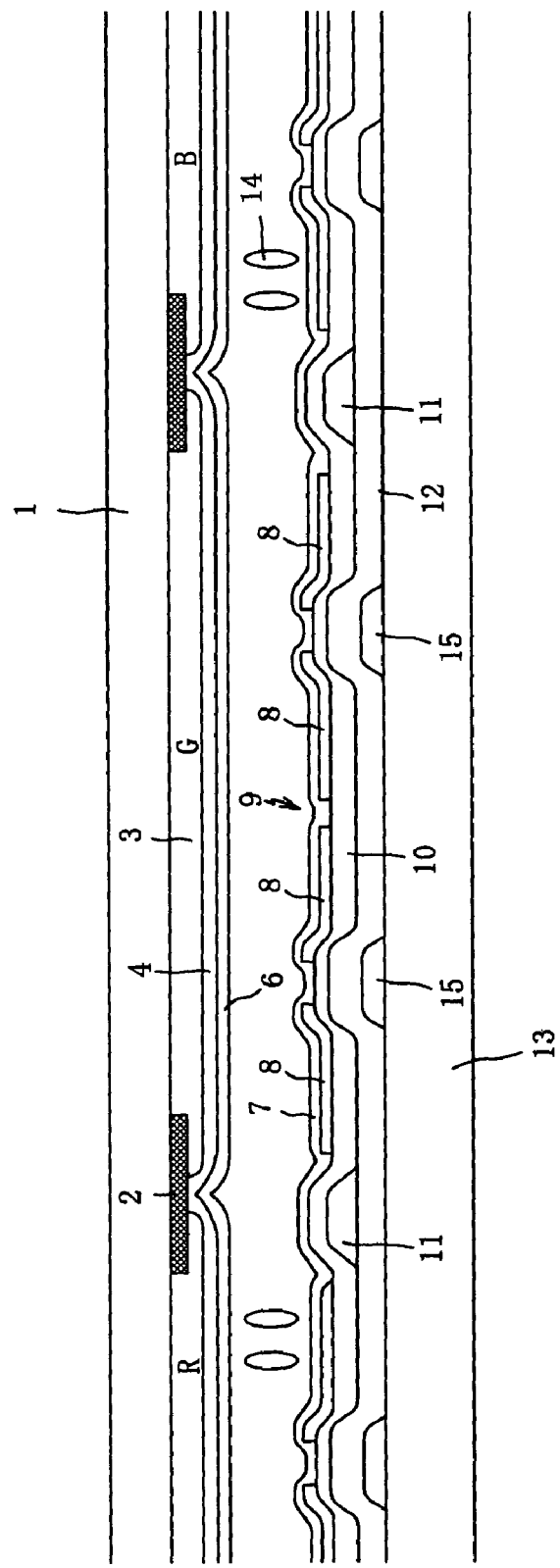
FIG. 40 shows a cross section structural figure of a multi-domain vertically aligned mode liquid crystal panel of the present invention.
Figure 43:
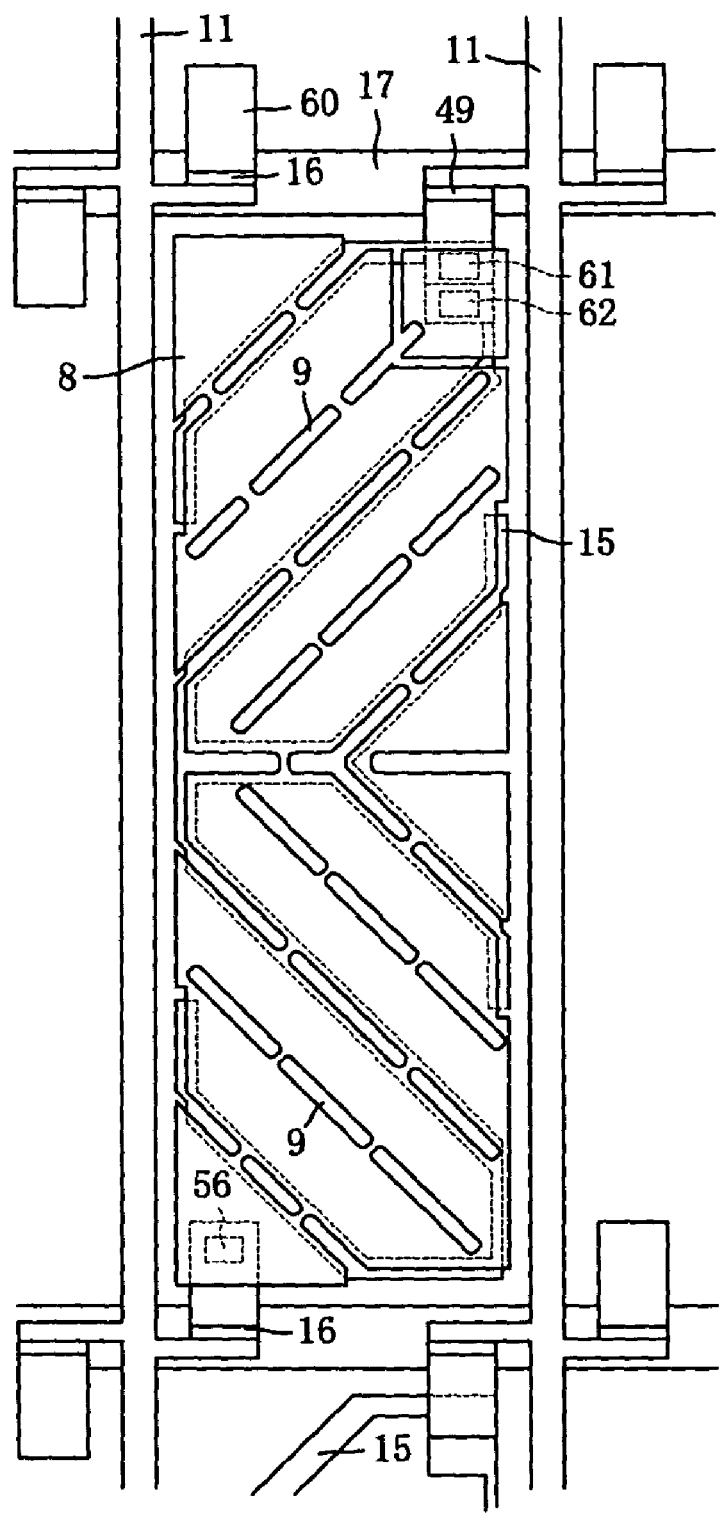
FIG. 43 shows a plane structural figure of a multi-domain vertically aligned mode liquid crystal panel of the present invention.
Figure 61:
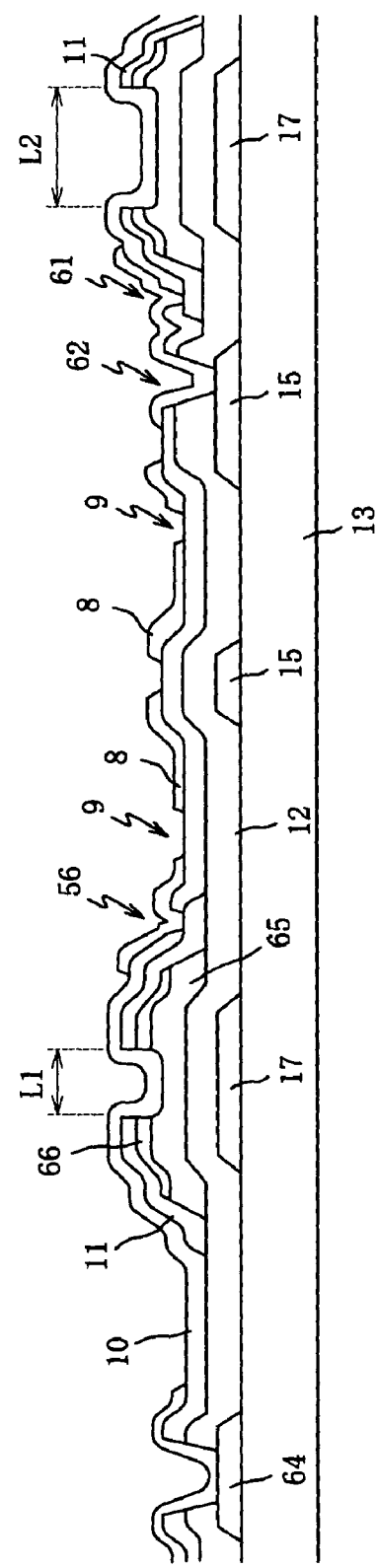
FIG. 61 shows a cross section structural figure of a multi-domain vertically aligned mode liquid crystal panel of the present invention.
Figure 62:
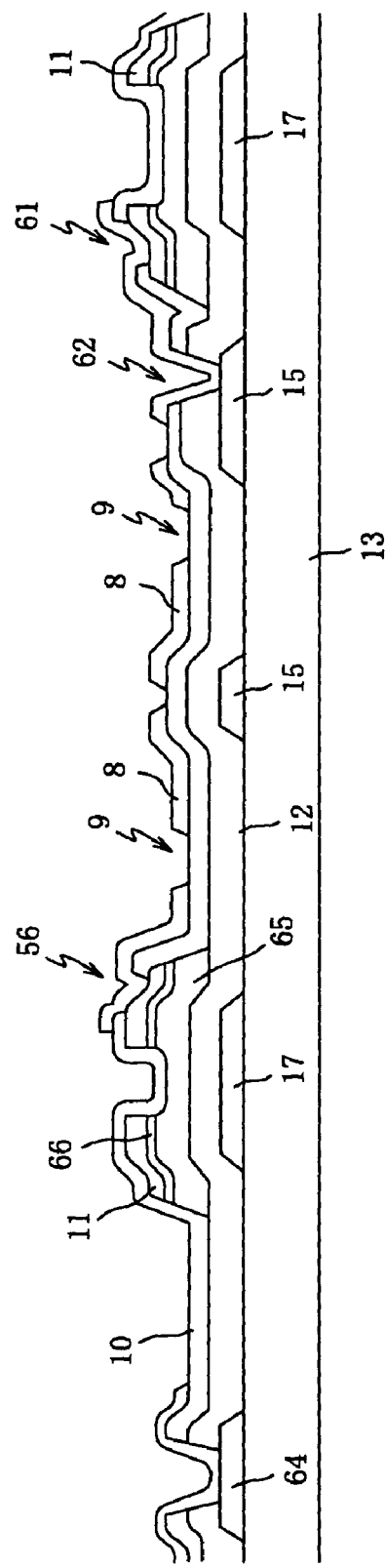
FIG. 62 shows a cross section structural figure of a multi-domain vertically aligned mode liquid crystal panel of the present invention.

FIG. 40 and FIG. 43 show a sectional view and a plan view of Example 13 of the present invention. FIG. 53 and FIG. 54 show a manufacturing process flow of a TFT array substrate of Example 13 of the present invention. FIG. 61 and FIG. 62 show enlarged sectional views of the TFT array substrate.

A color filter substrate 1 has a flat transparent common electrode 4, and does not have bumps as in Example 12.

In an active matrix substrate 13, after a scan signal wiring 17 and a liquid crystal alignment direction control electrode 15 are first formed in the same layer simultaneously, an insulator film 12, an amorphous silicone layer 65 (non doped layer), and n+ amorphous silicone layer 66 for ohmic contacts are deposited. A video signal wiring 11 and a drain electrode are simultaneously formed after formation of a thin film transistor element part.

A thin film transistor element, a video signal wiring 11, and a drain electrode are possible to be prepared in the same layer simultaneously, using a half-tone exposure technique disclosed in Japanese Patent Laid-Open No. 2000-066240. FIG. 62 shows a sectional view of a thin film transistor element and an active matrix substrate of Example 13 of the present invention using the half-tone exposure.

As shown in FIG. 43, in Example 13 of the present invention, a number of thin film transistor elements required in one pixel is only two. A transparent pixel electrode 8 of n row and m column is connected with a thin film transistor element 16 formed in a position where a scan signal wiring of n row 17 and a video signal wiring of m column 11 intersect with each other, and a liquid crystal alignment direction control electrode 15 is connected with a thin film transistor element 49 formed in a position where a scan signal wiring of (n−1) row 17 and a video signal wiring of (m+1) column 11 intersect with each other. In Example 12, since a drain electrode of this thin film transistor element and a liquid crystal alignment direction control electrode 15 are simultaneously formed in the same layer, these are connected automatically. However, in Example 13, since a drain electrode of this thin film transistor element and a liquid crystal alignment direction control electrode 15 are not formed in the same layer, two contact holes 61 and 62 must be provided in order to electrically connect these two electrodes. Although existence of two thin film transistor elements 16 and 49 and one contact hole 56 is sufficient for Example 12, Example 13 requires two thin film transistor elements 16 and 49 and three contact holes 56, 61, and 62, as shown in FIG. 43.

Example 14

Figure 36:
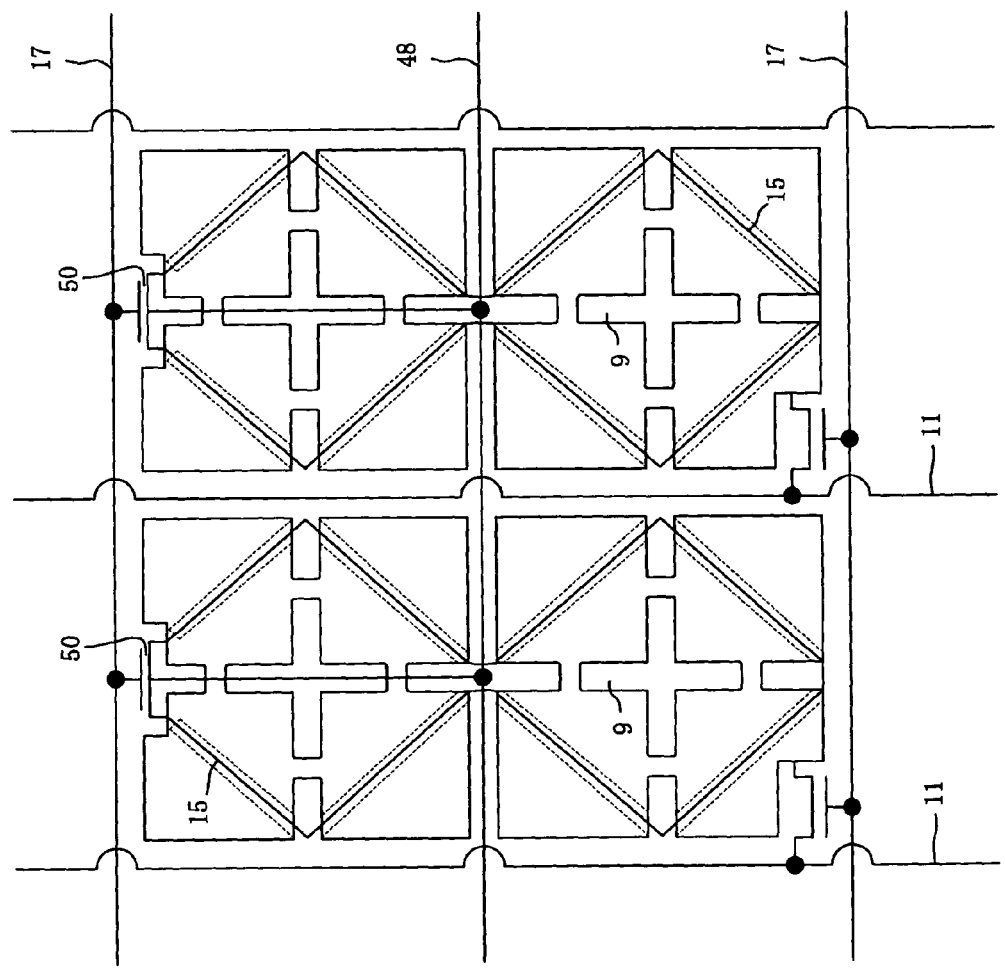
FIG. 36 shows a plane structural figure of a multi-domain vertically aligned mode liquid crystal panel of the present invention.
Figure 39:
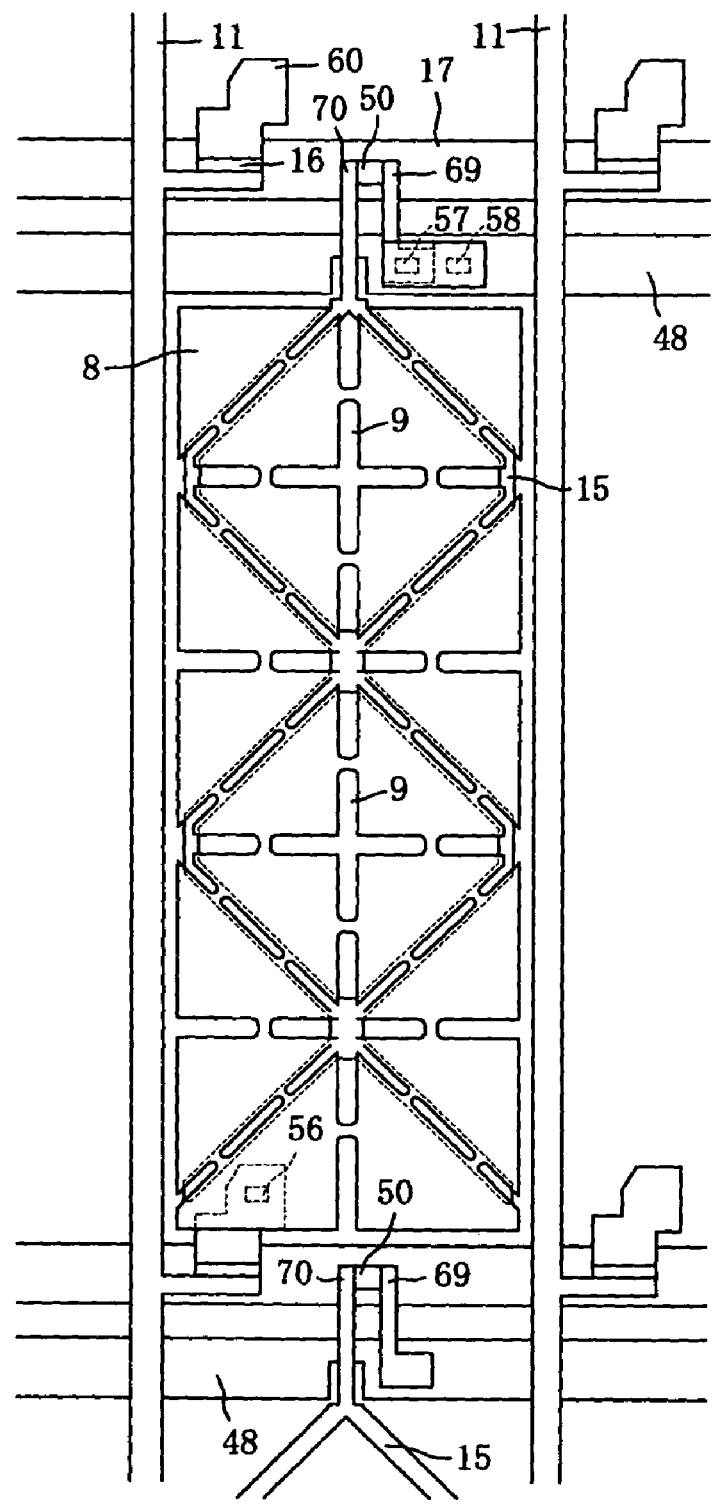
FIG. 39 shows a plane structural figure of a multi-domain vertically aligned mode liquid crystal panel of the present invention.

FIG. 34, FIG. 36, and FIG. 39 show a sectional view, a circuit model view, and a plan view of Example 14 of the present invention. FIG. 55 and FIG. 56 show a manufacturing process flow of a TFT array substrate of Example 14 of the present invention.

Figure 67:
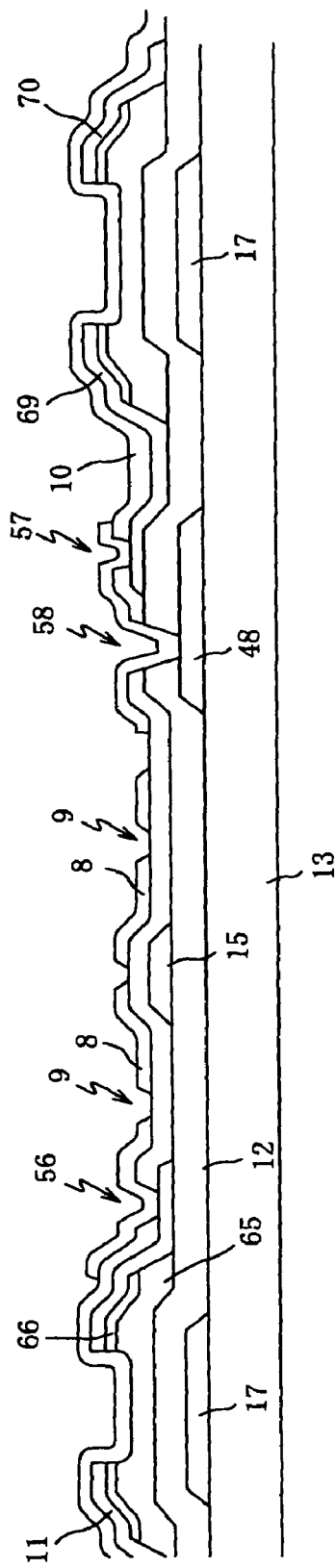
FIG. 67 shows a cross section structural figure of a multi-domain vertically aligned mode liquid crystal panel of the present invention.
Figure 68:
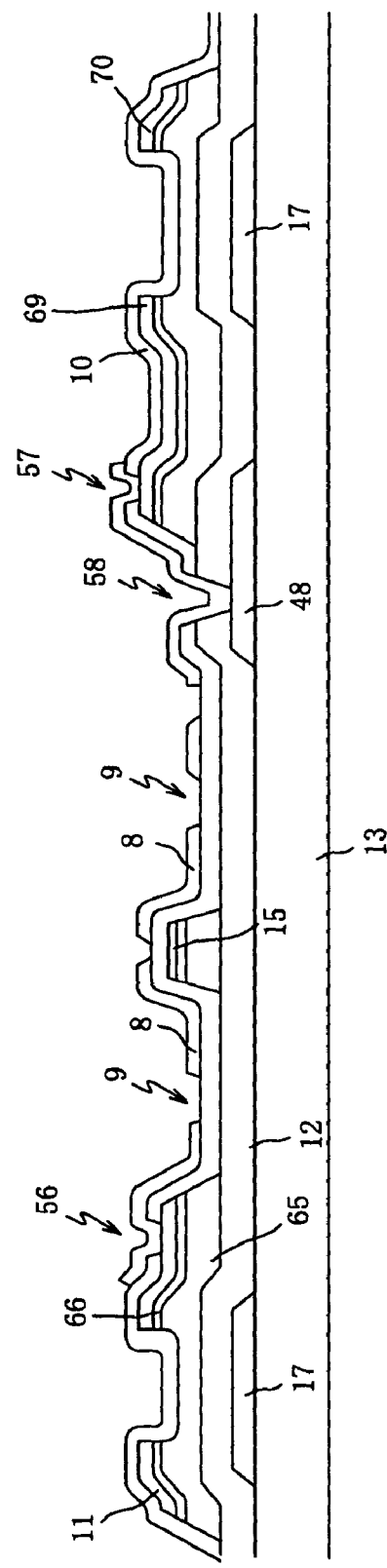
FIG. 68 shows a cross section structural figure of a multi-domain vertically aligned mode liquid crystal panel of the present invention.
Figure 69:
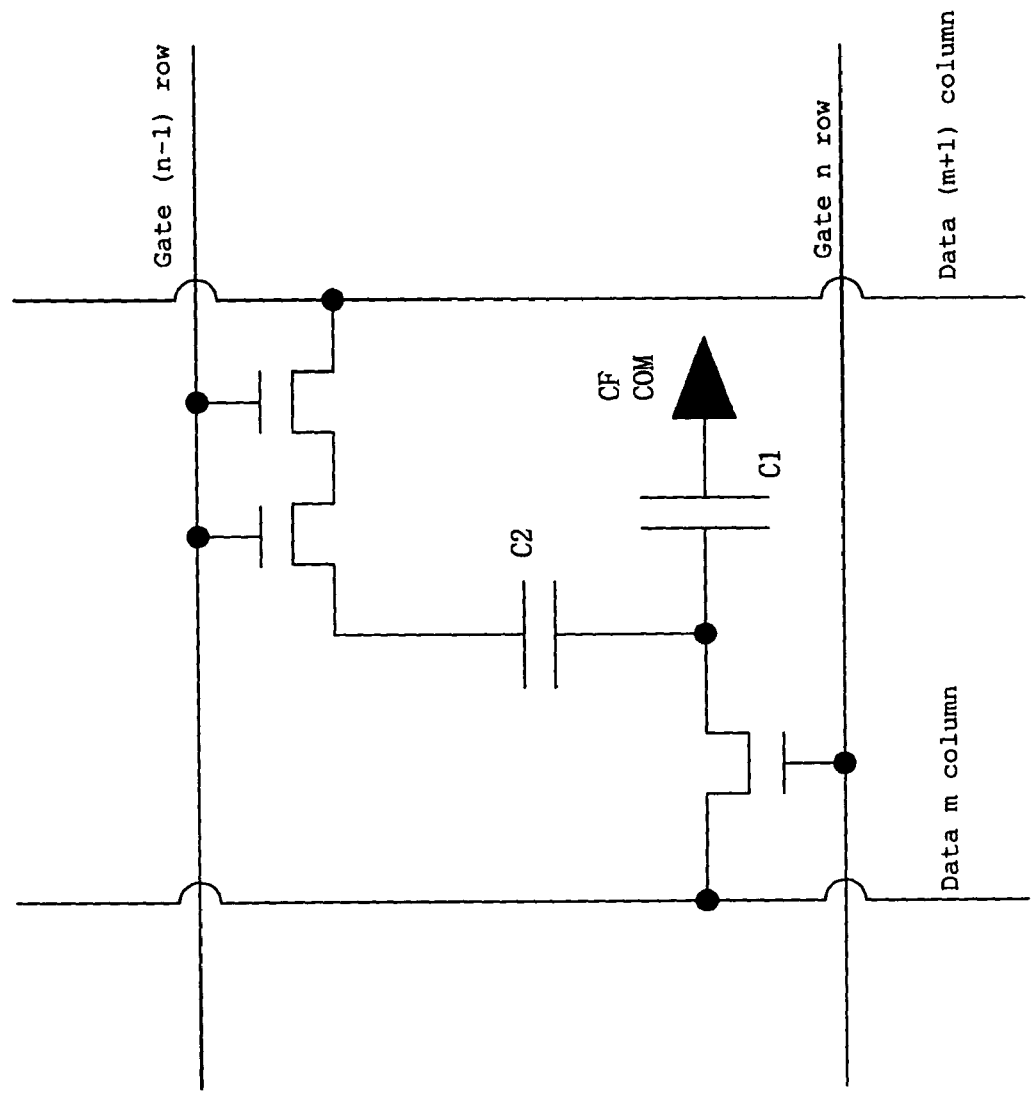
FIG. 69 shows a circuit model figure of a multi-domain vertically aligned mode liquid crystal panel of the present invention.
Figure 70:
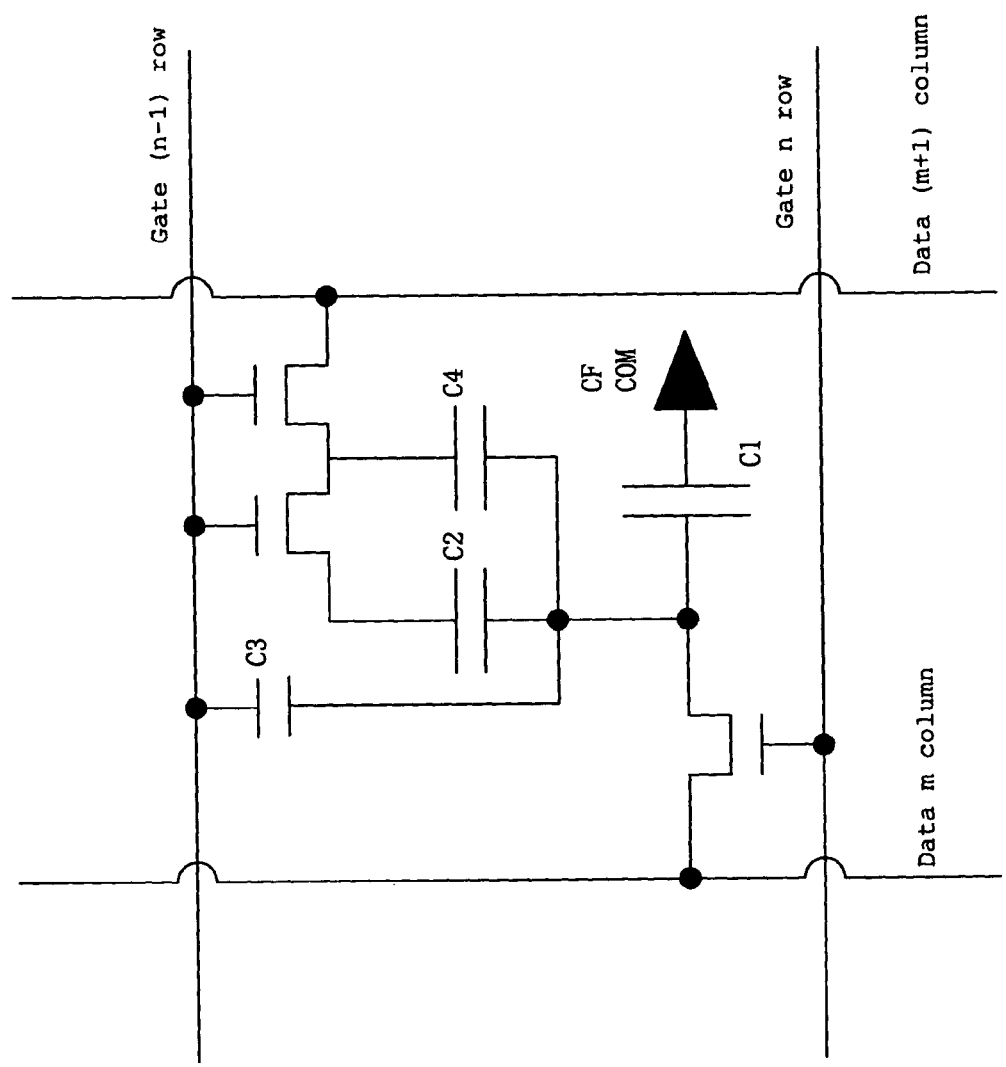
FIG. 70 shows a circuit model figure of a multi-domain vertically aligned mode liquid crystal panel of the present invention.
Figure 71:
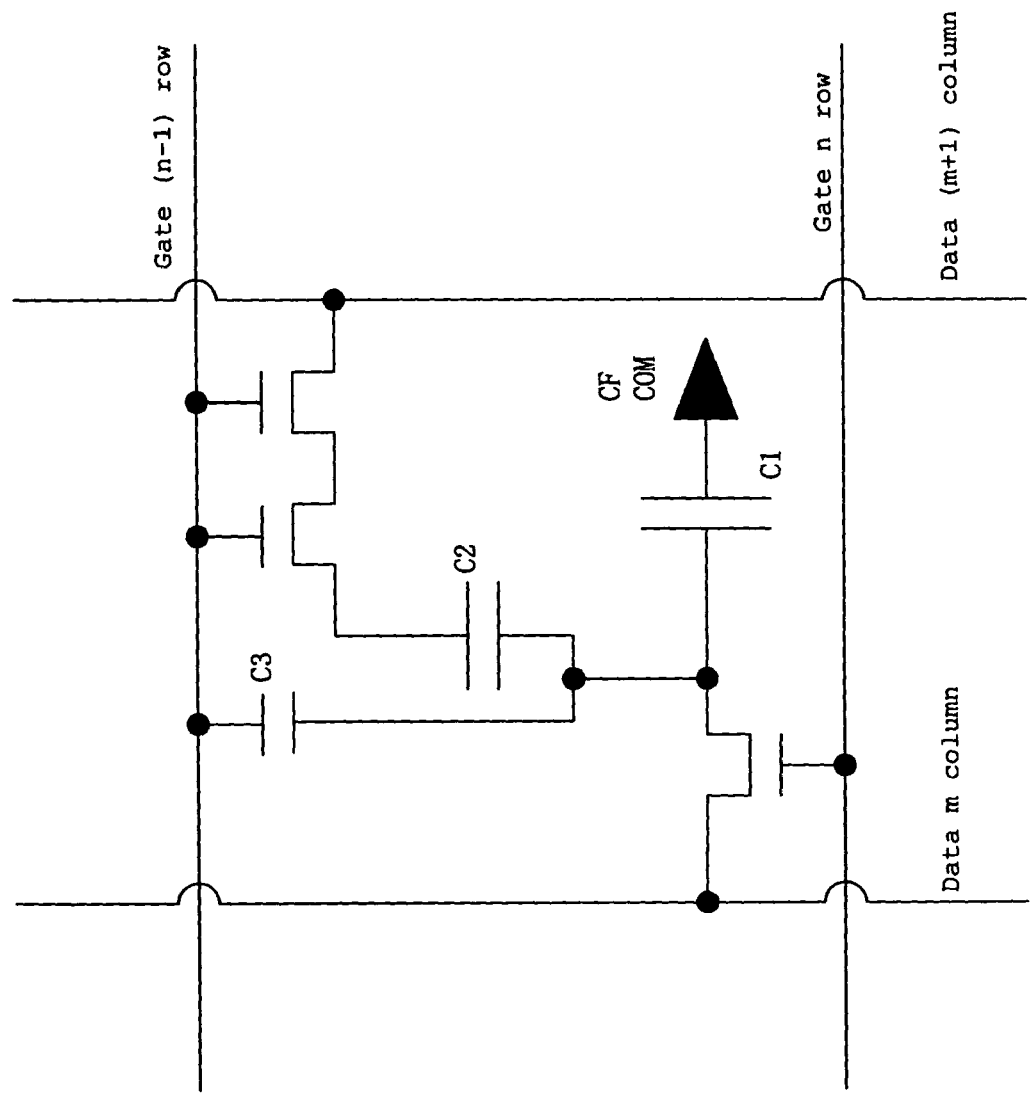
FIG. 71 shows a circuit model figure of a multi-domain vertically aligned mode liquid crystal panel of the present invention.
Figure 72:
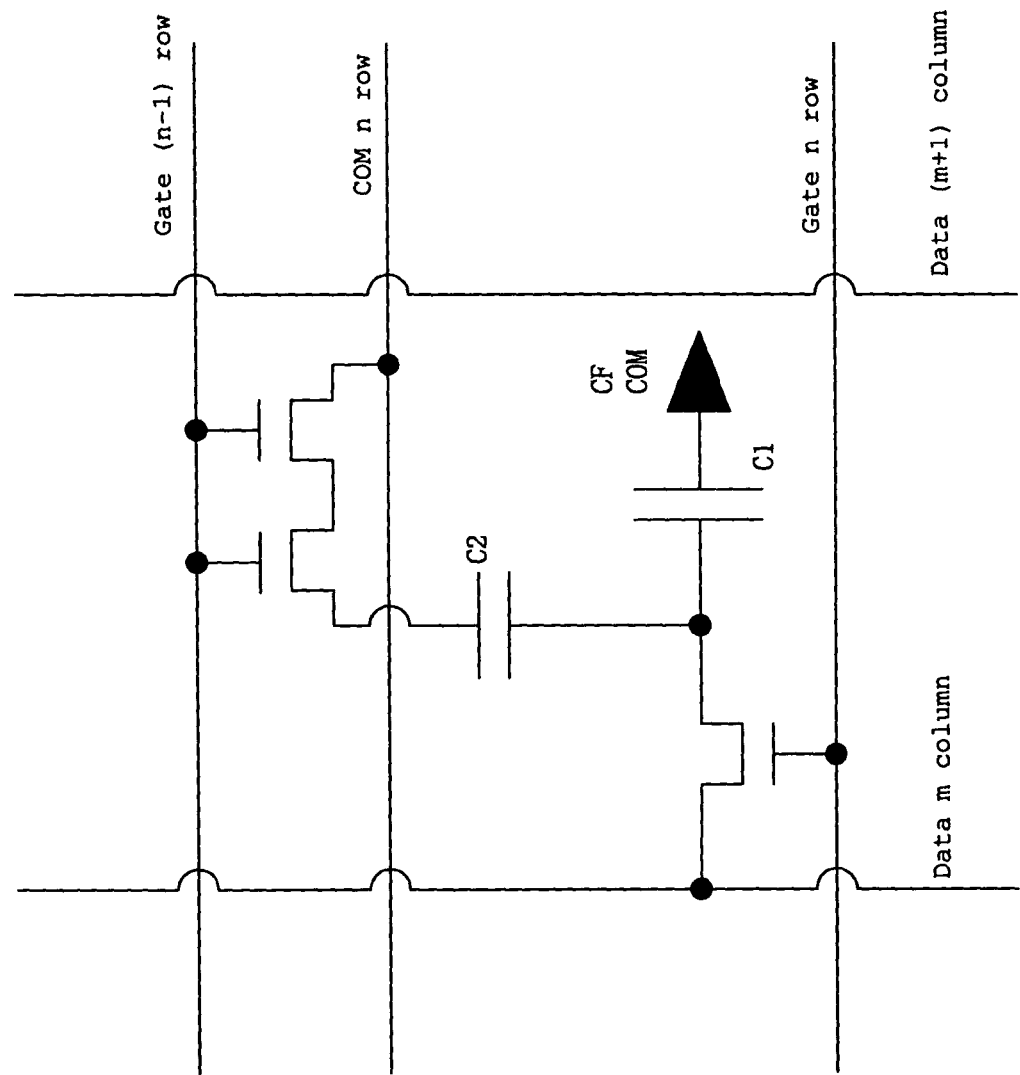
FIG. 72 shows a circuit model figure of a multi-domain vertically aligned mode liquid crystal panel of the present invention.
Figure 73:
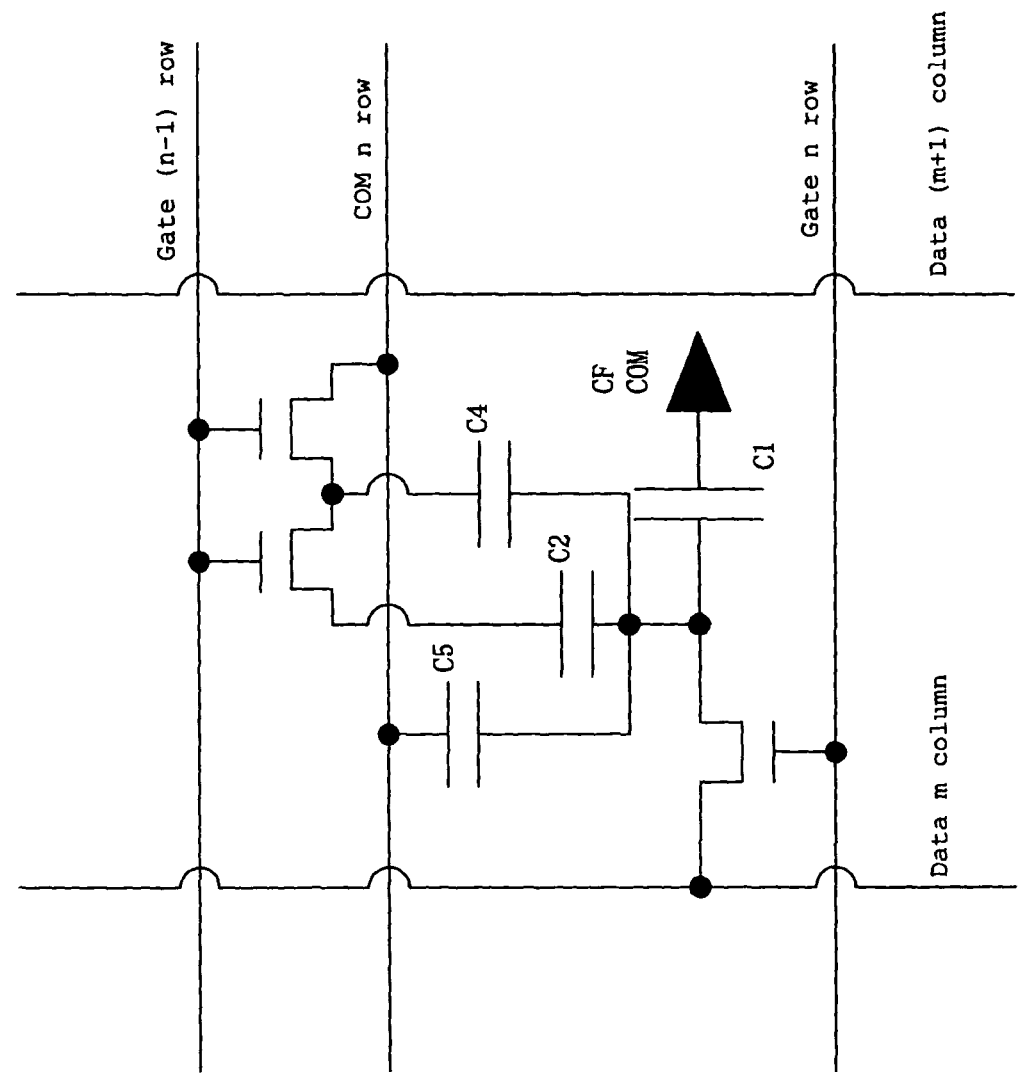
FIG. 73 shows a circuit model figure of a multi-domain vertically aligned mode liquid crystal panel of the present invention.
Figure 74:
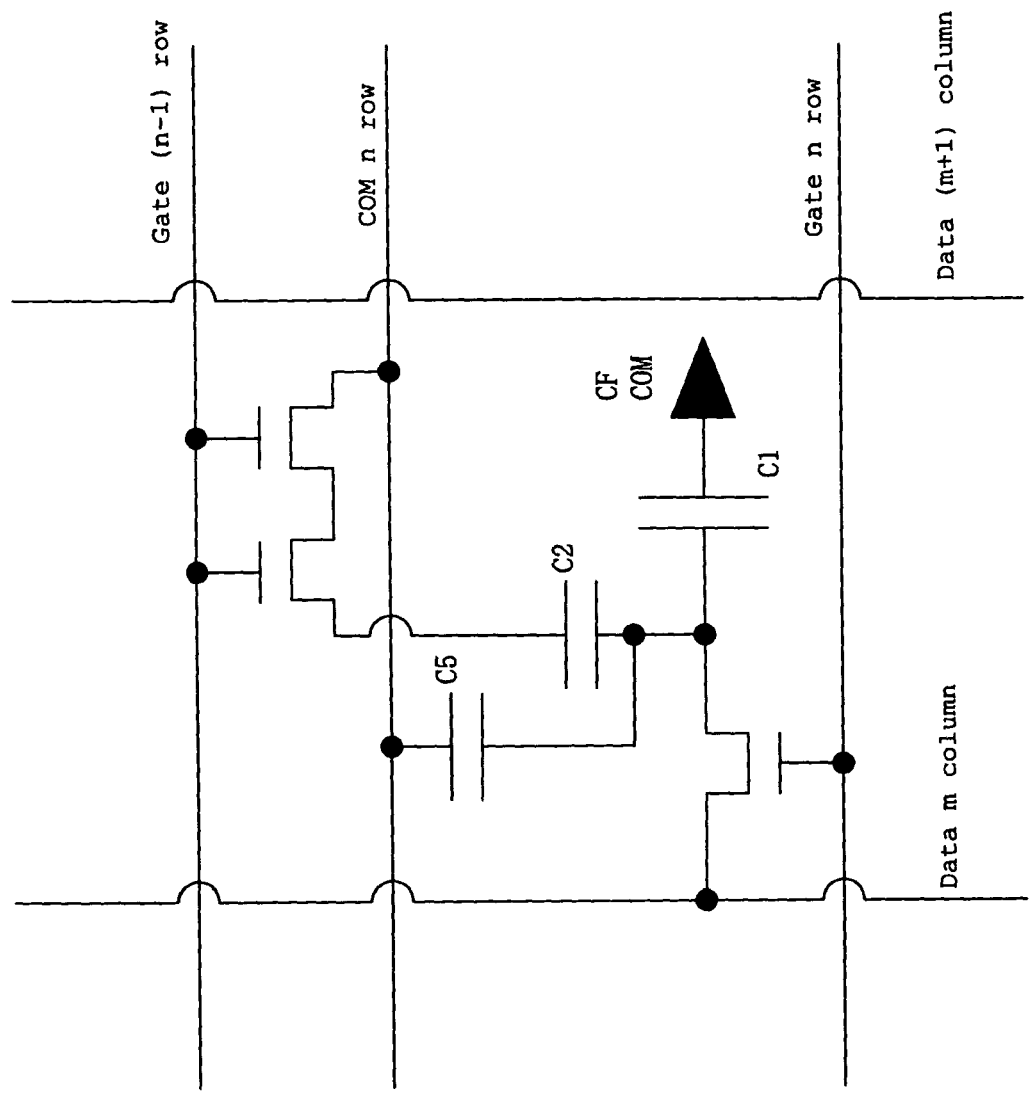
FIG. 74 shows a circuit model figure of a multi-domain vertically aligned mode liquid crystal panel of the present invention.
Figure 75:
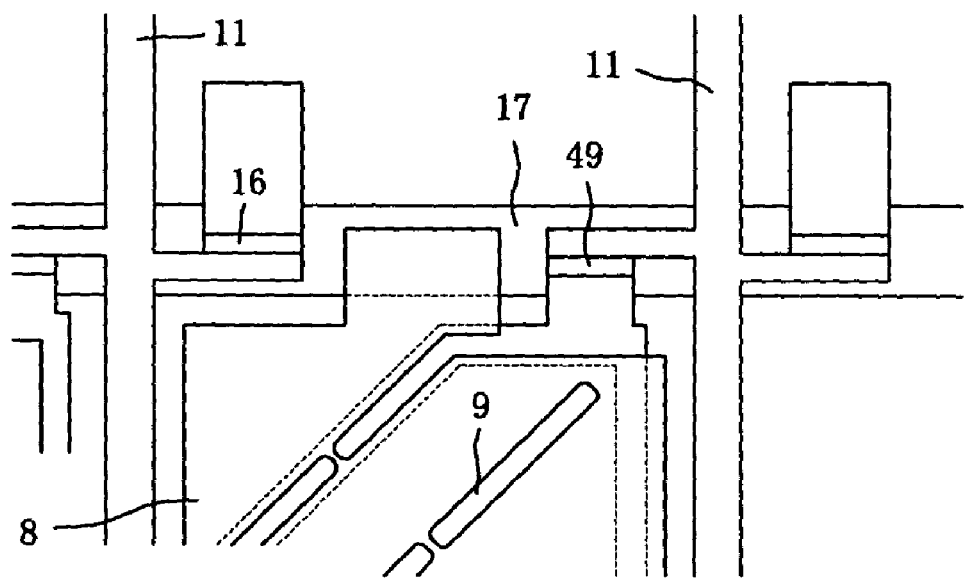
FIG. 75 shows a partial plan view of a multi-domain vertically aligned mode liquid crystal panel of the present invention.
Figure 76:
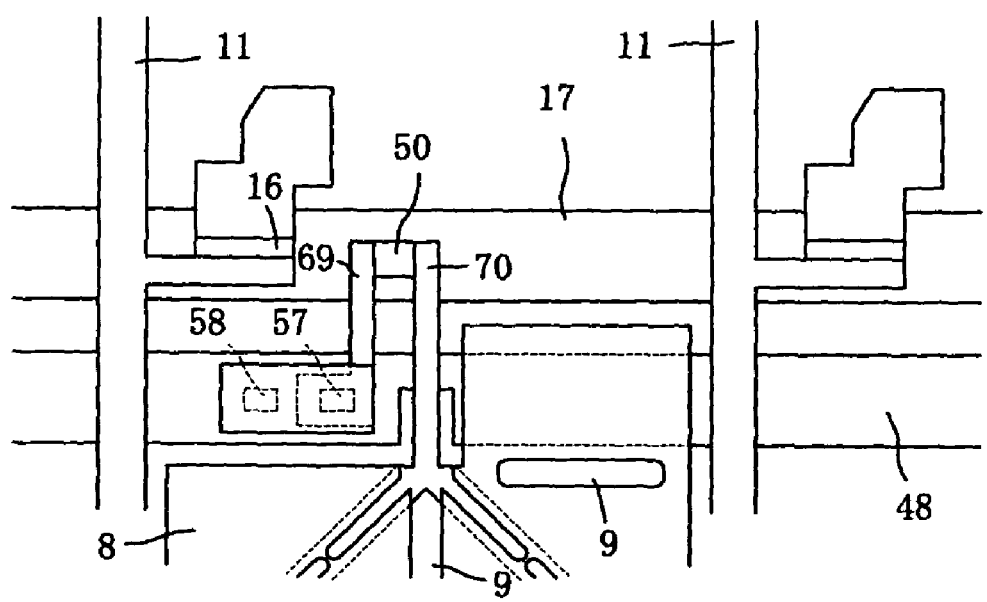
FIG. 76 shows a partial plan view of a multi-domain vertically aligned mode liquid crystal panel of the present invention.
Figure 77:
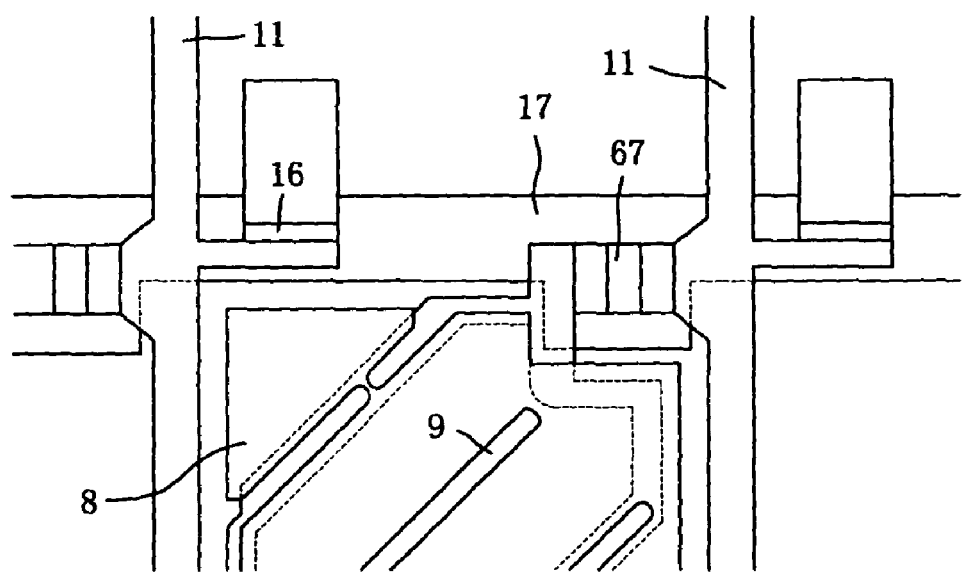
FIG. 77 shows a partial plan view of a multi-domain vertically aligned mode liquid crystal panel of the present invention.
Figure 78:
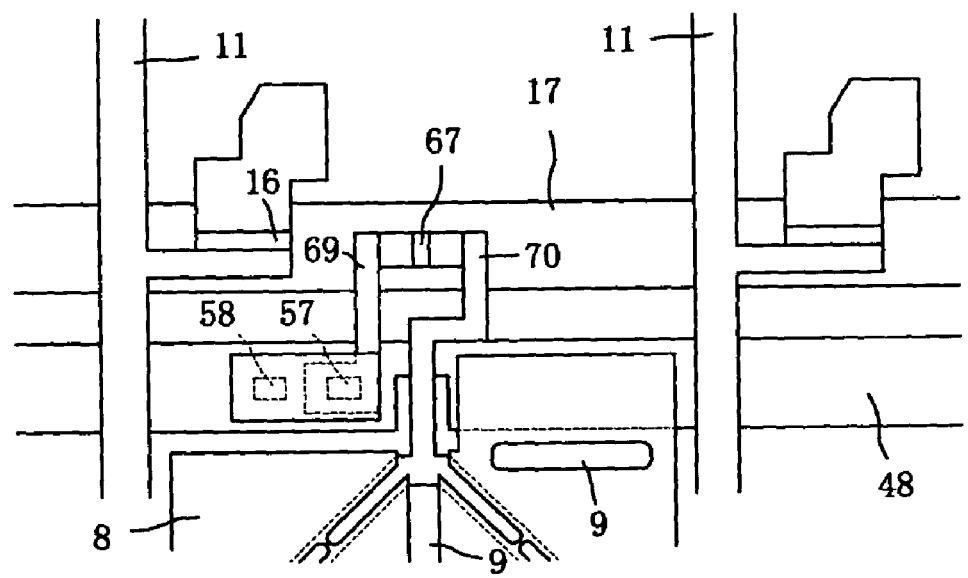
FIG. 78 shows a partial plan view of a multi-domain vertically aligned mode liquid crystal panel of the present invention.
Figure 79:
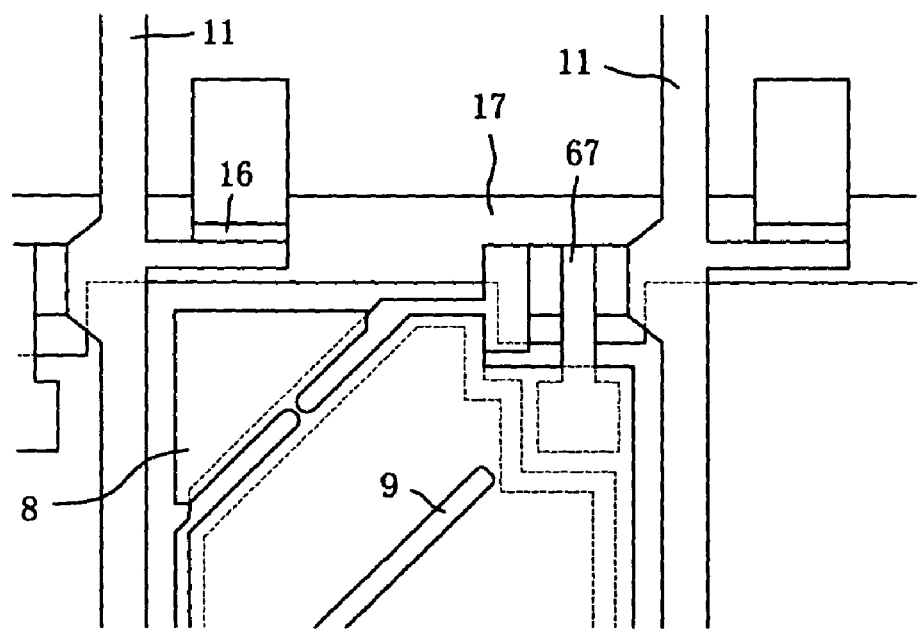
FIG. 79 shows a partial plan view of a multi-domain vertically aligned mode liquid crystal panel of the present invention.
Figure 80:
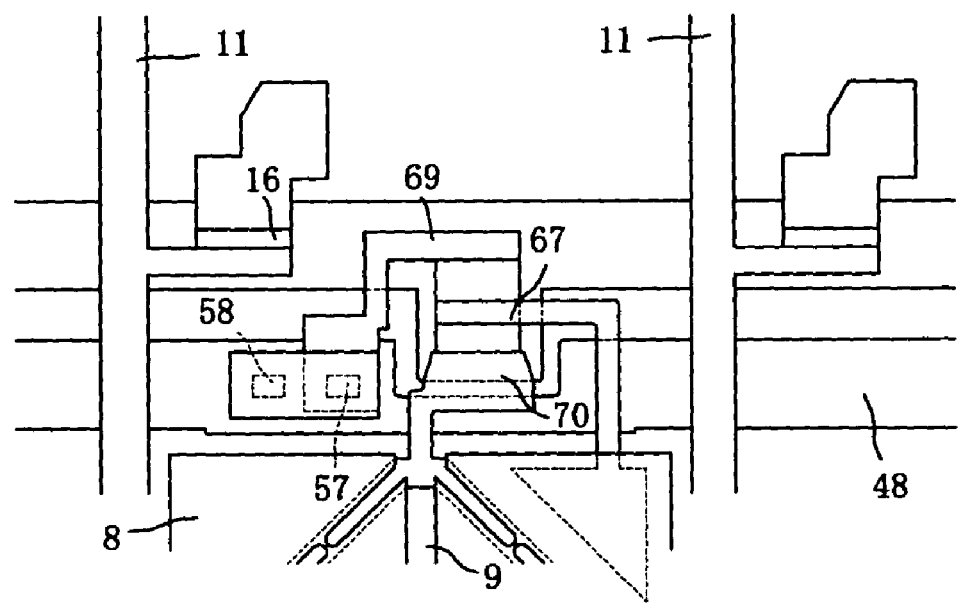
FIG. 80 shows a partial plan view of a multi-domain vertically aligned mode liquid crystal panel of the present invention.
Figure 81:
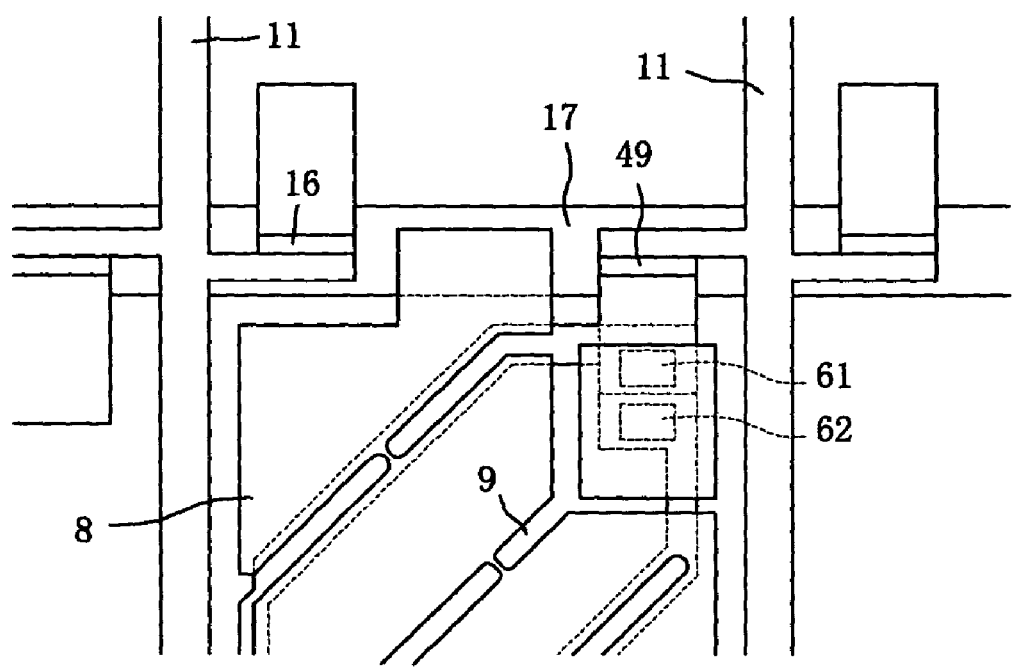
FIG. 81 shows a partial plan view of a multi-domain vertically aligned mode liquid crystal panel of the present invention.
Figure 82:
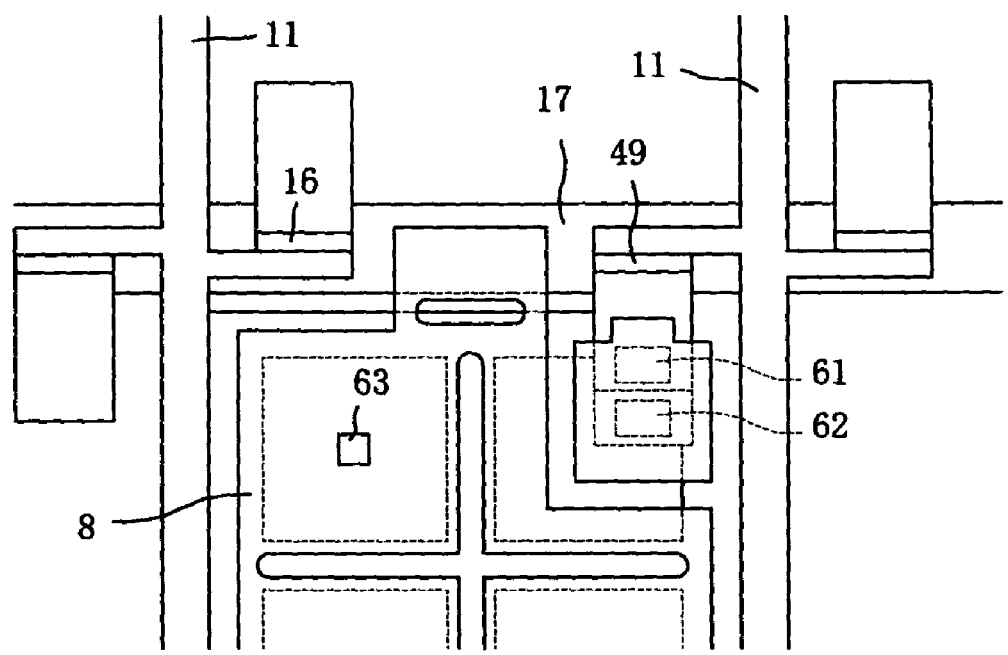
FIG. 82 shows a partial plan view of a multi-domain vertically aligned mode liquid crystal panel of the present invention.
Figure 83:
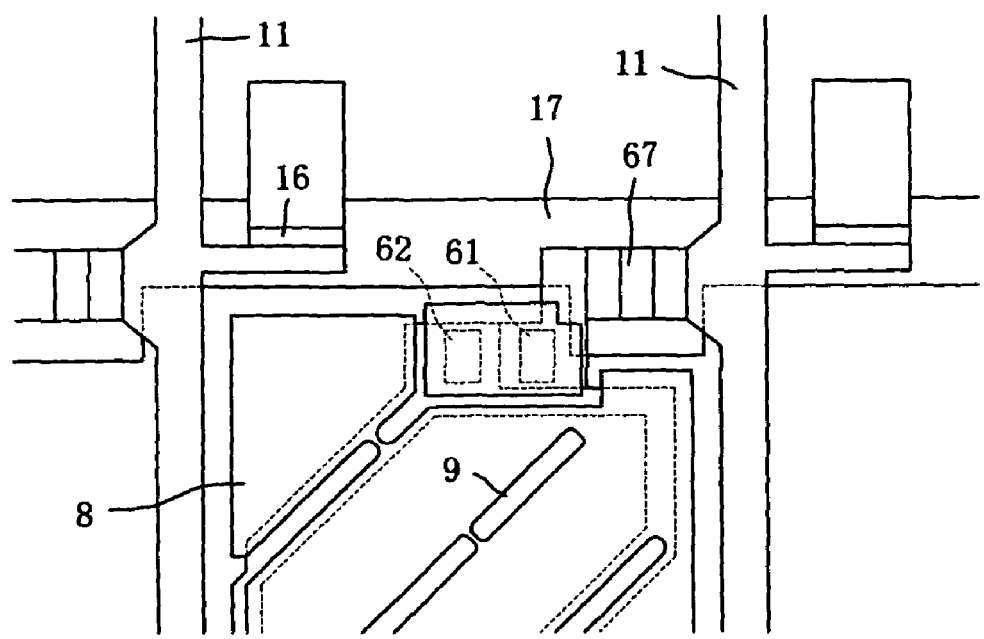
FIG. 83 shows a partial plan view of a multi-domain vertically aligned mode liquid crystal panel of the present invention.
Figure 84:
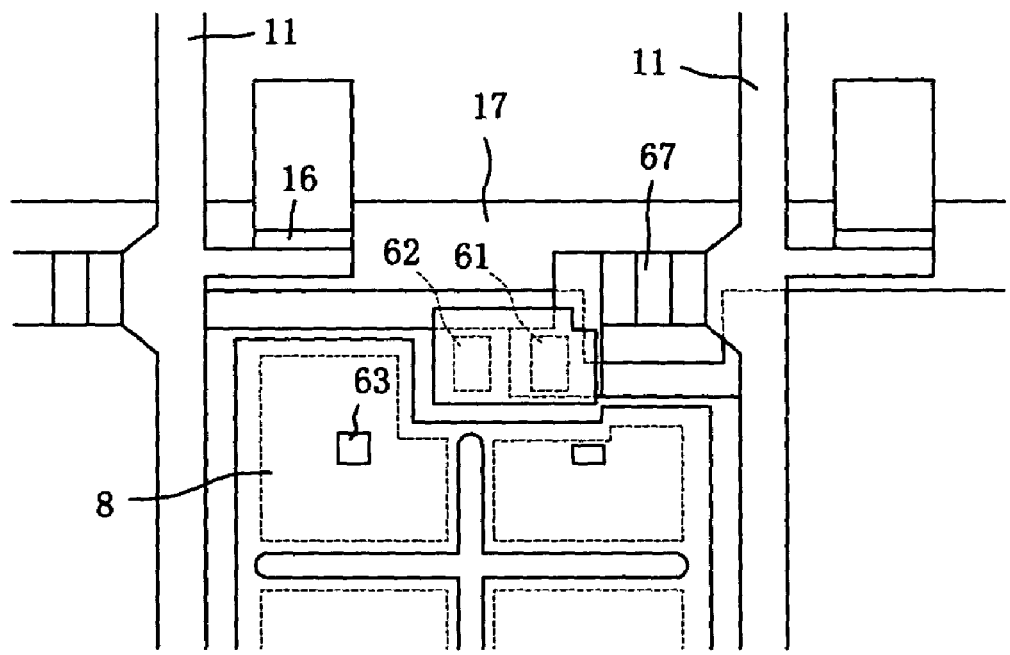
FIG. 84 shows a partial plan view of a multi-domain vertically aligned mode liquid crystal panel of the present invention.
Figure 85:
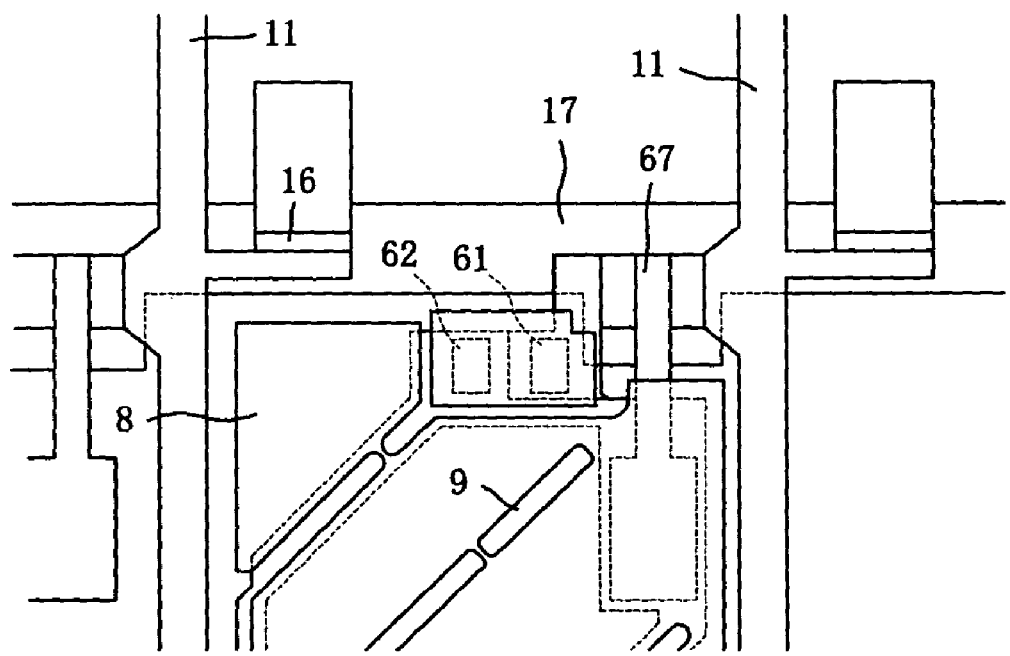
FIG. 85 shows a partial plan view of a multi-domain vertically aligned mode liquid crystal panel of the present invention.
Figure 86:
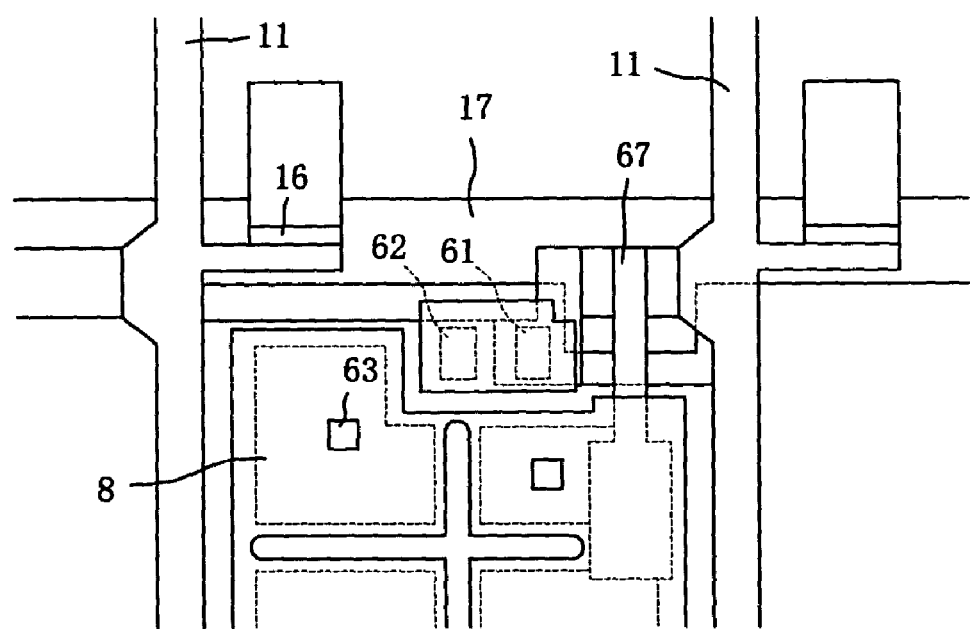
FIG. 86 shows a partial plan view of a multi-domain vertically aligned mode liquid crystal panel of the present invention.

FIG. 67 and FIG. 68 show an expanded sectional view of the TFT array substrate.

A color filter substrate 1 has a flat transparent common electrode 4, and does not have bumps as in Example 12.

In an active matrix substrate 13, after a scan signal wiring 17 and a common electrode 48 in an active matrix side are first formed in the same layer simultaneously, an insulator film 12, an amorphous silicone layer 65 (non doped layer), and n+ amorphous silicone layer 66 for ohmic contacts are deposited. A video signal wiring 11 and a drain electrode are simultaneously formed after formation of a thin film transistor element part.

A thin film transistor element, a video signal wiring, a drain electrode, and a liquid crystal alignment direction control electrode are possible to be prepared in the same layer simultaneously, using a half-tone exposure technique disclosed in Japanese Patent Laid-Open No. 2000-066240. FIG. 68 shows a sectional view of a thin film transistor element and an active matrix substrate of Example 14 of the present invention using the half-tone exposure.

As shown in FIG. 39, in Example 14 of the present invention, a number of thin film transistor elements required in one pixel is only two. A transparent pixel electrode 8 of n row and m column is connected with a thin film transistor element 16 formed in a position where a scan signal wiring of n row 17 and a video signal wiring of m column 11 intersect with each other, and a liquid crystal alignment direction control electrode 15 is connected with a thin film transistor element 50 formed on a scan signal wiring top 17 of (n−1) row. Although a structure of transparent pixel electrode 8 may also have forms as in Example 12 and Example 13, in FIG. 39, slits 9 formed in a transparent pixel electrode 8 are arranged horizontally and vertically to an extending direction of a scan signal wiring 17, and slits forming a group with the liquid crystal alignment direction control electrode 15 are arranged so as to make an angle of ±45 degrees to an extending direction of the scanning line. Since a source electrode 69 of a thin film transistor element 50 formed on the scan signal wiring 17 of (n−1) row and a common electrode 48 of n row are not formed in the same layer in case of Example 14, two contact holes must be formed in order to electrically connect these two electrodes. Accordingly, like Example 13, Example 14 requires two thin film transistor elements 16 and 50 and three contact holes 56, 57, and 58, as shown in FIG. 39.

Example 15

Figure 65:
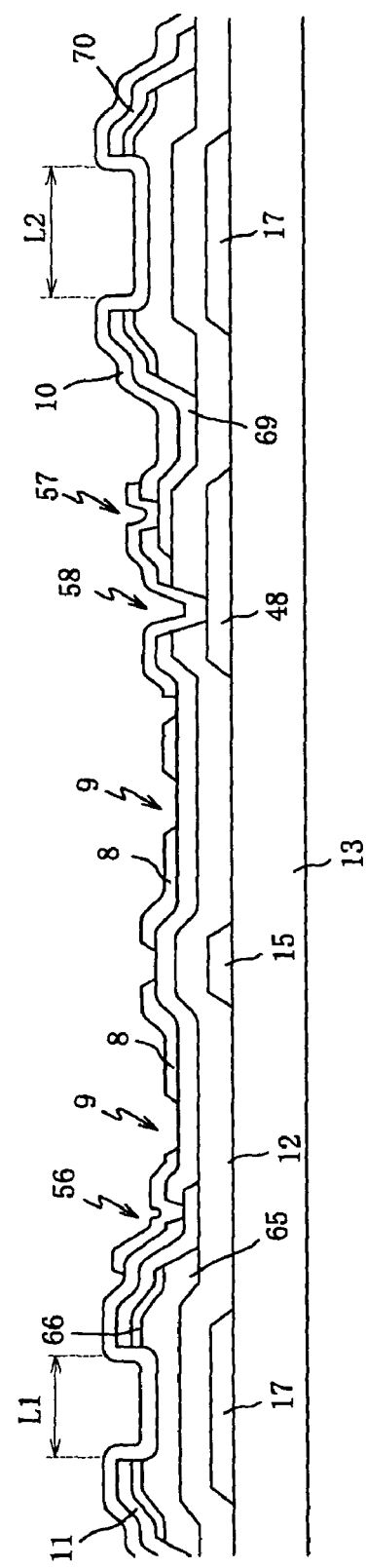
FIG. 65 shows a cross section structural figure of a multi-domain vertically aligned mode liquid crystal panel of the present invention.
Figure 66:
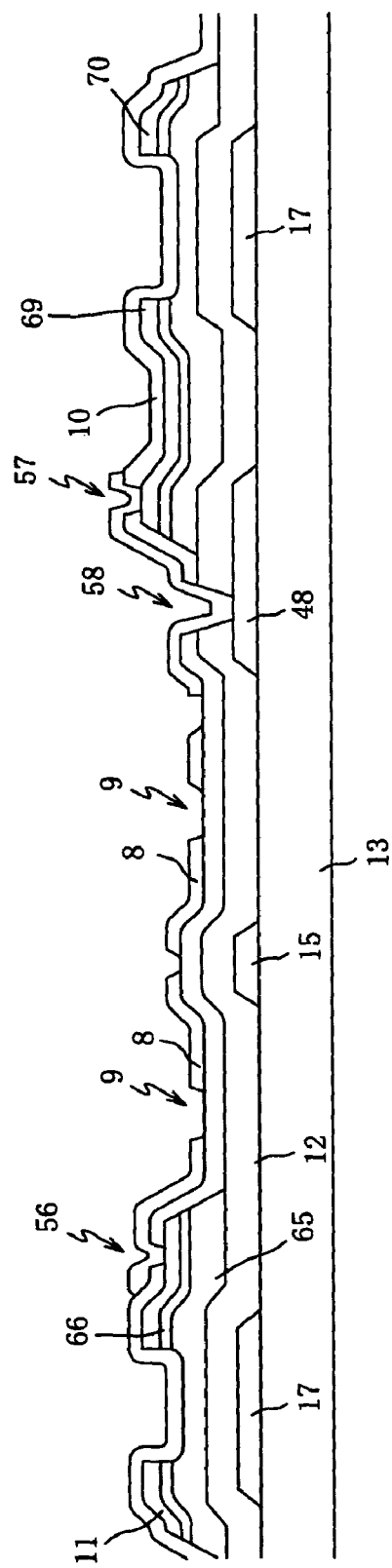
FIG. 66 shows a cross section structural figure of a multi-domain vertically aligned mode liquid crystal panel of the present invention.
Figure 96:
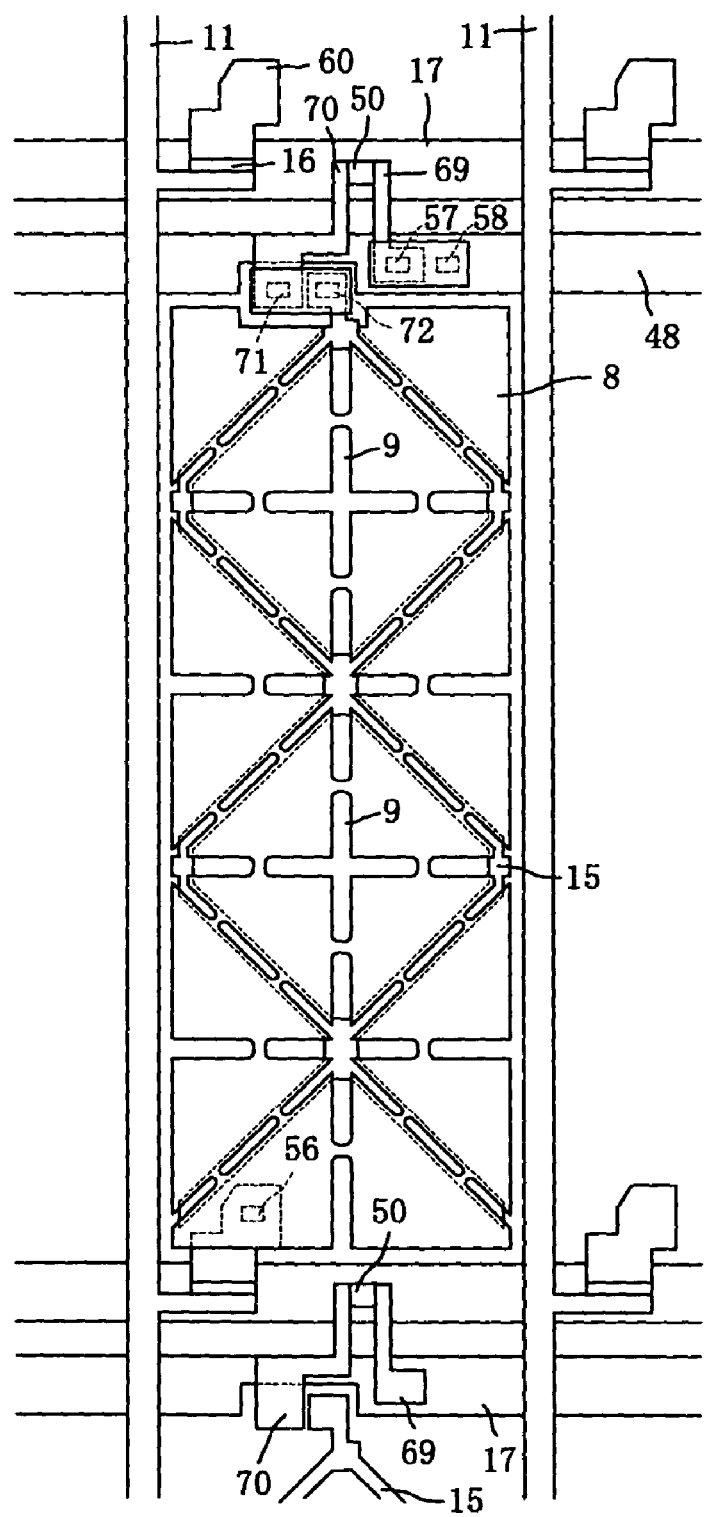
FIG. 96 shows a plane structural figure of a multi-domain vertically aligned mode liquid crystal panel of the present invention.

FIG. 40 and FIG. 96 show a sectional view and a plan view of Example 15 of the present invention. FIG. 57 and FIG. 58 show a manufacturing process flow of a TFT array substrate of Example 15 of the present invention. FIG. 65 and FIG. 66 show an expanded sectional view of the TFT array substrate. A color filter substrate 1 has a flat transparent common electrode 4, and does not have bumps as in Example 12.

In an active matrix substrate 13, after a scan signal wiring 17, a common electrode 48, and a liquid crystal alignment direction control electrode 15 are first formed in the same layer simultaneously, an insulator film 12, an amorphous silicone layer (non doped layer) 65, and an n$^+$ amorphous silicone layer 66 for ohmic contacts are deposited. A video signal wiring 11 and a drain electrode are simultaneously formed after formation of a thin film transistor element. A thin film transistor element, a video signal wiring 11, and a drain electrode are possible to be prepared in the same layer simultaneously, using a half-tone exposure technique disclosed in Japanese Patent Laid-Open No. 2000-066240. FIG. 66 shows a sectional view of a thin film transistor element and an active matrix substrate of Example 14 of the present invention using the half-tone exposure.

As shown in FIG. 96, in Example 15 of the present invention, a number of thin film transistor elements required in one pixel is only two. A transparent pixel electrode 8 of n row and m column is connected with a thin film transistor element 16 formed in a position where a scan signal wiring of n row 17 and a video signal wiring of m column 11 intersect with each other, and a liquid crystal alignment direction control electrode 15 is connected with a thin film transistor element 50 formed on a scan signal wiring 17 top of (n−1) row. In Example 15, in order to electrically connect a source electrode 69 of the thin film transistor element formed on the scan signal wiring of (n−1) row 17, and a drain electrode 70 with a common electrode 48 and the liquid crystal alignment direction control electrode 15, respectively, contact holes 57, 58, 71, and 72, respectively, must be provided. Accordingly, Example 15 requires two thin film transistor elements 16 and 50 and five contact holes 56, 57, 58, 71, and 72 as shown in FIG. 96.

Example 16

Figure 37:
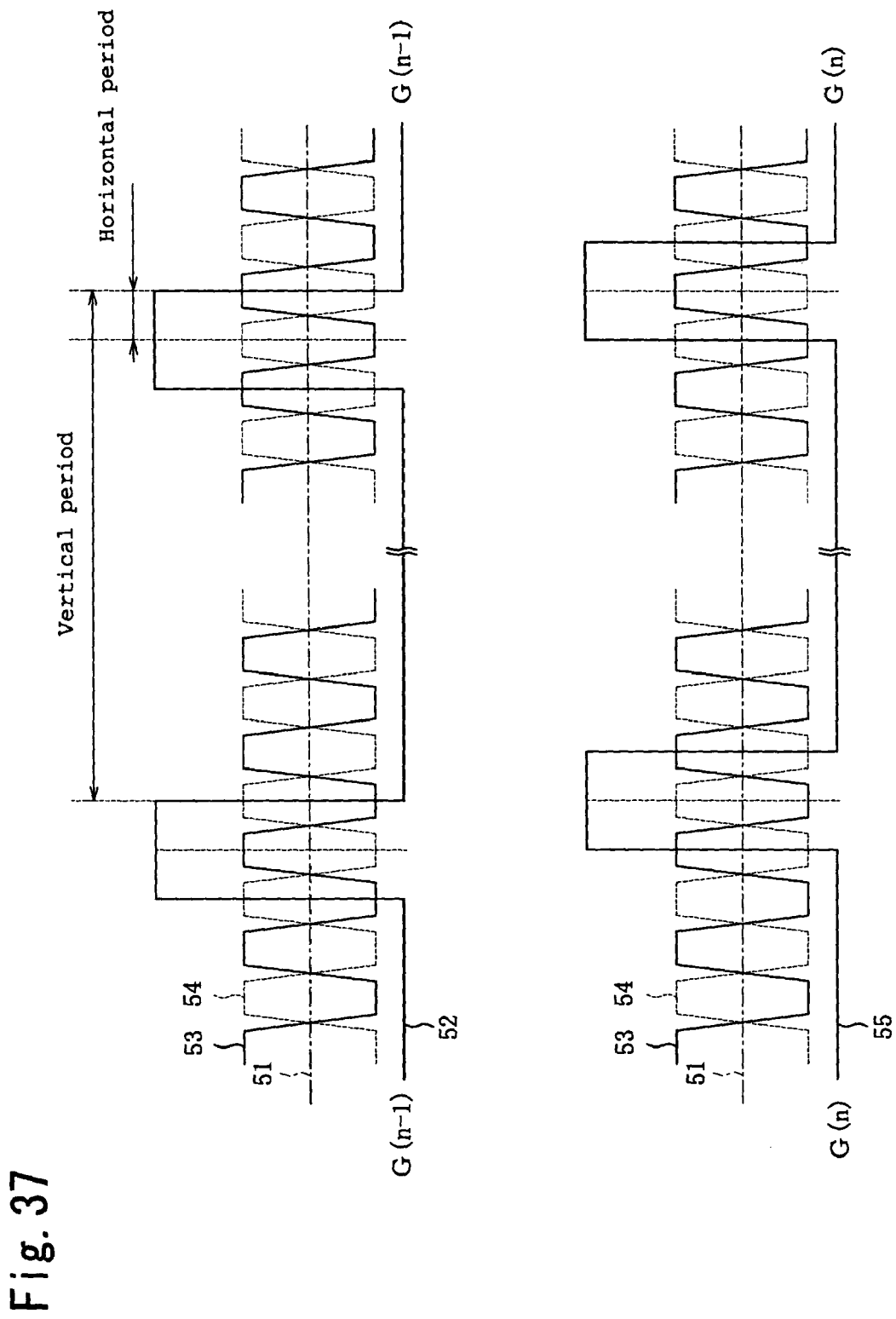
FIG. 37 shows a drive voltage waveform of a multi-domain vertically aligned mode liquid crystal panel of the present invention.

FIG. 37 shows a timing chart regarding a drive waveform in Example 16 of the present invention. This is a drive waveform for driving a vertically aligned mode liquid crystal display described in Examples 12, 13, 14, and 15. An important aspect of the present invention in Example 16 is that:

a scan signal waveform of a scan signal wiring of (n−1) row (address signal width) 52 and a signal waveform of a scan signal wiring of n row (address signal width 55 have a time width of at least no less than twice of a horizontal period, and mutually overlap by a time width no less than one horizontal period; and a polarity of a voltage of a video signal wiring of m column and a polarity of a voltage of a video signal wiring of (m+1) column are different from each other and mutually reversed every horizontal period.

FIG. 37 shows a common electrode potential 51, a video signal wiring of m column signal waveform 53, and a video signal wiring of (m+1) column signal waveform 54.

Figure 47:
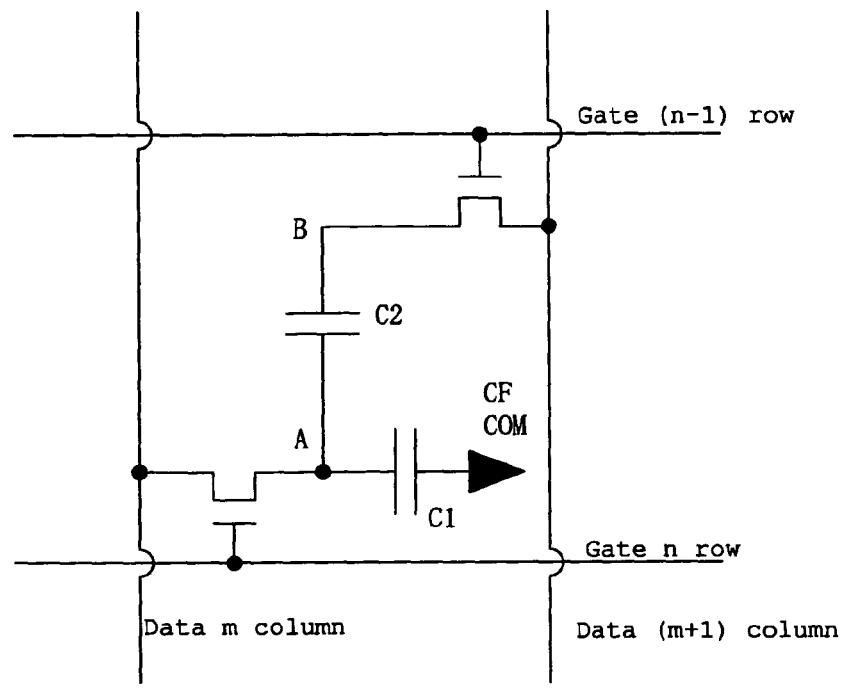
FIG. 47 shows a circuit model figure of a multi-domain vertically aligned mode liquid crystal panel of the present invention.
Figure 48:
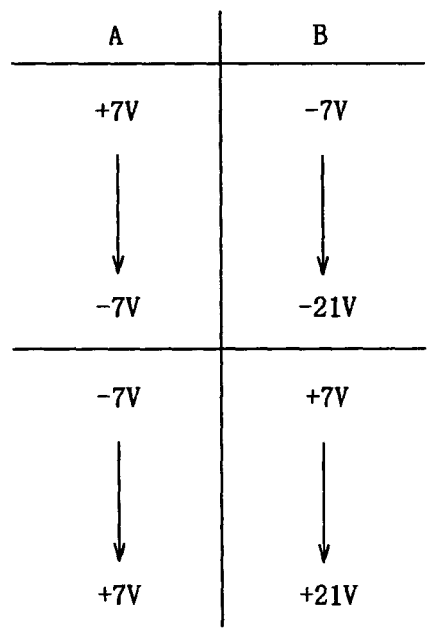
FIG. 48 shows a table showing potentials of A and B in the circuit model figure of FIG. 47.
Figure 49:
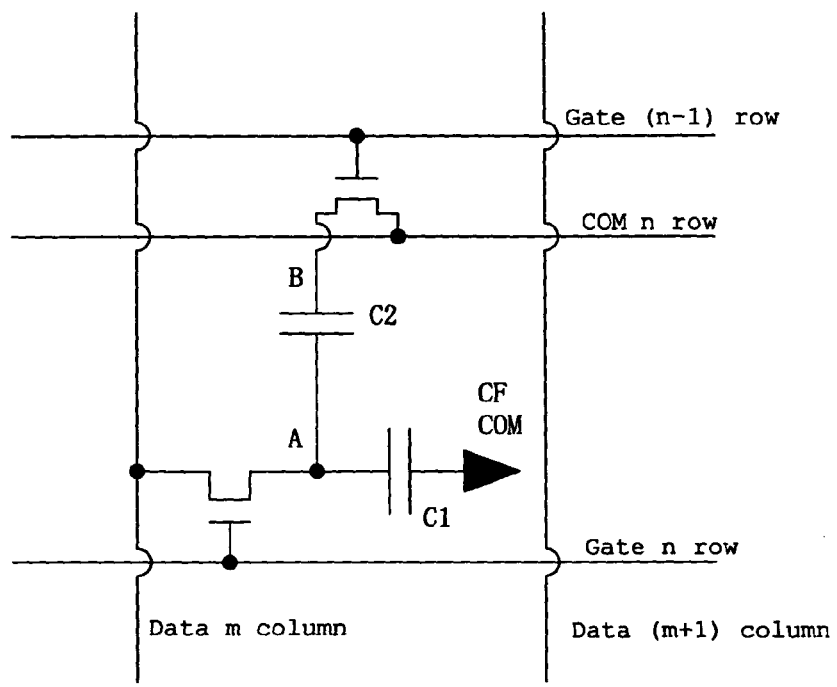
FIG. 49 shows a circuit model figure of a multi-domain vertically aligned mode liquid crystal panel of the present invention.
Figure 50:
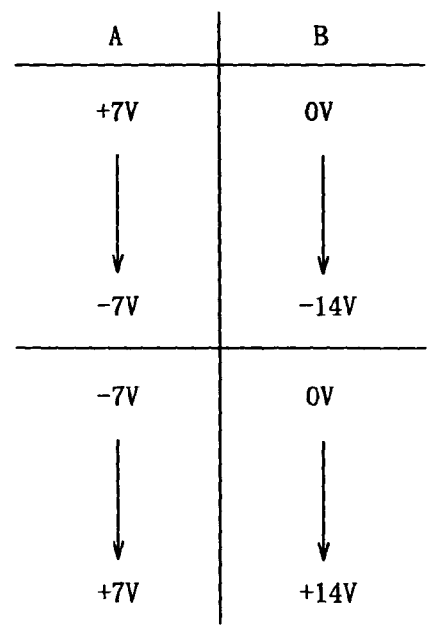
FIG. 50 shows a table showing potentials of A and B in the circuit model figure of FIG. 47.

When a drive system of the present invention is used, it is possible to charge a capacitance C2 of a circuit model figure (capacitance C2 is a capacitance formed when a transparent pixel electrode and a liquid crystal alignment direction control electrodes mutually overlap via an insulator film), when a signal waveform of a scan signal wiring of (n−1) row and a signal waveform of a scan signal wiring of n row mutually overlap, as shown in FIG. 47, FIG. 48, FIG. 49, and FIG. 50. Here, FIG. 48 shows a potential of a position shown by A and B in a circuit model figure of FIG. 47, and FIG. 50 shows a potential of a position shown by A and B in a circuit model figure of FIG. 49.

In FIG. 47 and FIG. 48 a liquid crystal alignment direction control electrode is connected with a thin film transistor element formed in a position where a video signal wiring of (m+1) column intersects a scan signal wiring of (n−1) row, a transparent pixel electrode is connected with a thin film transistor element formed in a position where a scan signal wiring of n row and a video signal wiring of m column intersect with each other. When both of scanning lines of (n−1) row and n row are selected in case of a video signal wiring of m column having +7 V and a video signal wiring of (m+1) column having −7 V, the above-mentioned two thin film transistor elements operate, and a capacitance C2 is charged and potentials of A and B become +7 V and −7 V, respectively. After the scanning line of (n−1) row is closed, when a polarity of a voltage of the video signal wiring of m column is changed to −7 V from +7 V and a polarity of a voltage of the video signal wiring of (m+1) column is changed to +7 V from −7 V, since a thin film transistor element of n row is operating, a potential of A of capacitance C2 changes to −7 V from +7 V. Since a thin film transistor element of (n−1) row is not operating at this time, a potential of B of capacitance C2 changes to −21 V from −7 V. Next, when the scanning line of n row is closed, potentials of pixel of n row m column capacitance C2 are changed so that A is fixed to −7 V and B is fixed to −21 V.

Same operation is performed after one vertical period, and since a polarity of the signal voltage of video signal wiring of m column and a polarity of the signal voltage of video signal wiring of (m+1) column are reversed, in potential of capacitance C2 after one vertical period, A is fixed to +7V, and B is fixed to +21V. Such potential relationship occurs, thereby a distribution of equipotential line as shown in figure are realized, and a motion direction of liquid crystal molecules may be determined. Since a large electric field is generated between the transparent pixel electrode and the liquid crystal alignment direction control electrode, a high motion speed of liquid crystal molecule can be realized.

In FIG. 49 and FIG. 50, a liquid crystal alignment direction control electrode is connected with a thin film transistor element formed on a scan signal wiring of (n−1) row, and a source electrode of this thin film transistor element is connected with a common electrode of n row. A transparent pixel electrode is connected with a thin film transistor element formed in a position where a scan signal wiring of n row and a video signal wiring of m column intersect with each other. When both of scanning lines of (n−1) row and n row are selected in case of a video signal wiring of m column having +7 V and a video signal wiring of (m+1) column having −7 V, the above-mentioned two thin film transistor elements operate, and a capacitance C2 is charged and potentials of A and B become +7 V and 0 V, respectively. After the scanning line of (n−1) row is closed, when a polarity of a voltage of the video signal wiring of m column is changed to −7V from +7V and a polarity of a voltage of the video signal wiring of (m+1) column is changed to +7V from −7V, since a thin film transistor element of n row is operating, a potential of A of capacitance C2 changes to −7V from +7V. Since a thin film transistor element of (n−1) row is not operating at this time, a potential of B of capacitance C2 changes to −14V from 0 V. Next, when the scanning line of n row is closed, in potential of pixel of n row m column capacitance C2, A is fixed to −7 V and B to −21 V.

Same operation is performed after one vertical period, and since a polarity of the signal voltage of video signal wiring of m column and a polarity of the signal voltage of video signal wiring of (m+1) column are reversed, the potential of capacitance C2 after one vertical period is changed so that, A is fixed to +7 V, and B is fixed to +14 V. Such potential relationships occur, thereby a distribution of equipotential line as shown in figure may be realized, and a motion direction of liquid crystal molecules may be determined.

Example 17

FIG. 44, FIG. 59, FIG. 60, FIG. 45, and FIG. 46 show a plan view and a sectional view of Example 17 of the present invention. FIG. 53 and FIG. 54 show a manufacturing process flow of a TFT array substrate of Example 17 of the present invention. FIG. 61 and FIG. 62 show an expanded sectional view of the TFT array substrate.

A color filter substrate 1 has a flat transparent common electrode 4, and does not have bumps as in Example 12. A connection method of a liquid crystal alignment direction control electrode 15 and a thin film transistor element is completely same as in Example 13.

Figure 44:
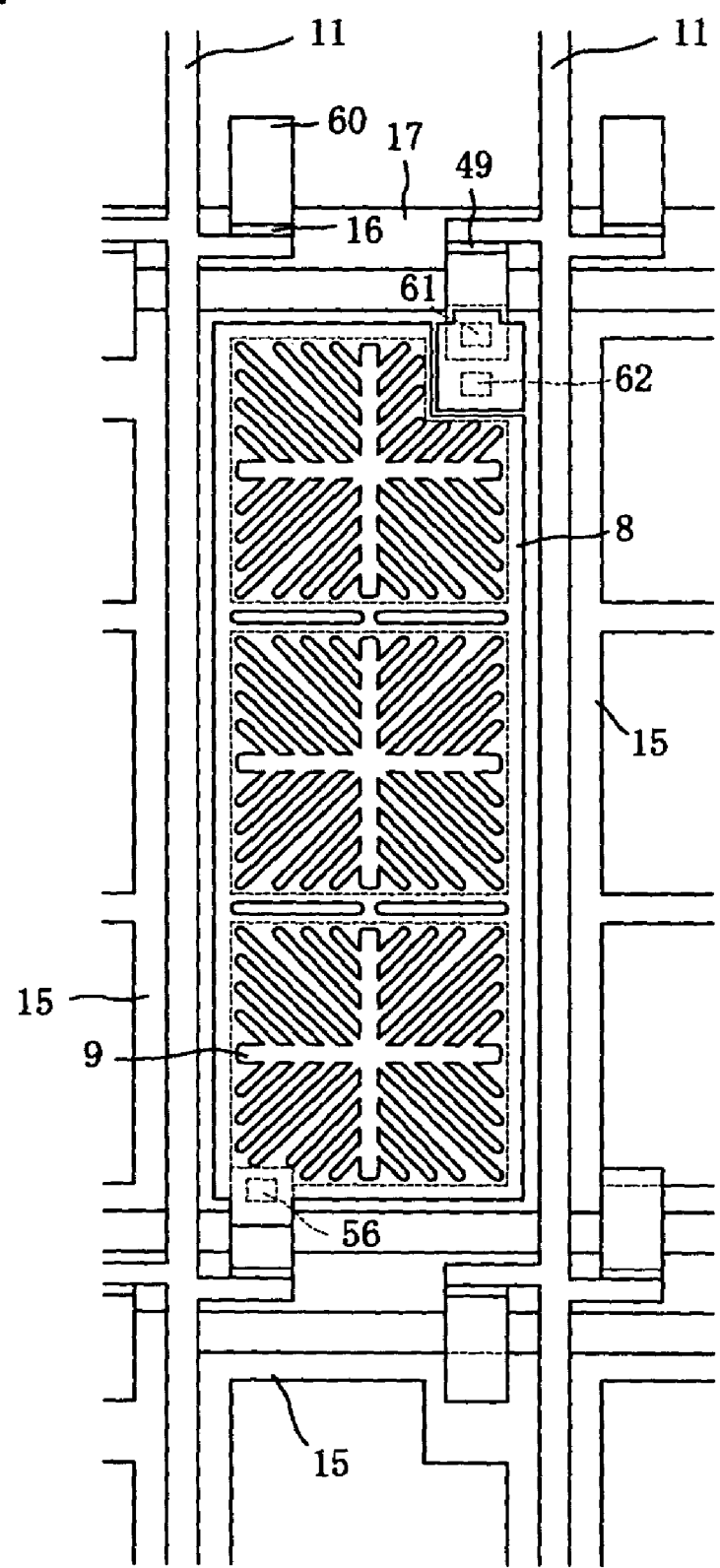
FIG. 44 shows a plane structural figure of a multi-domain vertically aligned mode liquid crystal panel of the present invention.
Figure 45:
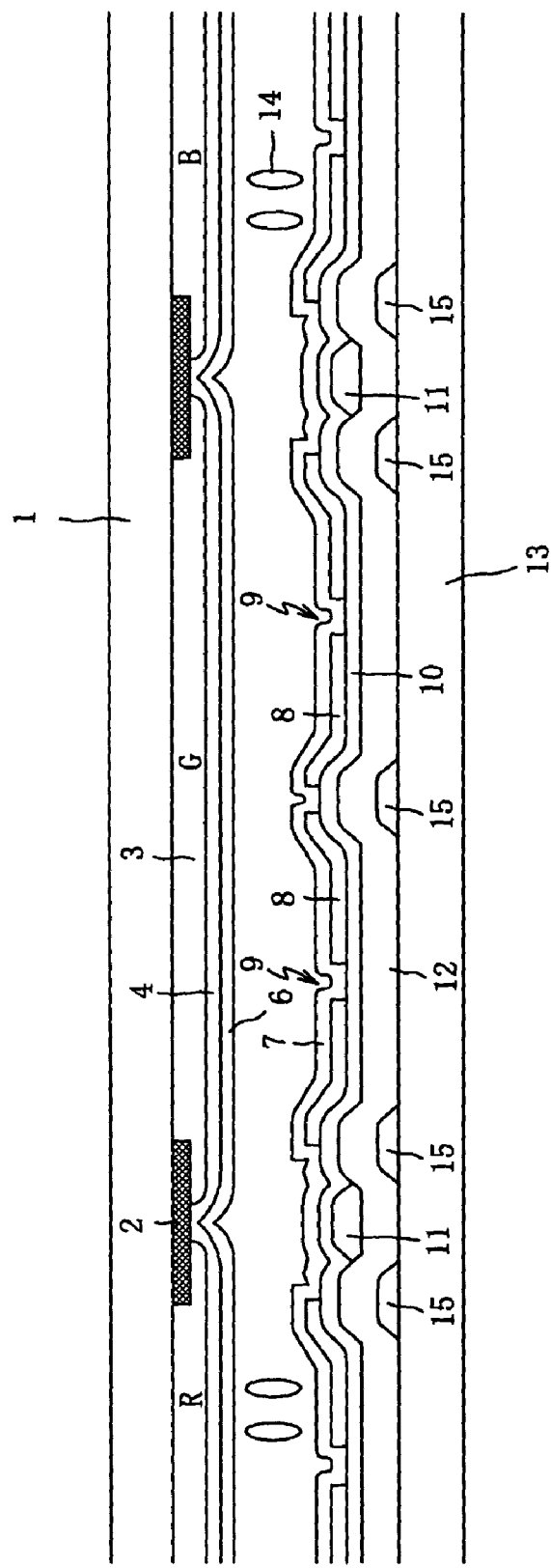
FIG. 45 shows a cross section structural figure of a multi-domain vertically aligned mode liquid crystal panel of the present invention.
Figure 46:
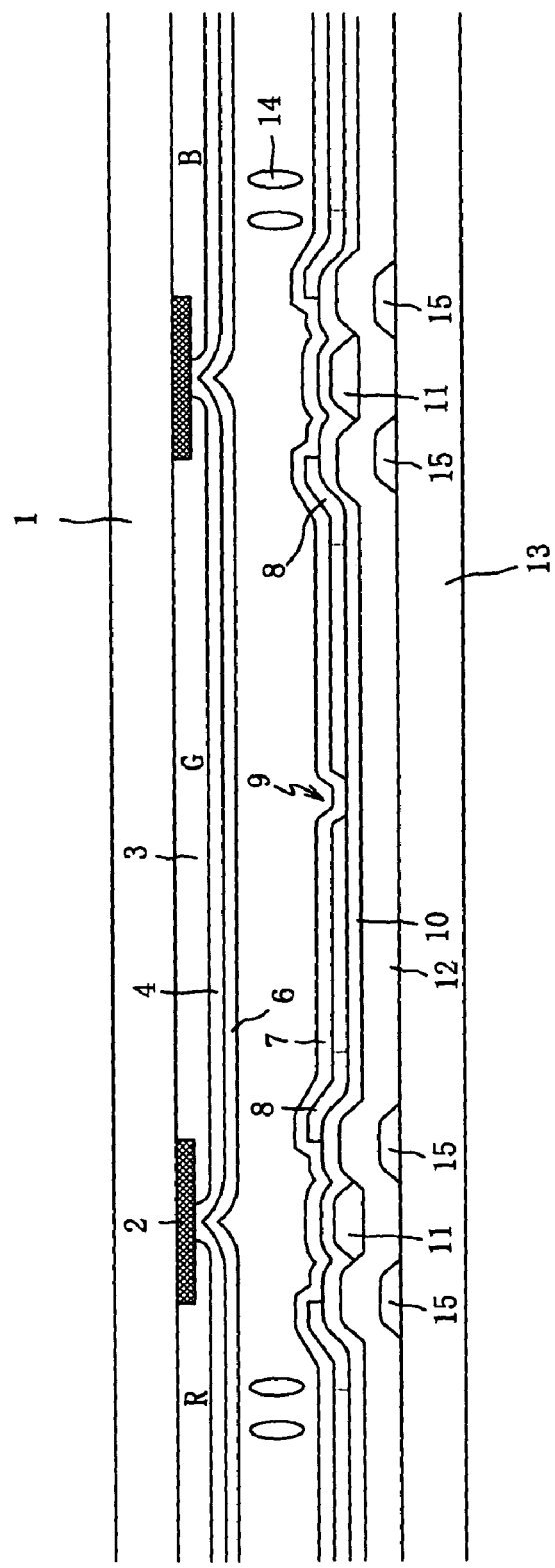
FIG. 46 shows a cross section structural figure of a multi-domain vertically aligned mode liquid crystal panel of the present invention.
Figure 59:
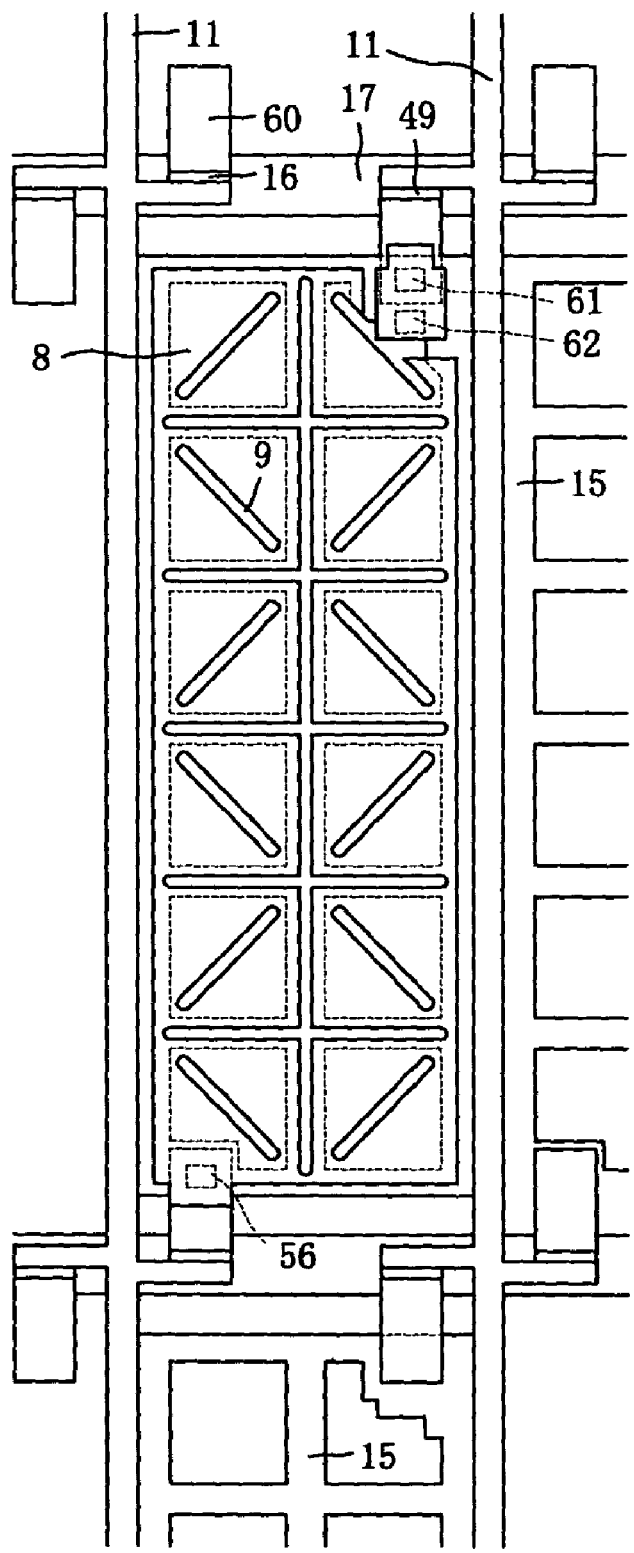
FIG. 59 shows a plane structural figure of a multi-domain vertically aligned mode liquid crystal panel of the present invention.
Figure 60:
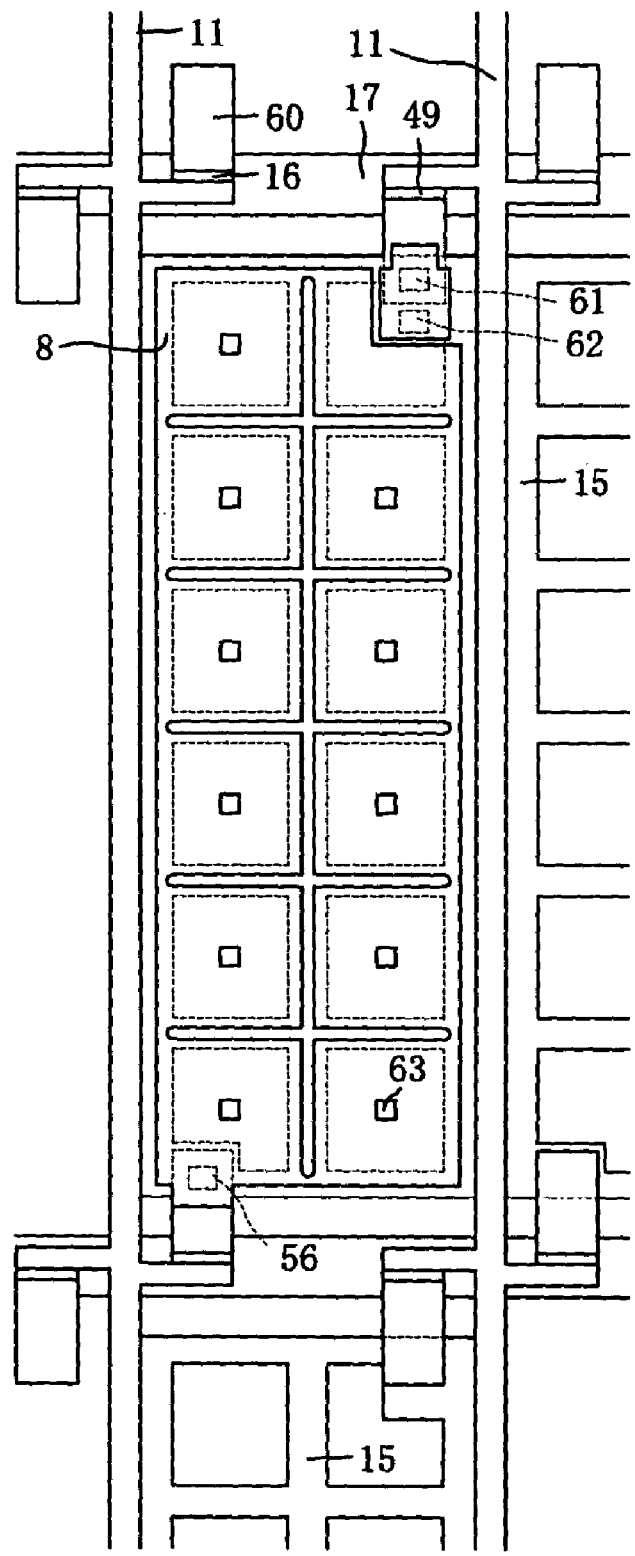
FIG. 60 shows a plane structural figure of a multi-domain vertically aligned mode liquid crystal panel of the present invention.

In Example 17, slits formed in a transparent pixel electrode 8 has different forms from that in Example 13, they comprise a form arranged at ±45 degrees to a direction of the scan signal wirings, a form arranged horizontally or vertically, or a form having circular of polygonal openings 63, as shown in FIG. 44, FIG. 59, and FIG. 60. A liquid crystal alignment direction control electrode 15 encloses periphery of a transparent pixel electrode 8, as shown in FIG. 44, FIG. 59, and FIG. 60, and the liquid crystal alignment direction control electrode 15 forming a group with a slit is arranged horizontally or vertically to a direction of a scan signal wiring 17.

Example 18

Figure 91:
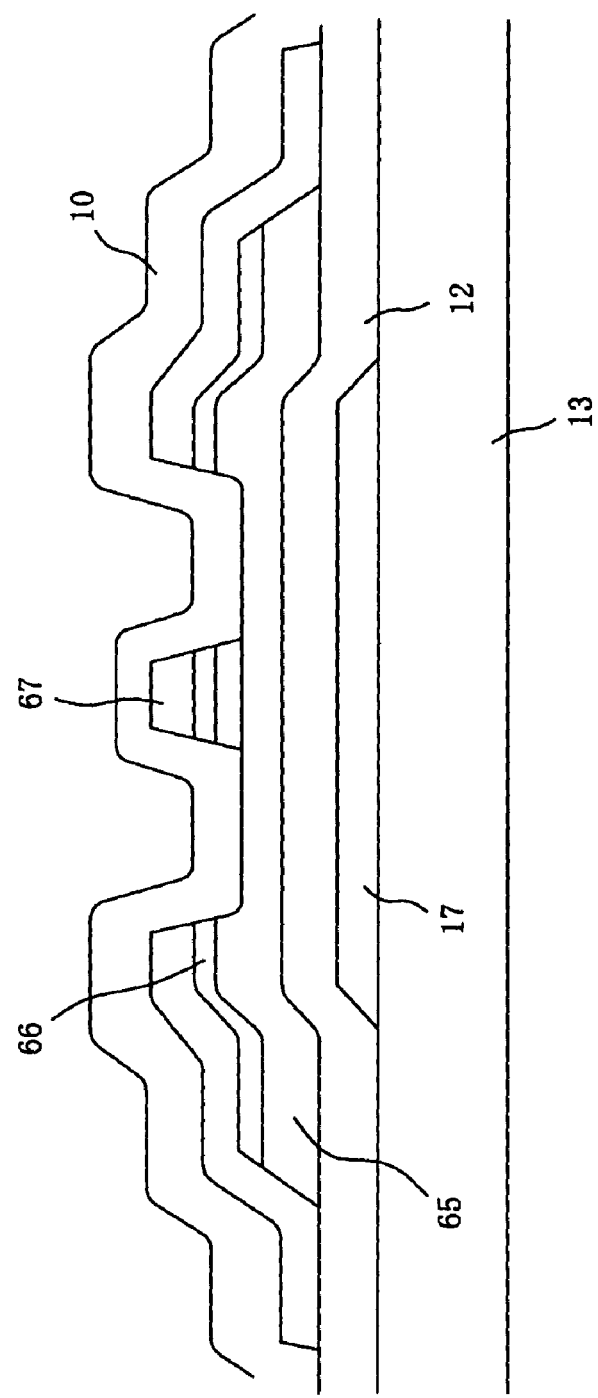
FIG. 91 shows a sectional view of a double gate thin film transistor element for multi-domain vertically aligned mode liquid crystal panels of the present invention.
Figure 92:
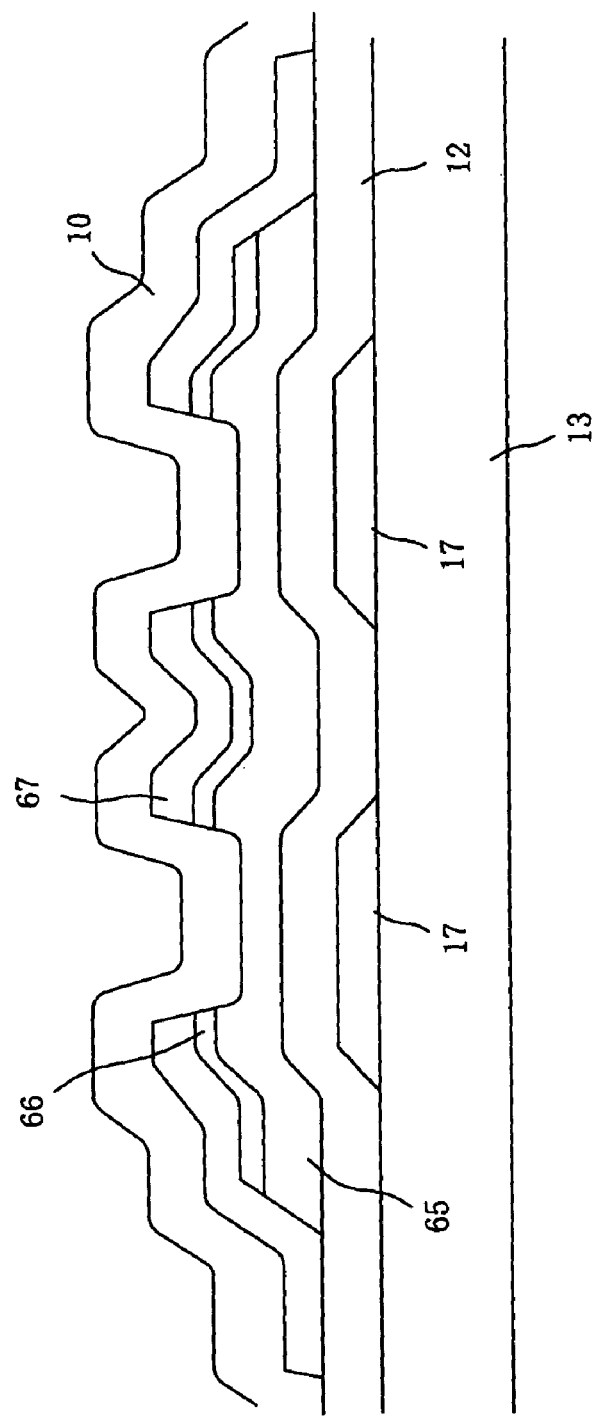
FIG. 92 shows a sectional view of a double gate thin film transistor element for multi-domain vertically aligned mode liquid crystal panels of the present invention.

FIG. 69, FIG. 70, FIG. 71, FIG. 72, FIG. 73, and FIG. 74; and FIG. 77, FIG. 78, FIG. 79, FIG. 80, FIG. 83, FIG. 84, FIG. 85, FIG. 86; and FIG. 91 and FIG. 92 show a circuit model figure of Example 18 of the present invention, and a plan view and sectional view of a thin film transistor.

Here, C1 is a capacitance formed with a transparent pixel electrode 8 and a flat transparent common electrode 4 in a CF (color filter) substrate side; C2 is a capacitance formed with the transparent pixel electrode 8 and a liquid crystal alignment direction control electrode 15; C3 is a capacitance formed with the transparent pixel electrode 8 and a scanning line; C4 is a capacitance formed with an intermediate electrode 67 of a double thin film transistor, and the transparent pixel electrode 8; and C5 is a capacitance formed with the transparent pixel electrode 8, and a common electrode 48 in an active matrix substrate side.

As already described in Example 16 of the present invention, when a drive system of the present invention is used, since a voltage impressed between electrodes of a video signal wiring of (m+1) column connected with a thin film transistor element formed on a scan signal wiring of (n−1) row and a liquid crystal alignment direction control electrode reaches about 28 V at the maximum, a problem occurs that a leakage current between these two electrodes increases. Accordingly, in Example 18 of the present invention, a double transistor structure is adopted as a structure of a thin film transistor element that is formed on a scan signal wiring 17 of (n−1) row, and is connected with a liquid crystal alignment direction control electrode 15. As shown in FIG. 91 and FIG. 92, the double transistor structure has a channel length longer than usual single transistor element, and even if a high voltage is impressed between a source electrode and a drain electrode, it can suppress increase in a leakage current. When not using a double transistor structure, it is also effective for reduction of a leakage current to lengthen a channel length of a transistor. As shown in FIG. 61 or FIG. 65, a channel length ($L_2$) of a thin film transistor element connected with a liquid crystal alignment direction control electrode is set larger than a channel length ($L_1$) of a thin film transistor element connected with a transparent pixel electrode, and thereby a leakage current may be reduced.

Figure 87:
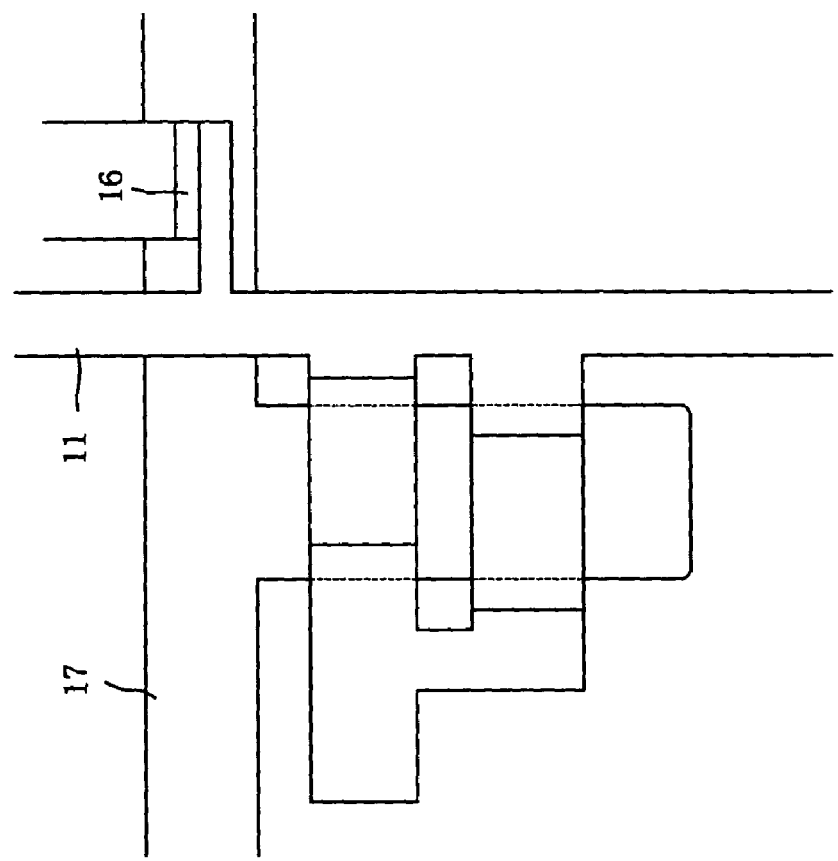
FIG. 87 shows a plan view of an offset thin film transistor element for multi-domain vertically aligned mode liquid crystal panels of the present invention.
Figure 88:
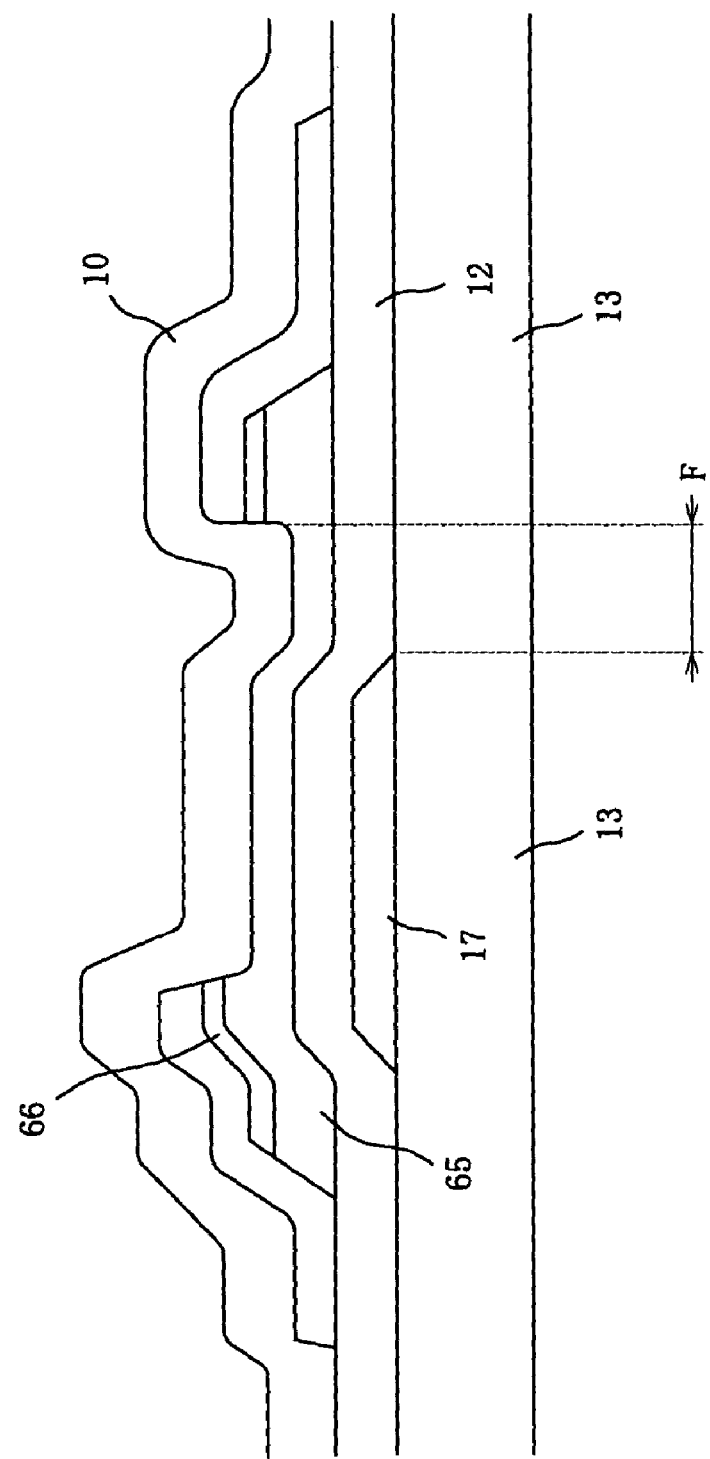
FIG. 88 shows a sectional view of an offset thin film transistor element for multi-domain vertically aligned mode liquid crystal panels of the present invention.
Figure 89:
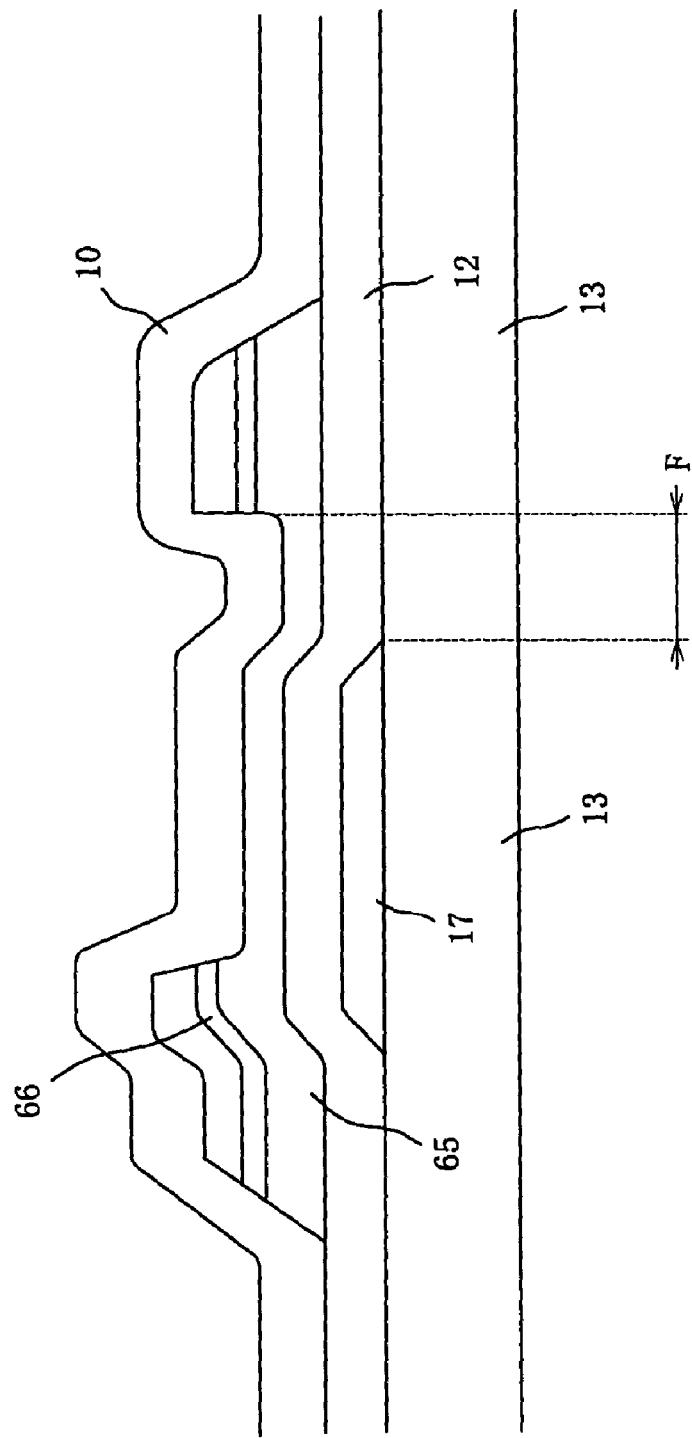
FIG. 89 shows a sectional view of an offset thin film transistor element for multi-domain vertically aligned mode liquid crystal panels of the present invention.
Figure 90:
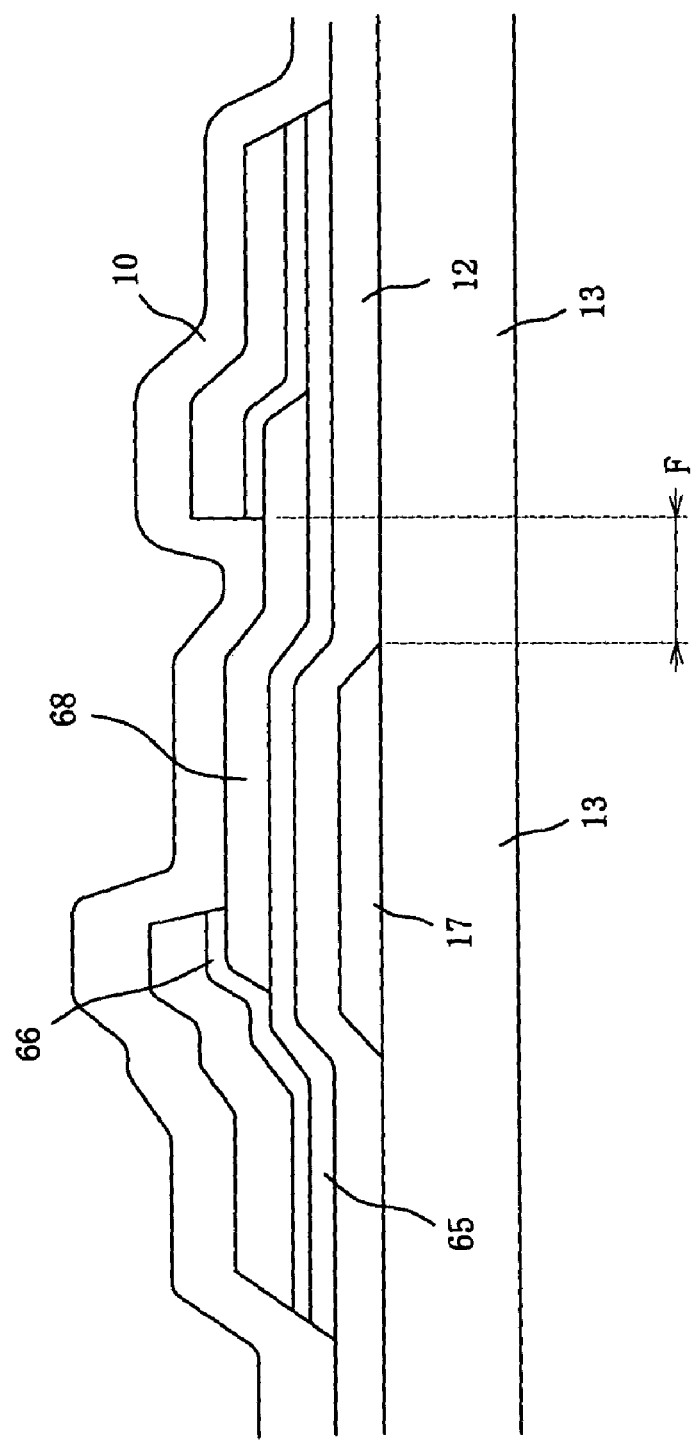
FIG. 90 shows a sectional view of an offset thin film transistor element for multi-domain vertically aligned mode liquid crystal panels of the present invention.

As a method for reducing a leakage current between a source electrode and a drain electrode, offset transistor structure as shown in FIG. 88, FIG. 89, and FIG. 90 may also be conceivable. In this case, a thin film transistor structure of a planar structure as shown in FIG. 87 is adopted. Here, notation F in FIG. 88, FIG. 89, and FIG. 90 shows amount of offset of an offset thin film transistor element. Moreover, an etching stopper layer 68 is shown in FIG. 90.

Example 19

FIG. 41, FIG. 42, FIG. 94, and FIG. 95 show a plan view of Example 19 of the present invention. This Example relates to a form of a transparent pixel electrode 8 and a liquid crystal alignment direction control electrode 15 used for Examples 12, 13, 14, 15, and 17. Molecules of anisotropic liquid crystal having a negative dielectric constant 14 has a property to arrange a direction of extended shaft of liquid crystal molecules 14 in a direction extending lengthwise of a wedge of a transparent pixel electrode 8 when a voltage is impressed, generation of disclination may be suppressed by adopting a form of Example 19 of the present invention.

When disclination is occurred, there arises a tendency that a transmittance of a liquid crystal panel and also for a speed of response are reduced. A speed of response and a transmittance may be improved by adopting a form of the present invention.

Figure 97:
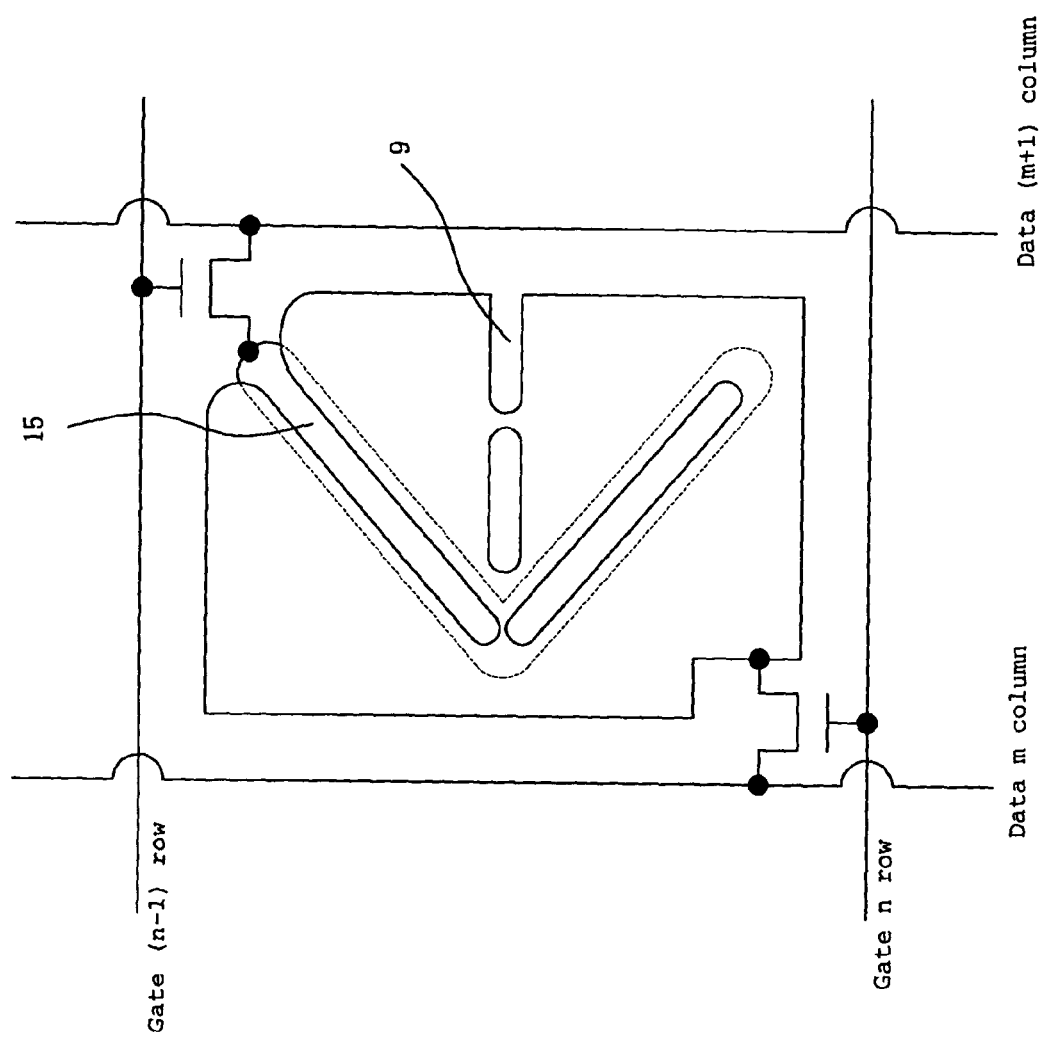
FIG. 97 shows a plane structural figure of a multi-domain vertically aligned mode liquid crystal panel of the present invention.
Figure 98:
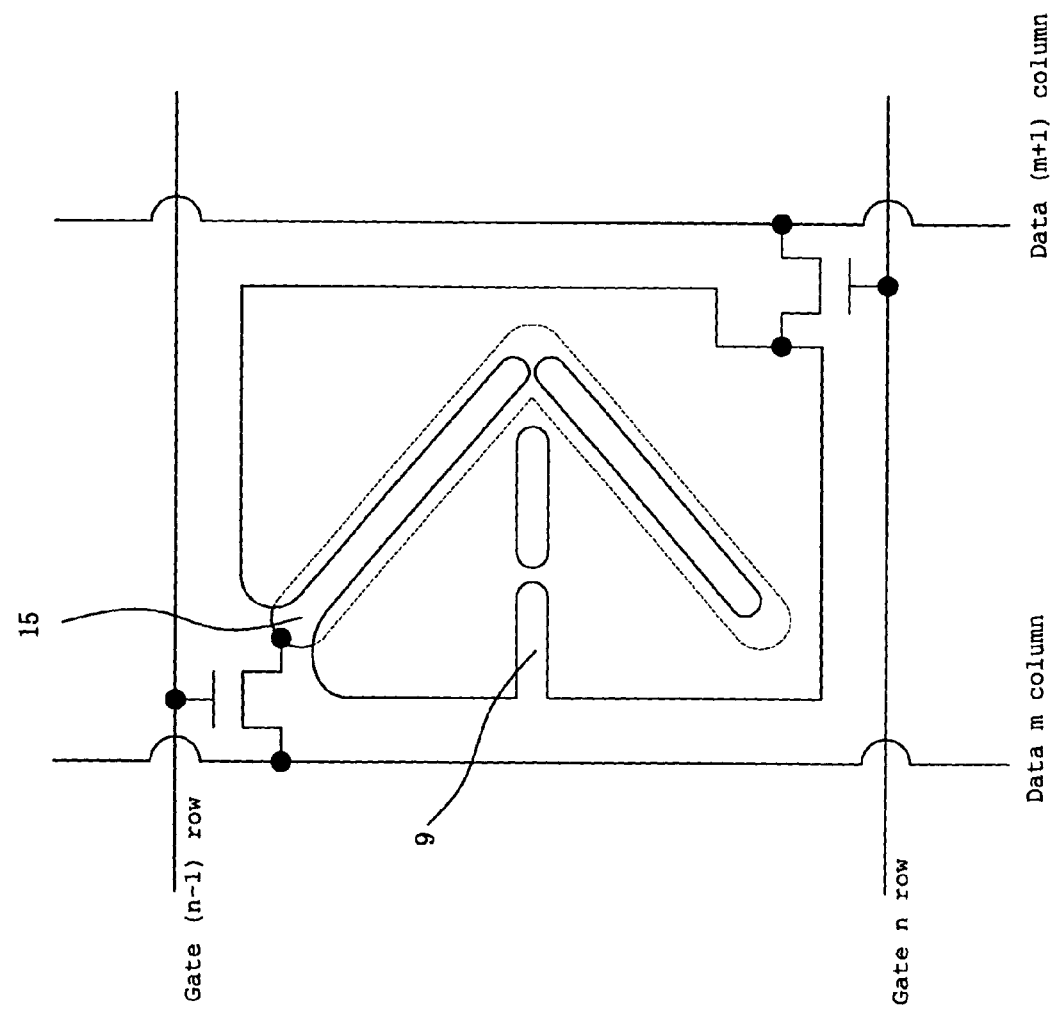
FIG. 98 shows a plane structural figure of a multi-domain vertically aligned mode liquid crystal panel of the present invention.

Besides, as structures of a thin film transistor element of the present invention, two kinds of structures as FIG. 97 and FIG. 98 show may be conceivable. A type shown in FIG. 97 has a structure arrangement that: in a pixel of n row m column, a thin film transistor element is formed in a position where a scan signal wiring of (n−1) row and a video signal wiring of (m+1) column intersect with each other, a video signal wiring of (m+1) column, and a liquid crystal alignment direction control electrode used for the pixel of n row m column are connected via this thin film transistor element; and a thin film transistor element is formed in a position where a scan signal wiring of n row and a video signal wiring of m column intersect with each other, and the video signal wiring of m column, and a transparent pixel electrode used for the pixel of n row m column are connected via this thin film transistor element.

On the contrary, a type shown in FIG. 98 has a structure arrangement that: in a pixel of n row m column, a video signal wiring of m column and a liquid crystal alignment direction control electrode used for the pixel of n row m column are connected via a thin film transistor element in a position where a scan signal wiring of (n−1) row and a video signal wiring of m column intersect with each other; and a video signal wiring of (m+1) column and a transparent pixel electrode used for the pixel of n row m column are connected via a thin film transistor element in a position where a scan signal wiring of n row and a video signal wiring of (m+1) column intersect with each other. The present invention includes both of the types of structure shown in FIG. 97 and FIG. 98.

Use of the present invention does not require use of color filter substrates with bumps or slits that have been used for conventional multi-domain vertically aligned mode liquid crystal displays, but enables reduction of cost.

In addition, it may also cancel simultaneously display unevenness induced by variation accompanying bumps or processing of slits, and extremely improves yield.

Furthermore, it suppresses problems of unevenness, or residual image (image burn-in) caused by diffusion of impurities in pigments of a color filter, or impurities in bumps from crevices of bumps or slits into liquid crystals, and thereby realizes extremely reliable vertically aligned mode liquid crystal displays.

Since possibility of reworking may easily be realized with oxygen plasma treatment irrespective of defects generation in a polyimide alignment layer application process, reduction of reworking costs may be realized.

Use of electrode structures, structure arrangements, and driving methods of the present invention enables production of active matrix substrates having a large aperture ratio, and thus able to provides viewing displays of high brightness. Furthermore, since it can improve a speed of response of liquid crystal molecules, very large-sized liquid crystal TVs responding animated pictures can be realized. In addition, it can realize a uniform black display with decreased light leakage in a dark room as compared with the conventional vertically aligned mode liquid crystal displays using bumps.

What is claimed is:

1. A color active matrix type vertically aligned mode liquid crystal display comprising:
   a scan signal wiring;
   a video signal wiring;
   a thin film transistor which is formed at an intersection of the scan signal wiring and the video signal wiring;
   a transparent pixel electrode connected to the thin film transistor element in which two or more long and slender slits are formed;
   an active matrix substrate having a liquid crystal alignment direction control electrode in a lower layer of the transparent pixel electrode formed via an insulator film;
   a color filter substrate facing the active matrix substrate; and
   an anisotropic liquid crystal layer having a negative dielectric constant sandwiched by the active matrix substrate and the color filter substrate;
   wherein in order to impress a voltage to liquid crystal molecules vertically aligned between the active matrix substrate and the color filter substrate, and to make the liquid crystal molecules tilt in different two or four directions, both of two kinds of following electrode structures are formed in one pixel of the active matrix substrate:
   (i) a transparent flat common electrode is used in the color filter substrate side, and for the transparent pixel electrodes facing the transparent flat common electrode in the active matrix substrate side, patterns having a shape of a long and slender slit are formed in such a way that the transparent pixel electrode is removed at a part of the slit, where the liquid crystal alignment direction control electrode is excluded in a lower layer of the slit;
   (ii) a transparent flat common electrode is used in the color filter substrate side, and for the transparent pixel electrode facing the transparent flat common electrode in the active matrix substrate side, patterns having a shape of a long and slender slit are formed, and a liquid crystal alignment direction control electrode having a shape substantially the same as that of the slit, and a dimension larger than that of the slits is formed in a lower layer of the slits via the insulator film where the transparent pixel electrode and the liquid crystal alignment direction control electrode in each pixel of the active matrix substrate are driven separately from one another;
   wherein a potential of the liquid crystal alignment direction control electrode currently placed in a lower layer of the slit of the transparent pixel electrode is set lower than a potential of the transparent pixel electrode when a potential of the transparent pixel electrode separated for every pixel on the active matrix substrate side is lower than a potential of the facing flat common electrode on the color filter substrate side;
   wherein a potential of the liquid crystal alignment direction control electrode placed in a lower layer of the slit of the transparent pixel electrode is set higher than a potential of the transparent pixel electrode when a potential of the transparent pixel electrode is higher than a potential of the facing flat common electrode of the color filter substrate side; and
   wherein the polarities of the potential of the transparent pixel electrode and the potential of the liquid crystal alignment direction control electrode are reversed to a polarity of a potential of the flat common electrode in the color filter substrate side every vertical scanning period.

2. The color active matrix type vertically aligned mode liquid crystal display according to claim 1,
   wherein a slit formed in the transparent pixel electrode on the active matrix substrate side and extended in a long and slender form, and a slit forming a group with the liquid crystal alignment direction control electrode are arranged alternately, maintaining an almost parallel relationship in a direction about ±45 degrees relative to a direction of a scan signal wiring.

3. The color active matrix type vertically aligned mode liquid crystal display according to claim 1,
   wherein there is adopted a structure that slits formed in the transparent pixel electrode in the active matrix substrate side and extended in a long and slender form are arranged in a direction ±45 degrees relative to a direction of a scan signal wiring;
   slits forming a group with the liquid crystal alignment direction control electrode are arranged in a parallel direction and in a perpendicular direction relative to a direction of the scan signal wiring; and
   the liquid crystal alignment direction control electrode encloses a periphery of the transparent pixel electrode while overlapping with the transparent pixel electrode via the insulated film.

4. The color active matrix type vertically aligned mode liquid crystal display according to claim 1,
   wherein there is adopted a structure that a slit formed in a transparent pixel electrode in an active matrix substrate side and extended in a long and slender form is arranged in a parallel direction and in a perpendicular direction relative to a scan signal wiring direction;

a slit forming a group with the liquid crystal alignment direction control electrode is arranged in parallel to the scan signal wiring direction; and the liquid crystal alignment direction control electrode encloses a periphery of the transparent pixel electrode while overlapping with the transparent pixel electrode via the insulated film.

5. The color active matrix type vertically aligned mode liquid crystal display according to claim 1, wherein there is adopted a structure that slits formed in the transparent pixel electrode in the active matrix substrate side and extended in a long and slender form are arranged in a parallel direction and in a perpendicular direction relative to a scan signal wiring direction; and slits forming a group with a liquid crystal alignment direction control electrode are arranged in a direction ±45 degrees relative to a direction of a scan signal wiring.

6. The color active matrix type vertically aligned mode liquid crystal display according to claim 1, wherein the liquid crystal alignment direction control electrode formed in a lower layer of slits of the transparent pixel electrode via the insulated film is simultaneously formed in the same layer at the time of formation of the scan signal wiring.

7. The color active matrix type vertically aligned mode liquid crystal display according to claim 1, wherein additional capacitance is formed with the liquid crystal alignment direction control electrode formed in a lower layer of slits of the transparent pixel electrode via the insulated film, and the transparent pixel electrode.

8. The color active matrix type vertically aligned mode liquid crystal display according to claim 1, wherein contact terminals of the scan signal wiring are arranged on either of left side or right side of a display screen part, and contact terminals of the liquid crystal alignment direction control electrode are arranged on another side different from a side of the contact terminals of the scan signal wiring.

9. The color active matrix type vertically aligned mode liquid crystal display according to claim 1, wherein at the time of moving image displaying, a bias voltage impressed between the liquid crystal alignment direction control electrode formed in a lower layer of a slit of the transparent pixel electrode and the transparent pixel electrode is set higher than a voltage at the time of still picture displaying, and thereby, a tilting speed of the anisotropic liquid crystal molecules having a negative dielectric constant is set higher.

10. A color active matrix type vertically aligned mode liquid crystal display comprising:

a scan signal wiring;

a video signal wiring;

a thin film transistor which is formed at an intersection of the scan signal wiring and the video signal wiring;

a transparent pixel electrode connected to the thin film transistor element in which two or more long and slender slits are formed;

an active matrix substrate having a liquid crystal alignment direction control electrode in a lower layer of the transparent pixel electrode formed via an insulator film;

a color filter substrate facing the active matrix substrate; and an anisotropic liquid crystal layer having a negative dielectric constant sandwiched by the active matrix substrate and the color filter substrate;

wherein in order to impress a voltage to liquid crystal molecules vertically aligned between the active matrix substrate and the color filter substrate, and to make the liquid crystal molecules tilt in different two or four directions, both of two kinds of following electrode structures are formed in one pixel of the active matrix substrate:

(i) a transparent flat common electrode is used in the color filter substrate side, and for the transparent pixel electrodes facing the transparent flat common electrode in the active matrix substrate side, patterns having a shape of a long and slender slit are formed in such a way that the transparent pixel electrode is removed at a part of the slit, where the liquid crystal alignment direction control electrode is excluded in a lower layer of the slit;

(ii) a transparent flat common electrode is used in the color filter substrate side, and for the transparent pixel electrode facing the transparent flat common electrode in the active matrix substrate side, patterns having a shape of a long and slender slit are formed, and two rows of liquid crystal alignment direction control electrodes that are mutually separated and set as potentials different from each other exist in a lower layer of the transparent pixel electrode via the insulated film, either of the liquid crystal alignment direction control electrodes has a shape substantially the same as that of a pattern of the shape of long and slender slits, and a dimension larger than that of the slits, and two rows of the liquid crystal alignment direction control electrodes mutually separated are arranged in a direction of a scan signal wiring in a lower layer of the long and slender slits that are formed, mutually exchanged in an every fixed pixel cycle, in the transparent pixel electrode where the transparent pixel electrode and the two rows of the liquid crystal alignment direction control electrode in each pixel of the active matrix substrate are driven separately from one another;

wherein when a potential of the transparent pixel electrode separated for every pixel of the active matrix substrate side is lower than a potential of the facing flat common electrode on the color filter substrate side, a potential of the liquid crystal alignment direction control electrode placed in a lower layer of the slit of the transparent pixel electrode is set lower than a potential of the transparent pixel electrode;

when a potential of the transparent pixel electrode is higher than a potential of the facing flat common electrode of the color filter substrate side, a potential of the liquid crystal alignment direction control electrode placed in a lower layer of the slit of the transparent pixel electrode is set higher than a potential of the transparent pixel electrode; and polarities of the potential of the transparent pixel electrode and the potential of the liquid crystal alignment direction control electrode are reversed to a polarity of the potential of the flat common electrode in the color filter substrate side every vertical scanning period.

11. The color active matrix type vertically aligned mode liquid crystal display according to claim 10, wherein potentials of the liquid crystal alignment direction control electrodes arranged in the vicinity of both sides of the scan signal wiring are set as polar potentials different from each other.

12. The color active matrix type vertically aligned mode liquid crystal display according to claim 10, wherein both of contact terminals of the scan signal wiring and the liquid crystal alignment direction control electrodes are arranged on either of left side or right side of a display screen part, and contact terminals of two rows of the liquid crystal alignment direction control electrode for controlling one row of pixels are arranged so that they may be sandwiched between the contact terminals of the scan signal wiring.

13. The color active matrix type vertically aligned mode liquid crystal display according to claim 10,
wherein contact terminals for both of the scan signal wiring and the liquid crystal alignment direction control electrodes are arranged on both of right and left sides of a display screen part, and contact terminals of two rows of the liquid crystal alignment direction control electrode for controlling one row of pixels are arranged so that they may be sandwiched between the contact terminals of the scan signal wiring.

14. The color active matrix type vertically aligned mode liquid crystal display according to claim 10,
wherein the two rows of the liquid crystal alignment direction control electrode in one row of the active matrix substrate is driven separately from that in another row of the active matrix substrate.

15. A color active matrix type vertically aligned mode liquid crystal display comprising:
a scan signal wiring;
a video signal wiring;
a thin film transistor which is formed at an intersection of the scan signal wiring and the video signal wiring;
a transparent pixel electrode connected to the thin film transistor element in which two or more long and slender slits are formed;
an active matrix substrate having a liquid crystal alignment direction control electrode in a lower layer of the transparent pixel electrode formed via an insulator film;
a color filter substrate facing the active matrix substrate; and
an anisotropic liquid crystal layer having a negative dielectric constant sandwiched by the active matrix substrate and the color filter substrate,
wherein adjacent transparent pixel electrodes in a direction of the scan signal wiring are connected to a thin film transistor component controlled by mutually different scan signal wirings,
further wherein, in order to impress a voltage to liquid crystal molecules vertically aligned between the active matrix substrate and the color filter substrate, and to make the liquid crystal molecules tilt in different two or four directions, both of two kinds of following electrode structures are formed in one pixel of the active matrix substrate:
(i) a transparent flat common electrode is used in the color filter substrate side, and for the transparent pixel electrodes facing the transparent flat common electrode in the active matrix substrate side, patterns having a shape of a long and slender slit are formed in such a way that the transparent pixel electrode is removed at a part of the slit, where the liquid crystal alignment direction control electrode is excluded in a lower layer of the slit;
(ii) a transparent flat common electrode is used in the color filter substrate side, and for the transparent pixel electrode facing the transparent flat common electrode in the active matrix substrate side, patterns having a shape of a long and slender slit are formed, and a liquid crystal alignment direction control electrode having a shape substantially the same as that of the slit, and a dimension larger than that of the slit is formed in a lower layer of the slit via the insulated film where the transparent pixel electrode and the liquid crystal alignment direction control electrode in each pixel of the active matrix substrate are driven separately from one another;
wherein a potential of the liquid crystal alignment direction control electrode currently placed in a lower layer of the slit of the transparent pixel electrode is set lower than a potential of the transparent pixel electrode when a potential of the transparent pixel electrode separated for every pixel on the active matrix substrate side is lower than a potential of the facing flat common electrode on the color filter substrate side;
wherein a potential of the liquid crystal alignment direction control electrode placed in a lower layer of the slit of the transparent pixel electrode is set higher than a potential of the transparent pixel electrode when a potential of the transparent pixel electrode is higher than a potential of the facing flat common electrode of the color filter substrate side; and
polarities of the potential of the transparent pixel electrode, and the potential of the liquid crystal alignment direction control electrode are reversed to a polarity of the potential of the flat common electrode in the color filter substrate side every vertical scanning period.

16. The color active matrix type vertically aligned mode liquid crystal display according to claim 15,
wherein both of contact terminals of the scan signal wiring and the liquid crystal alignment direction control electrodes are arranged on either of left side or right side of a display screen part, and contact terminals of one row of the liquid crystal alignment direction control electrode for controlling one row of pixels are arranged so that they may be sandwiched between the contact terminals of the scan signal wiring.

17. The color active matrix type vertically aligned mode liquid crystal display according to claim 15,
wherein contact terminals for both of the scan signal wiring and the liquid crystal alignment direction control electrodes are arranged on both of right and left sides of a display screen part, and contact terminals of one row of the liquid crystal alignment direction control electrode for controlling one row of pixels are arranged so that they may be sandwiched between the contact terminals of the scan signal wiring.

18. The color active matrix type vertically aligned mode liquid crystal display according to claim 15,
wherein the liquid crystal alignment direction control electrode in one row of the active matrix substrate is driven separately from that in another row of the active matrix substrate.

* * * * *